United States Patent
Koch et al.

(10) Patent No.: US 10,915,670 B2
(45) Date of Patent: Feb. 9, 2021

(54) SPATIAL CONSTRAINT BASED TRIANGULAR MESH OPERATIONS IN THREE DIMENSIONS

(71) Applicant: Autodesk, Inc., San Rafael, CA (US)

(72) Inventors: Valentin R. Koch, Kelowna (CA); Hung M. Phan, Dracut, MA (US)

(73) Assignee: AUTODESK, INC., San Rafael, CA (US)

( * ) Notice: Subject to any disclaimer, the term of this patent is extended or adjusted under 35 U.S.C. 154(b) by 445 days.

(21) Appl. No.: 15/705,083

(22) Filed: Sep. 14, 2017

(65) Prior Publication Data

US 2018/0075169 A1 Mar. 15, 2018

Related U.S. Application Data

(60) Provisional application No. 62/394,608, filed on Sep. 14, 2016.

(51) Int. Cl.
| | |
|---|---|
| *G06F 30/13* | (2020.01) |
| *E01C 1/00* | (2006.01) |
| *A01B 79/00* | (2006.01) |
| *G06F 111/04* | (2020.01) |

(52) U.S. Cl.
CPC ............ *G06F 30/13* (2020.01); *A01B 79/005* (2013.01); *E01C 1/002* (2013.01); *G06F 2111/04* (2020.01); *Y02A 30/60* (2018.01)

(58) Field of Classification Search
CPC ....... G06F 30/13; G06F 2111/04; E01C 1/002
USPC .................................. 703/2, 5; 345/420, 423
See application file for complete search history.

(56) References Cited

U.S. PATENT DOCUMENTS

| | | | | |
|---|---|---|---|---|
| 1,021,657 A | * | 3/1912 | Burrows ................. | B62H 1/02 280/295 |
| 7,133,044 B2 | * | 11/2006 | Maillot .................. | G06T 17/20 345/423 |
| 7,196,702 B1 | * | 3/2007 | Lee ........................ | G06T 17/30 345/419 |
| 7,236,167 B2 | * | 6/2007 | Lee ........................ | G06T 17/30 345/420 |

(Continued)

OTHER PUBLICATIONS

Bauschke, H.H., et al., "On Projection Algorithms for Solving Convex Feasibility Problems", SIAM Review. Sep. 1996, pp. 367-426, vol. 38, No. 3.

(Continued)

*Primary Examiner* — Thai Q Phan
(74) *Attorney, Agent, or Firm* — Gates & Gooper LLP

(57) ABSTRACT

A method and system provide the ability to design a (land) surface. A triangular surface mesh representative of an existing surface is obtained. The mesh includes triangles that are connected by vertices and edges. Design constraint sets are determined based design constraints. The design constraints include a maximum slope constraint for a first triangle of the two or more triangles in the triangular surface mesh. The maximum slope constraint is a maximum angle between a normal vector of the first triangle and a reference vector. Heights of the vertices of the first triangle are projected onto the design constraint sets such that the normal vector satisfies all of the design constraints. The projecting includes modifying the heights by a minimum Euclidian distance. A design of the surface represented by the triangular surface mesh is generated based on the projecting.

16 Claims, 32 Drawing Sheets

(56) References Cited

U.S. PATENT DOCUMENTS

| | | | | |
|---|---|---|---|---|
| 7,755,623 | B2* | 7/2010 | Rockwood | G06T 17/30 345/420 |
| 8,836,701 | B1* | 9/2014 | Rockwood | G06F 30/00 345/423 |
| 9,262,859 | B2* | 2/2016 | Rockwood | G06F 30/10 |
| 9,898,848 | B2* | 2/2018 | Black | G06T 17/00 |
| 2008/0259077 | A1* | 10/2008 | Liepa | G06F 17/50 345/423 |
| 2011/0025690 | A1* | 2/2011 | Tzur | G06T 15/04 345/423 |
| 2015/0262405 | A1* | 9/2015 | Black | G06T 17/00 345/420 |
| 2016/0232262 | A1* | 8/2016 | Shayani | G06T 17/10 |
| 2017/0024921 | A1* | 1/2017 | Beeler | G06T 13/40 |
| 2017/0124726 | A1* | 5/2017 | Soulard | B33Y 50/02 |
| 2018/0268095 | A1* | 9/2018 | Shayani | G06T 17/10 |
| 2018/0322646 | A1* | 11/2018 | Matthies | G06K 9/6226 |

OTHER PUBLICATIONS

Bauschke, H.H., et al., "Projection Methods: Swiss Army Knives for Solving Feasibility and Best Approximation Problems with Halfspaces", In Infinite products of operators and their applications, 2015, vol. 636, pp. 1-39, Contemp. Math., Amer. Math. Soc., Providence, RI.

Bauschke, H.H., et al., "Stadium norm and Douglas-Rachford splitting: a new approach to road design optimization", Operations Research, 2014, pp. 1-35, vol. 64, No. 1.

Biniaz, A., et al., "Drainage reality in terrains with higher-order Delaunay triangulations" Springer Berlin Heidelberg, Berlin, Heidelberg, 2008, pp. 199-211.

Biniaz, A., et al., "Slope fidelity in terrains with higher-order delaunay triangulations", 16th International Conference in Central Europe on Computer Graphics, Visualization, and Computer Vision, 2008 (Plzen, Czech Republic), Václav Skala—UNION Agency, pp. 17-23.

Bọt, R.I., et al., "A primal-dual splitting algorithm for finding zeros of sums of maximally monotone operators", SIAM Journal on Optimization, 2013, pp. 2011-2036, vol. 23, No. 4.

Briceño Arias, L.M., et al., "A monotone+ skew splitting model for composite monotone inclusions in duality". SIAM Journal on Optimization, 2010, pp. 1230-1250, vol. 21, No. 4.

Censor, Y., et al., "On the Effectiveness of Projection Methods for Convex Feasibility Problems with Linear Inequality Constraints", Comput. Optim. Appl., 2012, pp. 1065-1088, vol. 51, No. 3.

Censor, Y., et al., "Parallel Optimization: Theory, Algorithms and Applications", Numerical Mathematics and Scientific Computation, 1997, pp. 1-20, Oxford University Press, New York.

Douglas Jr., J. et al., "On the numerical solution of heat conduction problems in two and three space variables", Trans. Amer. Math. Soc., 1956, pp. 421-439, vol. 82.

Itoh, T., et al., "Automatic Conversion of Triangular Meshes Into Quadrilateral Meshes with Directionality", International Journal of CAD/CAM, 2002, pp. 11-21, vol. 1., No. 1.

Johnston, B.P., et al., "Automatic Conversion of Triangular Finite Element Meshes to Quadrilateral Elements", International Journal for Numerical Methods in Engineering, 1991, pp. 67-84, vol. 31.

Kuhn, H.W., et al., "Nonlinear Programming", Proceedings of the Second Berkeley Symposium on Mathematical Statistics and Probability, 1951, pp. 481-492, University of California Press, Berkeley and Los Angeles.

Lions, P.I., et al., "Splitting Algorithms for the Sum of Two Nonlinear Operators*", Siam J. Num. Anal., Dec. 1979, pp. 964-979, vol. 16, No. 6.

Moore, I.D., et al., "Digital terrain modelling: a review of hydrological, geomorphological, and biological applications", Hydrological processes, 1991, pp. 3-30, vol. 5.

Moreau, J.J., "Proximite et dualite dans un espace hilbertien", Bulletin de la S. M. F., tome 93, 1965, pp. 273-299.

Rank, E., et al., "Adaptive Mesh Generation and Transformation of Triangular to Quadrilateral Meshes", Communications in Numerical Methods in Engineering, 1993, pp. 121-129, vol. 9.

Bauschke, H.H., et al., "Convex Analysis and Monotone Operator Theory in Hilbert Spaces", CMS Books in Mathematics/Ouvrages de Mathématiques de la SMC, 2011, Springer, New York.

Graves, R.M., et al., "Classic Golf Hole Design", 2002, pp. 50, 182-186, John Wiley & Sons, Inc., Hoboken DC.

Hawtree, F.W., "The Golf Course, Planning design, construction and maintenance", E & FN Spon, 2005, pp. 72, imprint of Chapman & Hall, London, UK.

Irving, R., "Beyond the Quadratic Formula", The Mathematical Association of America, 2010, pp. 146-149, Washington DC.

Ruszczynski, A., "Nonlinear optimization", Princeton University Press, 2006, pp. 20, 113-117, Princeton, NJ.

* cited by examiner

SPATIAL CONSTRAINT BASED TRIANGULAR MESH OPERATIONS IN THREE DIMENSIONS

CROSS-REFERENCE TO RELATED APPLICATIONS

This application claims the benefit under 35 U.S.C. Section 119(e) of the following commonly-assigned U.S. provisional patent application(s), which is/are incorporated by reference herein:

Provisional Application Ser. No. 62/394,608, filed on Sep. 14, 2016, with inventor(s) Hung M. Phan and Valentin R. Koch, entitled "Applying Geometric Constraints on Triangles in Three Dimensions,".

BACKGROUND OF THE INVENTION

1. Field of the Invention

The present invention relates generally to road design, and in particular, to a method, apparatus, system, and article of manufacture for designing a grading of a triangular mesh representing a physical site to accommodate proper drainage.

2. Description of the Related Art (Note: This application references a number of different publications as indicated throughout the specification by reference numbers enclosed in brackets, e.g., [x]. A list of these different publications ordered according to these reference numbers can be found below in the section entitled "References." Each of these publications is incorporated by reference herein.)

A common representation of three dimensional objects in computer applications such as graphics and design, are triangular meshes. In many instances, individual or groups of triangles need to satisfy spatial constraints that are imposed either by observation from the real world, or by concrete design specifications for the objects. As these problems tend to be of large scale, choosing a mathematical optimization approach can be particularly challenging. To better understand the problems of the prior art, an explanation of the design problems may be useful.

One issue of the prior art relates to how to solve design problems with concrete applications in the computational surface generation of triangular meshes. In many cases, these surfaces need to satisfy certain spatial constraints.

Digital Terrain Modeling in Computational Geometry

Digital terrain modeling may be done through a set of contours, or a collection of ordered elevation points at arbitrary datums in a landscape. These points can then be connected through a triangular mesh, which is usually called a Triangular Irregular Network (TIN) [22]. As pointed out in [5], traditional triangulation methods may result in terrain models that do not represent the true conditions in terms of drainage pools and channels, and may result in local minima and sharp slope changes that do not exist in reality. In [6], the authors apply heuristics to generate higher order Delaunay triangulations that attempt to mitigate these problems. A more deterministic approach would be to identify existing drainage channels and, within certain boundaries, adjust the triangle surfaces in order to smooth out grade change and create drainage channels.

Computer-Aided Design of Golf Course Features

Contour changes are an integral part of any golf course design. They may involve smaller terrain changes such as cut and fill of bunker walls for erosion control [13], or higher earthwork quantity features such as artificially embanked mounds, as well as differently sloped greens that require cut and fill in order to fit into the existing ground [13]. Tee flattening with constrained end slopes may require large fill quantities, or can be designed by balancing quantities through benched fills [15]. Hence, for each feature of a golf course, the architect needs to consider a variety of surface maximum and minimum slope constraints, surface alignment constraints, as well as other surface slope requirements that are not only part of the course difficulty, but also essential for drainage and environmental impact.

Mesh Conversion

A common problem in topology is the conversion of one surface representation into another. One such example is converting an existing triangular, irregular mesh into the closest regular rectangular mesh. In each context, the term closest could mean different things such as the vertical distance of the corner points of the rectangle to the triangular grid, or the minimum distance of the average of the triangle elevations to the average of the corner points, or the minimum of the volume between the triangles and the rectangular surface that encompasses them. Methods to convert two dimensional, triangular meshes into quadrilateral meshes while keeping some or all of the original vertices are shown in [17, 18, 24]. An extension of these methods to three dimensions would require that the triangles that are grouped into quadrilaterals to satisfy some surface alignment conditions. Furthermore, one would like to minimize the distance between the original and final elevations of the vertices, using either the 1-norm or the 2-norm. FIG. 1 shows an example of an existing triangular, irregular mesh at the bottom, and a quadrilateral grid on the top. The designer would like to convert the three dimensional triangular mesh 102 into a three dimensional quadrilateral mesh that aligns with the grid lines 104 shown on the top. FIG. 2 shows how the existing triangular mesh 102 is mapped in the quadrilateral grid 104. If a quadrilateral cuts an existing triangle, it may need to be retriangulated to form new triangles so that each quadrilateral is triangulated. The mentioned surface alignment conditions would then apply to triangles that are inside an individual quadrilateral. The design objective function is then to minimize the elevation difference between the triangle vertices in the original triangular mesh 102, and the triangle vertices in the new mesh that groups the triangles into quadrilaterals.

Computer-Aided Design for Architecture and Civil Engineering Structures

In Computer-Aided Design (CAD), triangular meshes are widely used in various engineering disciplines. Existing and finished ground surfaces in architecture and civil engineering are represented by triangulated irregular networks. Slopes are relevant in the context of drainage, in both, civil engineering (transportation structures), and architecture (roof designs), as well as in the context of surface alignments such as solar farms, embankment dams, and airport infrastructure layouts.

In architecture, the design of a complex roof requires slope constraints for drainage, but can also include orientation and maximum slope constraints. Consider the example in FIG. 3 of a roof seen from above. The roof polygons 302 with the light dashed lines are triangulated, in order to create a triangular mesh. The engineer may want to place multiple solar panels 304 on a roof. The solar panels 304 require a minimum inclination towards the position of the sun at noon, shown by the arrows 306. Also, the panel 304 should not exceed a certain angle, to preserve a maximum average efficiency. This requires a surface orientation constraint for some of the triangles.

A concrete problem that arises in civil engineering design is the grading of a parking lot. Within a given area, the engineer has to define grading slopes such that the parking lot fits within existing structures, the drainage requirements on the lot are met, and safety and comfort is taken into account. Besides these requirements, the engineer would like to change the existing surface as little as possible, in order to save on earthwork costs.

FIG. 4 depicts an example of a parking lot that has four horizontal parking rows. In FIG. 4, the designer wants water to flow in the direction of the arrows 402 towards and along the thick lines 404 into the inlets 406 that are represented as circles. Lines 408 are curbs that need to be aligned.

Drainage schemes can vary for each situation. The triangular mesh in FIG. 5 represents the existing ground of a planned parking lot. The engineer would like the water to drain away from the building, and along the drainage lines 502 into the four corners. Lines 504 indicate where the triangle edges need to be aligned. In FIG. 6, the engineer would like to study a different scheme, where the drainage 602 happens in parallel, on either side of the building. Lastly, FIG. 7 represents the mesh of an existing ground for a roundabout, where a minimum slope is required from the inner circle to the outer one, and water needs to drain from the road at the top along the outer circle to the roads on either side at the bottom (indicated by drainage lines 702).

SUMMARY OF THE INVENTION

Embodiments of the invention overcome the problems of the prior art based on geometric design constraints for triangles. In particular, a design constraint is defined that includes a maximum slope constraint for at least one of the triangles in a triangular surface mesh. The maximum slope constraint is a maximum angle between a normal vector of the triangle and a reference (e.g., Z) vector. Heights of the vertices of the triangle are projected onto design constraint sets such that the normal vector satisfies all of the design constraints (e.g., the maximum slope constraint). During the projection, the height(s) (e.g., the Z-coordinate [and not the x or y coordinate(s)]) of the triangle is moved by a minimum Euclidian distance. The projection is performed iteratively such that the triangular mesh converges to an optimal solution for a CAD design of the land surface. Accordingly, a design of the surface represented by the triangular surface mesh is generated based on the projecting.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

The figures herein are used to illustrate various geometric constraints on the triangles, design applications, and the way how iterative projections are performed.

Mathematical notation is utilized herein for a precise description of the geometric constraints and the corresponding projections. The mathematical notation is fairly standard and follows largely [2]. R denotes the set of real numbers. By "x:=y", or equivalently "y=: x", we mean that "x is defined by y". The assignment operators are denoted by "δ" and "→". The angle between two vectors $\vec{n}$ and $\vec{q}$ is denoted by $\angle(\vec{n},\vec{q})$. The cross product of $\vec{n}_1$ and $\vec{n}_2$ in $R^3$ is denoted by $\vec{n}_1 \times \vec{n}_2$.

General Overview

Embodiments of the invention provide a method and system for utilizing projections to various geometric design constraints for triangles in three dimensions, and proximity operators for design objective functions. The projections and proximity operators are executed on triangles that are part of an existing triangular mesh. Further, these projections and proximity operators are executed in an iterative way, such that the triangular mesh converges to an optimal solution for a computer-aided design in three dimensions.

Problem Formulation

A common representation of three dimensional objects in computer applications such as graphics and design, are triangular meshes. In many instances, individual or groups of triangles need to satisfy spatial constraints that are imposed either by observation from the real world, or by concrete design specifications for the objects. As these problems tend to be of large scale, choosing a mathematical optimization approach can be particularly challenging. For embodiments of the invention, various geometric constraints are defined as convex sets in Euclidean spaces, and the corresponding projections are found. Furthermore, proximity operators are introduced for certain objective functions. The projections and the proximity operators are used in an iterative method to find optimal design solutions.

Triangular Mesh

Figure 8:
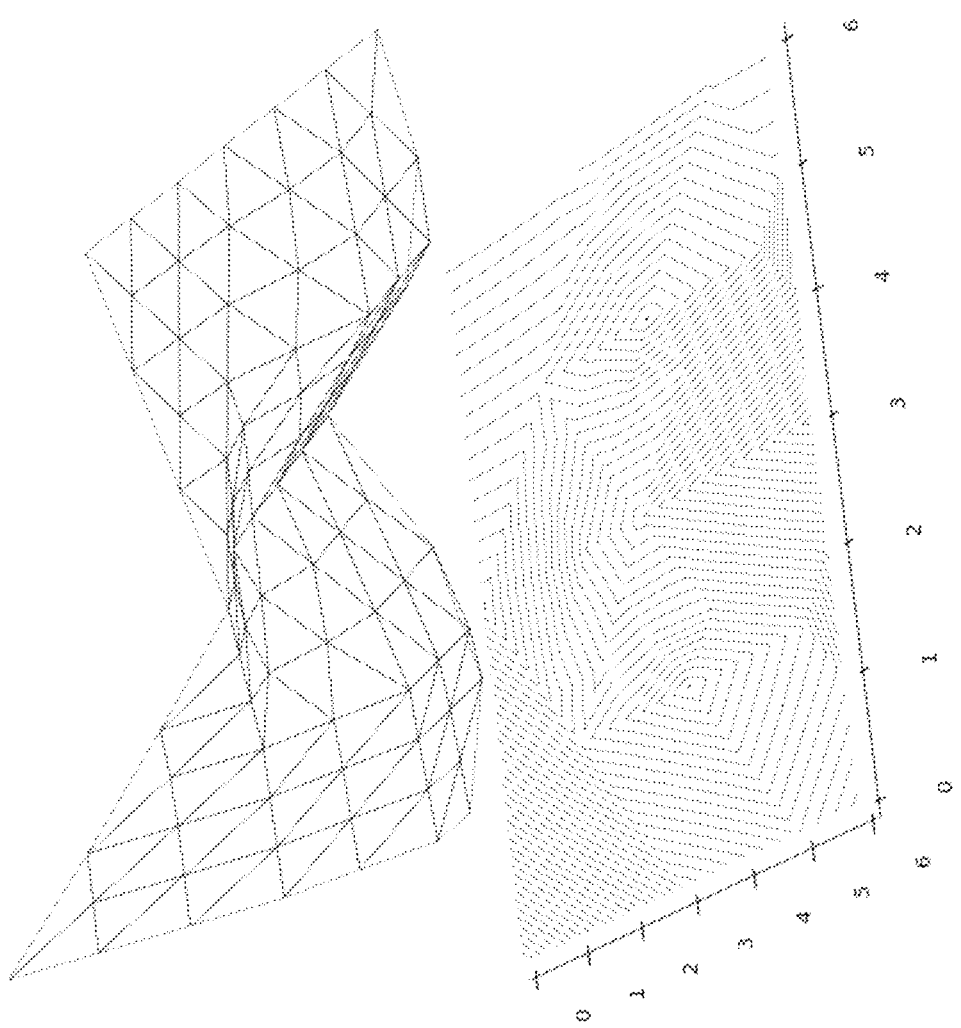
FIG. 8 shows a triangular mesh in accordance with one or more embodiments of the invention.

In computer-aided design, a triangular mesh is a surface that is represented by a set of connected triangles in three dimensional space $R^3$. This form of mesh is also called a Triangular Irregular Network (TIN). FIG. 8 shows a triangular mesh in $R^3$ with underlying contours on the $R^2$ plane in accordance with one or more embodiments of the invention. What follows is a precise mathematical definition of such a triangular mesh.

Assume that $G=(V_0,E_0)$ is a given triangular mesh on $R^2$ where $V_0$ is the set of vertices and $E_0$ is the set of (undirected) edges, i.e., $$V_0:=\{p_i=(p_{i1},p_{i2})\in R^2 | i\in\{1,2,\ldots,n\}\}, \quad (1)$$

$$E_0 \subseteq \{p_ip_j=p_jp_i | p_i,p_j \in V_0\}. \quad (2)$$

From G, one can derive the set of triangles of the mesh as follows $$T_0:=\{\Delta=(p_ip_jp_k)|\{p_ip_j,p_jp_k,p_kp_i\}\subseteq E_0\}. \quad (3)$$

One first aims to find a vector $z=(z_1,\ldots,z_n)\in X$ \quad (4)

such that the points $\{P_i=(p_{i1},p_{i2},z_i)\}_{i\in\{1,\ldots,n\}}$ satisfy a given set of constraints. \quad (5)

Figure 9:
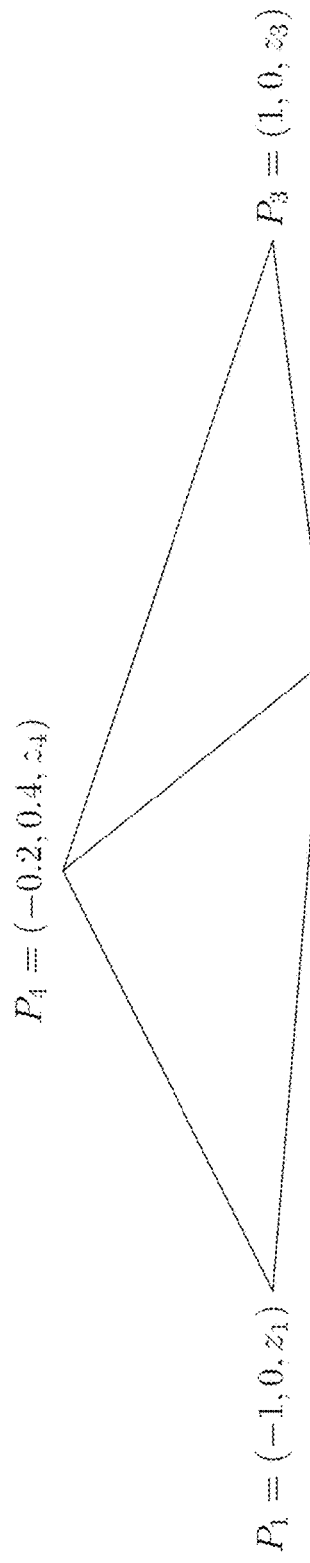
FIG. 9 illustrates a simple triangular mesh with vertices, edges, and two triangles in accordance with one or more embodiments of the invention.

Clearly, the points $(P_i)_{i\in\{1,\ldots,n\}}$ also form a corresponding triangular mesh S in three dimensions, where the mesh does not contain triangles that have a vertical surface (since we first defined all the vertices as unique points in $R^2$). FIG. 9 illustrates a simple triangular mesh with vertices $$V_0:=\{P_1,P_2,P_3,P_4\},$$

edges $$E_0:=\{P_1P_4,P_1P_2,P_2P_4,P_3P_4,P_2P_4\},$$

and the two triangles $$T_0:=\{(P_1P_2P_4),(P_2P_3P_4)\}.$$

in accordance with one or more embodiments of the invention.

Therefore, if there is no confusion, $E_0$, $V_0$, $T_0$ will be reused to denote the vertices, the edges, and the triangles of the three dimensional mesh.

Interval Constraint

A designer may require that some of the vertices in the triangular mesh cannot exceed a certain elevation, or cannot be lower than a certain elevation. Hence, the elevation of these vertices needs to lie within a given interval. This is referred to as the interval constraint and is defined as follows. For a given subset I of $\{1, 2, \ldots, n\}$, for all $i \in I$, the entries $z_i$ must lie in a given interval of R.

Edge Slope Constraint

A designer may require that the slope of a triangle edge cannot be steeper than a given value, or must be steeper than a given value. Hence, the edge slope needs to lie within a given interval. This is referred to as the edge slope constraint and is defined as follows. For a given subset E of the edges $E_0$, and for every edge $p_i p_j \in E$, the slope $$s_{ij} := \frac{z_i - z_j}{\sqrt{(p_{i1} - p_{j1})^2 + (p_{i2} - p_{j2})^2}} \tag{6}$$

must lie in a given subset of R.

Edge Alignment Constraint

A designer may require that the edges of some of the triangles in the mesh align themselves. This is referred to as the edge alignment constraint and is defined as follows. For a given pair of edges $p_i p_j$, $p_m p_n \in E_0$, the edges must have the same slope $s_{ij} = s_{mn}$.

Surface Alignment Constraint

A designer may require that the surfaces of some of the triangles in the mesh align themselves. Aligning triangle surfaces can result in useful patches inside the mesh that may be non-triangular. This is referred to as the surface alignment constraint and is defined as follows. For a given pair of triangles $\Delta_i, \Delta_j \in T_0$ the normal vectors $\vec{n}_{\Delta_i}$ and $\vec{n}_{\Delta_j}$ must be parallel.

Surface Slope Constraint

A designer may require that one or multiple triangles cannot exceed a certain slope with respect to gravity. This is referred to as a maximum surface slope constraint. A designer may also require that some triangles need to have a certain minimum slope in the direction of a given vector. This is referred to as an oriented minimum surface slope constraint. Both surface slope constraints can be defined as a more general surface slope constraints that follow. For a given subset T of the triangles $T_0$ and for each triangle $\Delta \in T$, there is a given set of vectors $Q_\Delta \subset R^3$ such that for each $\vec{q} \in Q_\Delta$, the angle between the normal vector $\vec{n}_\Delta$ and $\vec{q}$ must lie in a given subset $\theta_{\vec{q}}$ of $[0, \pi]$, which is also referred to as a surface orientation constraint.

Curvature Minimization

In some design problems, the designer may wish to construct a surface that is as "smooth" as possible. This problem is referred to as minimizing the curvature between adjacent triangles in the mesh. One way to minimize the curvature is to minimize the grade change between each pair of adjacent triangles in the mesh. One may define this as follows. For a given pair of triangles $\Delta_i, \Delta_j \in T_0$ the normal vectors $\vec{n}_{\Delta_i}$ and $\vec{n}_{\Delta_j}$ we want to minimize the angle between the two normal vectors.

Methods Overview

Embodiments of the invention are based on projections, and the use of projections in iterative ways to find solutions for feasibility or optimization problems. A projection of a point onto a convex set is the shortest distance of that point to the set. For example, if a set is a plane in three dimensions, then the projection of a point onto that set is its shadow on the plane. If the point to be projected is already on the plane, than the projection is the point itself.

Given multiple sets (e.g. multiple planes in three dimensions) and a starting point, iterative projection methods can be used to find a point in the intersection of all these sets that is closest from the starting point. These methods project iteratively onto the different sets. If the given sets are convex, then the iterative projections will converge to a solution.

In embodiments of the invention, the sets for each constraint are identified. Closed-form projections are then developed for each of the constraint sets. A proximity operator can be found for the curvature minimization. Iterative projection methods, such as the Douglas-Rachford splitting method, are then used to project iteratively to the constraint sets. This alters the elevations of the triangles in the triangular mesh until the mesh converges to a configuration that is desired by the engineer.

Projections onto Constraint Sets

Suppose there are J constraints imposed on a model. For $j \in \{1, 2, \ldots, J\}$, we denote by $C_j$ the set of all points that satisfies the j-th constraint. Thus, (4) can be written in the mathematical form $$\text{find a point } x \in C := \bigcap_{j \in \{1,2,\ldots,J\}} C_j, \tag{7}$$

which is referred to herein as a feasibility problem. Moreover, of the infinitude of possible solutions for (7), one may be particularly interested in those that are optimal in some sense. For instance, it could be desirable to find a solution that minimizes the slope change between adjacent triangles, a solution that minimizes the volume between the initial triangles and the triangles in the final solution, or variants and combinations thereof.

If more than one objective function is of interest, it is common to additively combine these functions, perhaps by scaling the functions based on their different levels of importance. In summary, one goal is to solve the problem $$\min F(z) \text{ subject to } z \in C := \bigcap_{j \in \{1,2,\ldots,J\}} C_j, \tag{8}$$

where F may be a sum of (scaled) objective functions. The function F is typically nonsmooth which prevents the use of standard optimization methods.

A constraint set $C \subseteq X$ is the collection of all feasible data points, i.e., points that satisfy some requirements. Suppose the given data point $z \in X$ is not feasible (i.e., $z \notin C$), one aims to modify z so that the newly obtained point x is feasible (i.e., $x \in C$); and one would like to do it with minimal adjustment on z. This task can be achieved by using the projection onto C. Recall that the projection of z onto C, denoted by $P_C z$, is the solution of the optimization problem $$P_C z := \underset{x \in C}{\arg\min} \|z - x\| = \left\{ x \in C, \|x - z\| = \min_{y \in C} \|z - y\| \right\}. \tag{9}$$

It is well known that if C is nonempty, closed, and convex[1], then $P_C z$ is singleton, see, e.g., [26, Theorem 2.10].

[1]C is convex if for all x, y∈C and λ∈[0,1], we have (1−λ)x+λy∈C

It turns out that all spatial constraints encountered in various exemplary settings may be convex and closed. Hence, their projections always exist and are unique. Moreover, one can also successfully obtain explicit formulas for these projections.

Iterative Projection Methods for Feasibility Problems

Consider the feasibility problem $$\text{find a point } x \in C := \bigcap_{j \in \{1,2,\ldots,J\}} C_j, \tag{10}$$

The intersection C is the feasible set containing the desired solutions. Clearly, it might be tempting to solve this problem by finding the projection onto C directly. However, this is often not possible due to the complexity of C. A workaround is to utilize the projection $P_{C_j}$ onto each constraint, if the explicit formula is available. Then with an initial point, one can iteratively execute the projections $P_{C_j}$'s to derive a solution for (10). Let $z_0 \in X$ be the initial data point. The following are just a few of many (iterative) projection methods (see [2, 10, 12] and the references therein).

Cyclic Projections

Figure 10:
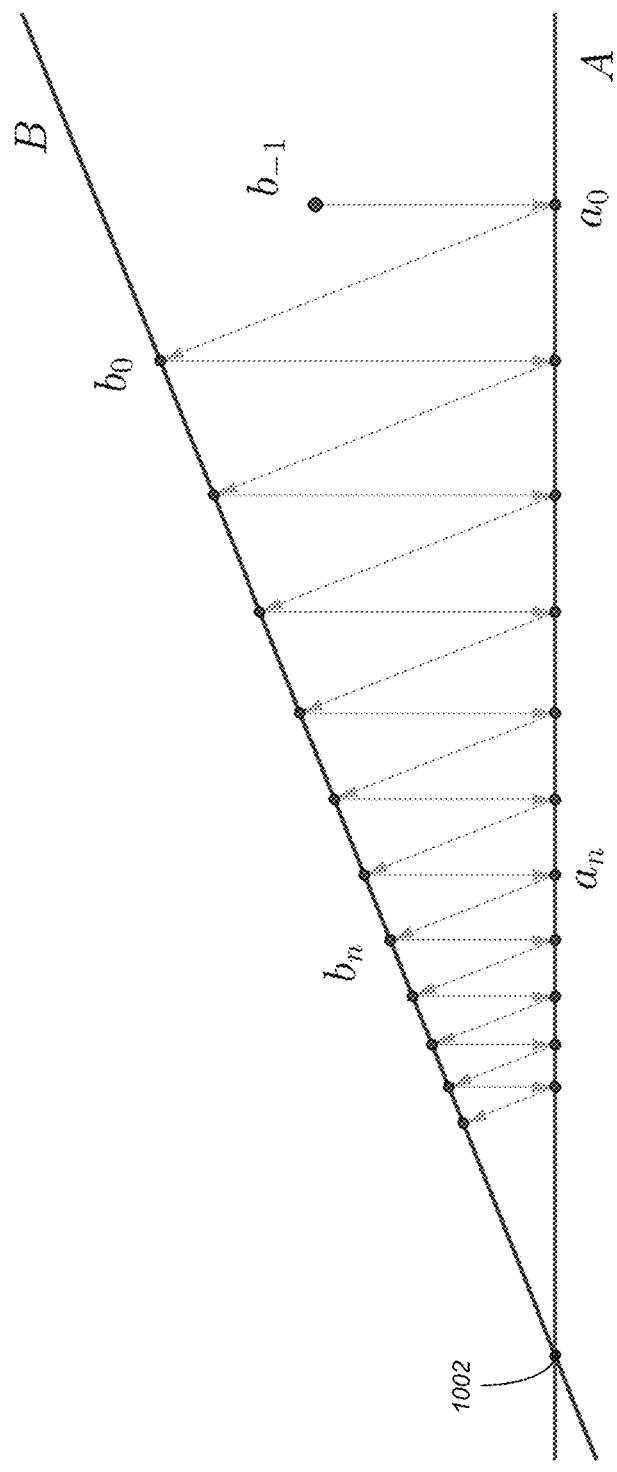
FIG. 10 illustrates two lines A and B that are shown as examples of two constraint sets in accordance with one or more embodiments of the invention.

In this method, a point is projected in sequence, from one constraint set to the next. Once the projected point reaches the first constraint set again, it is referred to as one cycle or one iteration. FIG. 10 illustrates two lines A and B that are shown as examples of two constraint sets. The method starts with point $b_{-1}$ that is projected to the set A, resulting in the new point $a_0$ that then gets projected to the set B. The obtained point $b_0$ completes one cycle. The process is repeated until the iterations converge to the intersection 1002 of the two sets A and B. The cyclic projections are defiend as follows. Given $z_k$, one updates $z_{k+1}:=Tz_k$ where $$T := P_{C_J} P_{C_{J-1}} \ldots P_{C_2} P_{C_1}. \tag{11}$$

Parallel Projections

In this method, a point is projected in parallel to all the constraint sets at once. The resulting points are then averaged to obtain a new point for the next iteration. One defines the parallel projections as follows. Given $z_k$, one updates $z_{k+1}:=Tz_k$ where $$T := \frac{1}{J}(P_{C_1} + P_{C_2} + \ldots + P_{C_J}). \tag{12}$$

String-Average Projections

The string-average projections is a combination of cyclic and parallel projections. One defines it as follows. Given $z_k$, one updates $z_{k+1}:=Tz_k$ where $$T := \frac{1}{J}(P_{C_1} + P_{C_2} P_{C_1} + \ldots + P_{C_J} P_{C_{J-1}} \ldots P_{C_2} P_{C_1}). \tag{13}$$

In fact, these are probably the simplest methods for solving feasibility problems. In addition, when projection methods succeed (see [11] for some interesting examples), they have various attractive features: they are easy to understand, simple for implementation and maintenance, and sometime can be very fast. [1, 3, 10, 12] provide additional discussions on projection methods.

Iterative Projection Methods for Optimization Problems

Iterative optimization methods are often used for solving (8), which may require the computations of proximity operators for the functions involved. Suppose $f:X \to (-\infty, +\infty]$ is a proper convex lower semicontinuous function (see [25] and [2] for a discussion of convex analysis) and fix x∈X. Then it is well known (see [2, Section 12.4]) that the function $$X \to (-\infty, +\infty]: y \mapsto f(y) + \frac{1}{2}\|x - y\|^2 \tag{14}$$

has a unique minimizer, which will be denoted by $P_f(x)$. The induced operator $P_f: X \to X$ is called the proximal mapping or proximity operator of $f$ (see [23]). Note that if $f$ is the indicator function of a set C (the indicator function $t_C$ is defined by $t_C(x)=0$ if x∈C and $t_C(x)=+\infty$ otherwise), then $P_f = P_C$. Thus, proximity operators are generalizations of projections.

The Douglas-Rachford Method

Figure 11:
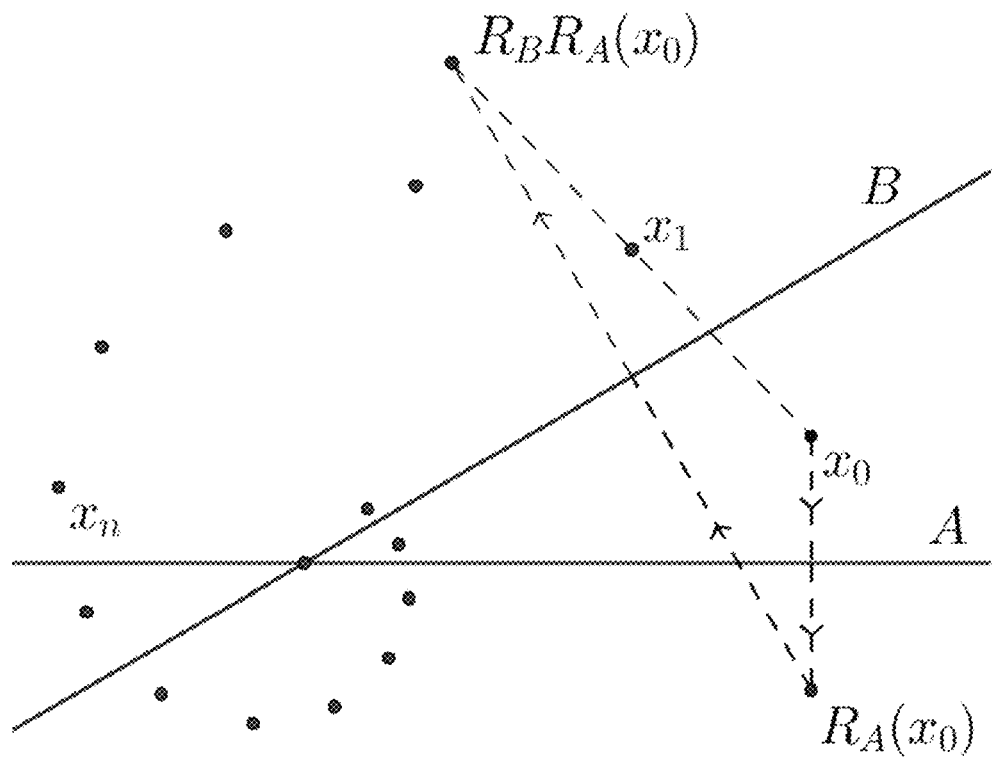
FIG. 11 shows the iterates of the DR method on two constraint sets A and B in accordance with one or more embodiments of the invention.

As proximity operators may be made available for several types of objective functions, any iterative optimization methods that utilize proximity operators (e.g., [7, 8, 21]) can be used to solve the corresponding problems. Let us describe one such method, the Douglas-Rachford (DR) splitting. DR emerged from the field of differential equations [14], and was later made widely applicable in other areas thanks to the seminal work [21]. FIG. 11 shows the iterates of the DR method on two constraint sets A and B in accordance with one or more embodiments of the invention.

Using indicator functions, (8) is converted into $$\min F(x) + t_{C_1} + t_{C_2} + \ldots + t_{C_J} \text{ subject to } x \in X. \tag{15}$$

So, it suffices to present DR for the following general problem $$\min \sum_{i=1}^{m} f_i(x) \text{ subject to } x \in X, \tag{16}$$

where each $f_i$ is a proper convex lower semicontinuous function on X. The DR operates in the product space $X:=X^m$ with inner product $\langle x,y \rangle := \sum_{i=1}^{m} \langle x_i, y_i \rangle$ for $x=(x_i)_{i=1}^{m}$ and $y=(y_i)_{i=1}^{m}$. Set the starting point $x_0=(z, \ldots, z) \in X$, where z∈X. Given $x_k=(x_{k,1}, \ldots, x_{k,m}) \in X$, one computes $$\bar{x}_k := \frac{1}{m} \sum_{i \in K} x_{k,i}, \tag{17}$$

$$\forall i \in \{1, \ldots, m\}: x_{k+1,i} := x_{k,i} - \bar{x}_k + P_{\gamma f_i}(2\bar{x}_k - x_{k,i}), \tag{18}$$

then update $x_{k+1} := (x_{k+1,1}, \ldots, x_{k+1,m})$. \tag{19}

Then the monitored sequence $(\bar{x}_k)_{k \in \mathbb{N}}$ converges to a solution of (16).

It is worth mentioning that when all $f_i$'s are indicator functions of the constraints (thus, all proximity operators become projections), then (16) becomes a pure feasibility problem. Therefore, all optimization methods for (16) can also be used for feasibility problems.

Parallelization

By using the indicator function, projections become a special case of proximity operators. Thus, the following remarks simply refer to proximity operators.

Remark 1 (Entries that Possibly Change after Executing a Proximity Operator)

Suppose $X=R^n$ and the objective function $f: X \to (-\infty, +\infty]$ only depends on certain entries, i.e., $f(x)=f((x_i)_{i \in I})$, where $I \subseteq \{1, 2, \ldots, n\}$ is a given index set.

Let $z=(z_1, \ldots, z_n) \in X$ and execute the proximity operator $P_f z$. It is obvious that after the execution, the coordinates that possibly change are $(z_i)_{i \in I}$; while all other coordinates $(z_i)_{i \notin I}$ are left unchanged, see, e.g., Method component 2 (projection onto an edge minimum slope constraint). Thus, for simplicity of the presentation, for each projection or proximity operator, one may often focus on the "possibly affected" coordinates $(z_i)_{i \in I}$ in the subspace $R^{|I|}$ where $|I|$ is the number of indices in I.

Remark 2 (Parallelization)

If two functions $f_1, f_2: X \to (-\infty, +\infty]$ are independent in the sense that they depend on separate coordinates, then one can execute their respective proximity operators in parallel. Therefore, one can pack multiple independent proximity operators to accelerate the convergence of the method.

Projections onto Linear Constraints

The following describes the projections found for the linear constraints that were defined in the problem formulation above. These closed-form projections ensure that the method will converge to a solution in a reasonable amount of time, using an iterative projection method.

By linear constraints, one refers to any constraint on the triangular mesh that can be represented by a system of linear equalities and inequalities. Indeed, this class includes several important constraints in design problems. In the sections that follow, those constraints will be analyzed.

Interval Constraint

Similar to [3, Section 2.2], one may assume that I is a subset of $\{1, 2, \ldots, n\}$ and $(l_i)_{i \in I}, (u_i)_{i \in I} \in R^I$ are given. Set $$Y:=\{z=(z_1,z_2,\ldots,z_n) \in X | \forall i \in I: l_i \leq z_i \leq u_i\}. \quad (20)$$

The closed set Y is an affine subspace, thus, convex. The following explicit formula is for the projection onto Y, whose proof is straightforward, thus, omitted.

Method Component 1 (Projection onto Interval Constraints)

$$P_Y: X \to X: (z_1, z_2, \ldots, z_n) \mapsto (x_1, x_2, \ldots, x_n), \quad (21)$$

$$\text{where } x_i = \begin{cases} \max\{l_i, \min\{u_i, z_i\}\} & i \in I \\ z_i, & i \in \{1, 2, \ldots, n\} \setminus I \end{cases}. \quad (22)$$

Edge Minimum Slope Constraint

Let $P_i=(p_{i1}, p_{i2}, h_i)$ and $P_j=(p_{j1}, p_{j2}, h_j)$. The designer may require that the (directional) slope from $P_j$ to $P_i$ must be no less than a threshold level $s_{ij}$. More specifically, since the value $p_{i1}, p_{i2}, p_{j1}, p_{j2}$ are fixed, one can write this constraint as $$h_i - h_j \geq \alpha_{ij} := s_{ij}\sqrt{(p_{i1}-p_{j1})^2+(p_{i2}-q_{j2})^2}, \quad (23)$$

which is called the edge minimum slope constraint. This constraint is a linear inequality, thus, convex. Projection on to this type of constraint is derived analogously to [3, Section 2.3], thus, its proof is also omitted.

Method Component 2 (Projection onto an Edge Minimum Slope Constraint)

Let $$E_{i,j}=\{x=(x_1,x_2,\ldots,x_n) \in R^n | x_i - x_j \geq \alpha_{ij}\} \quad (24)$$

be the minimum slope constraint on the edge $P_i P_j$. Let $x:=(x_1, \ldots, x_n):=P_{E_{i,j}} z$ be the projection of a point $z=(z_1, z_2, \ldots, z_n)$ on to $E_{i,j}$. Then $$x_i = \frac{1}{2}(z_i + z_j + \max\{z_i - z_j, \alpha_{ij}\}), \quad (25)$$

$$x_j = \frac{1}{2}(z_i + z_j - \max\{z_i - z_j, \alpha_{ij}\}), \text{ and} \quad (26)$$

$$x_k = z_k \text{ for all } k \notin \{i, j\}. \quad (27)$$

Low Point Constraint

A point $P_j=(p_{j1}, p_{j2}, z_j)$ on the mesh is called a low point if each point $P_i=(p_{i1}, p_{i2}, z_i)$ connected to $P_j$ satisfies the edge minimum slope constraint $$z_i - z_j \geq \alpha_i := s_i \sqrt{(p_{i1}-p_{j1})^2+(p_{i2}-q_{j2})^2}, \quad (28)$$

where all $s_i \in R$ are given.

Figure 12:
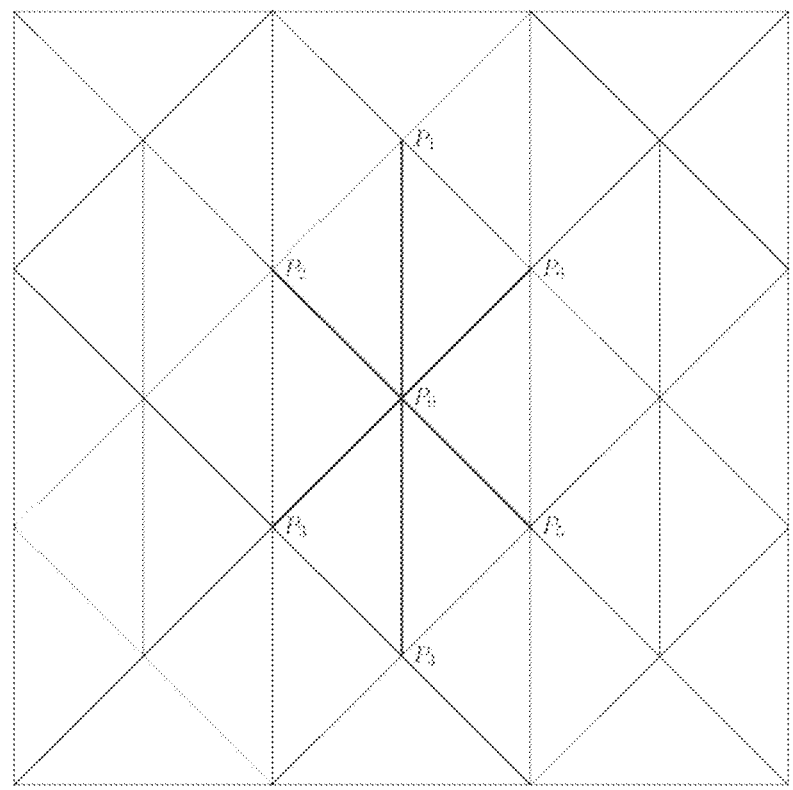
FIG. 12 shows a triangular mesh from a birds-eye view in accordance with one or more embodiments of the invention.

FIG. 12 shows a triangular mesh from a birds-eye view, where the low point $P_0$ is connected to points $P_1, P_2, P_3, P_4, P_5,$ and $P_6$. So in this picture, one requires that $P_0$ is lower than all its connected points and that the slopes on each connecting edge i is at least $s_i$.

One can treat the low point constraint as a single constraint even though it is the intersection of finitely many edge slope constraints. The following result shows how to project onto this constraint.

Method Component 3 (Projection onto a Low Point Constraint)

Let $\alpha_2, \ldots, \alpha_m \in R$. Define the set $$E:=\{(x_1, \ldots, x_m) \in R^m | \forall i \in \{2, \ldots, m\}: x_i - x_1 \geq \alpha_i\}. \quad (29)$$

Let $z=(z_1, \ldots, z_m) \in R^m$. Let $\delta_1 = z_1$ and let $\delta_2 \leq \delta_3 \leq \ldots \leq \delta_m$ be the values $\{z_i - \alpha_i\}_{i \in \{2, \ldots, m\}}$ in nondecreasing order. Let k be the largest number in $\{1, \ldots, m\}$ such that $\delta_k \leq (\delta_1 + \ldots + \delta_k)/k$. Then the projection $x:=(x_1, x_2, \ldots, x_m):=P_E z$ is given by $$x_1=(\delta_1+\ldots+\delta_k)/k \text{ and } x_i=\max\{x_1,z_i-\alpha_i\}+\alpha_i, \forall i \in \{2,\ldots,m\}. \quad (30)$$

To show this formula, first, x is the solution of $$\min(x_1-z_1)^2+\ldots+(x_m-z_m)^2 \quad (31)$$

$$\text{s.t } x_1-x_i+\alpha_i \leq 0, i \in \{2,\ldots,m\}. \quad (32)$$

Let $y:=(y_1, \ldots, y_m)$ where $y_1=x_1$ and $y_i:=x_i-\alpha_i$ for $i \in \{2, \ldots, m\}$. Without loss of generality, one may assume $\delta_i = z_i - \alpha_i$ for $i \in \{2, \ldots, m\}$. Then (4) becomes $$\min \phi(y):=(y_1-\delta_1)^2+\ldots+(y_m-\delta_m)^2 \quad (33)$$

$$\text{s.t } g_i(y):=y_1-y_i \leq 0, i \in \{2,\ldots,m\}. \quad (34)$$

To find the (unique) solution, we use Lagrange multipliers for convex optimization: there exist $\lambda_i \geq 0, \lambda \in \{2, \ldots, m\}$, such that $$\frac{1}{2}\nabla\phi(y) + \lambda_2 \nabla g_2(y) + \ldots + \lambda_m \nabla g_m(y) = 0 \quad (35)$$

$$\forall i \in \{2, \ldots, m\}: \lambda_i g_i(y) = 0 \quad (36)$$

$$\forall i \in \{2, \ldots, m\}: g_i(y) \leq 0. \quad (37)$$

It follows from (35) that $$(y_1-\delta_1)+\lambda_2+\ldots+\lambda_m=0 \quad (38)$$

$$(y_2-\delta_2)-\lambda_2=0 \quad (39)$$

$$\ldots \quad (40)$$

$$(y_m-\delta_m)-\lambda_m=0. \quad (41)$$

Then $y_1 \leq \delta_1$ because $\lambda_2, \ldots, \lambda_m \geq 0$. By substitution, one gets $$y_1+y_2+\ldots+y_m=\delta_1+\delta_2+\ldots\delta_m. \quad (42)$$

Next, for each $i \in \{2, \ldots, m\}$, one has $y_i-\delta_i=\lambda_i \geq 0$, $y_i-y_1 \geq 0$, and (36) implies, $$0=\lambda_i g_i(y)=(y_i-\delta_i)(y_1-y_i). \quad (43)$$

This leads to either $y_i=\delta_i \geq y_1$ or $y_1=y_i \geq \delta_i$. That means $$y_i=\max\{y_1,\delta_i\} \text{ for all } i \in \{2, \ldots, m\}. \quad (44)$$

So (42) becomes $$\delta_1+\delta_2+\ldots+\delta_m=y_1+\max\{y_1,\delta_2\}+\ldots+\max\{y_1,\delta_m\}. \quad (45)$$

Next, suppose k is the largest number in $\{1, \ldots, m\}$ such that $$\delta_k \leq (\delta_1+\ldots+\delta_k)/k. \quad (46)$$

The choice of k is always possible since at least (46) is true for k=1. Now setting $\delta_{m+1}=+\infty$, one claims that $$(\delta_1+\ldots+\delta_k)/k<\delta_{k+1}. \quad (47)$$

In fact, if k=m, then (47) clearly holds. If k<m, then by the choice of k, one has $\delta_1+\ldots+\delta_k+\delta_{k+1}<(k+1)\delta_{k+1}$, which implies $\delta_1+\ldots+\delta_k<k\delta_{k+1}$. So (47) holds. Next, one can show that $$\delta_k \leq y_1 \leq \delta_{k+1}. \quad (48)$$

Indeed, on the one hand, (46) and (45) imply $$k\delta_k + \delta_{k+1} + \ldots + \delta_m \leq (\delta_1 + \ldots + \delta_k) + \delta_{k+1} + \ldots + \delta_m \quad (49)$$

$$= y_1 + \max\{y_1, \delta_2\} + \ldots + \max\{y_1, \delta_m\} \quad (50)$$

$$\leq y_1 + \underbrace{\max\{y_1, \delta_k\} + \ldots + \max\{y_1, \delta_k\}}_{k-1 \text{ terms}} \quad (51)$$

$$+\max\{y_1, \delta_{k+1}\} + \ldots + \max\{y_1, \delta_m\} \quad (52)$$

$$= y_1 + (k-1)\max\{y_1, \delta_k\} + \max\{y_1, \delta_{k+1}\} + \ldots + \max\{y_1, \delta_m\}. \quad (53)$$

If $y_1 < \delta_k$, then (4) implies $$k\delta_k = y_1+(k-1)\max\{y_1,\delta_k\} < k\delta_k, \quad (54)$$

which is a contradiction. Thus, $y_1 \geq \delta_k$. On the other hand, (47) and (45) implies $$k\delta_{k+1} + \delta_{k+1} + \ldots + \delta_m \geq (\delta_1 + \ldots + \delta_k) + \delta_{k+1} + \ldots + \delta_m \quad (55)$$

$$= y_1 + \max\{y_1, \delta_2\} + \ldots + \max\{y_1, \delta_m\} \quad (56)$$

$$= y_1 + \underbrace{y_1 + \ldots + y_1}_{k-1 \text{ terms}} + \max\{y_1, \delta_{k+1}\} + \ldots + \max\{y_1, \delta_m\} \quad (57)$$

$$\geq ky_1 + \max\{y_1, \delta_{k+1}\} + \delta_{k+2} + \ldots + \delta_m. \quad (58)$$

If $y_1 > \delta_{k+1}$, then (55)-(58) implies $$(k+1)\delta_{k+1} \geq ky_1+\max\{y_1,\delta_{k+1}\}>(k+1)\delta_{k+1}, \quad (59)$$

which is a contradiction. Thus, $y_1 \leq \delta_{k+1}$. Therefore, the claim (48) is true. Then (45) implies $$\delta_1+\delta_2+\ldots+\delta_m=y_1+\max\{y_1,\delta_2\}+\ldots+\max\{y_1,\delta_m\}=ky_1+\delta_{k+1}+\ldots+\delta_m, \quad (60)$$

which leads to $y_1=(\delta_1+\ldots+\delta_k)/k$. Combining with (44) completes the proof.

Edge Alignment Constraint

Figure 13:
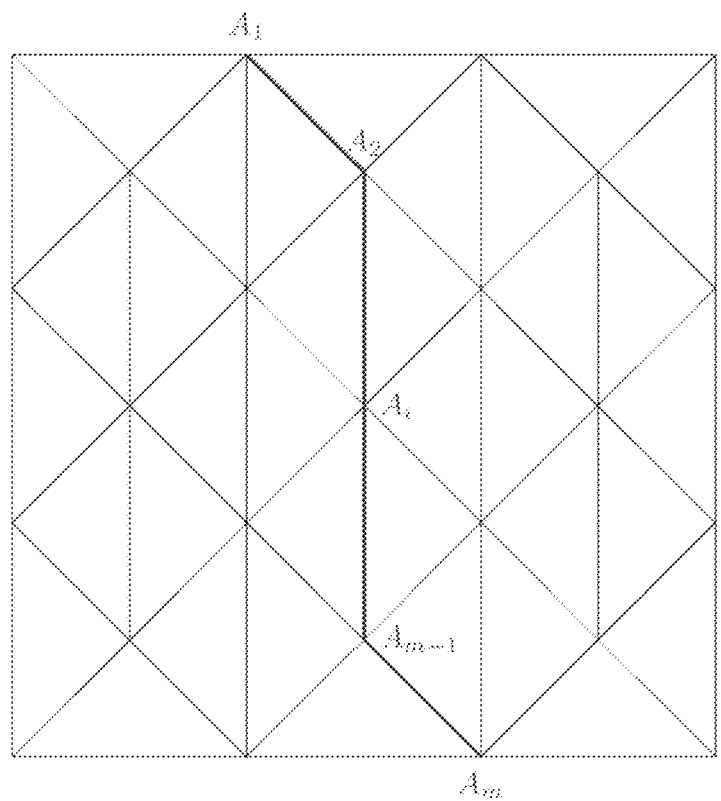
FIG. 13 shows the birds-eye view of a feature line on a triangular mesh in accordance with one or more embodiments of the invention.

On the triangular mesh, the designer may want a constant slope on a particular path, in which case one can say the path is "aligned". Such a path is sometimes called a feature line. To formulate this constraint, suppose the feature line is given by adjacent points $A_1, A_2, \ldots, A_m$ on the triangular mesh where $A_i=(a_{i1}, a_{i2}, x_i)$. FIG. 13 shows the birds-eye view of a feature line on a triangular mesh in accordance with one or more embodiments of the invention. For $A_i A_{i+1}$, the length of its "shadow" on the xy-plane is $$\delta_i:=(a_{i+1,1}-a_{i,1})^2+(a_{i+1,2}-a_{i,2})^2. \quad (61)$$

Define also $$t_1:=0, t_2:=\delta_1, t_3:=\delta_1+\delta_2, \ldots, t_m:=\delta_1+\ldots+\delta_{m-1}. \quad (62)$$

Then the alignment constraint is written as $$\forall i \in \{1, \ldots, m-2\}: (x_{i+1}-x_i)/(t_{i+1}-t_i)=(x_{i+2}-x_{i+1})/(t_{i+2}-t_{i+1}). \quad (63)$$

Method Component 4 (Projection onto an Edge Alignment Constraint)

Suppose the points $(a_{i1}, a_{i2})$, $i \in \{1, \ldots, m\}$ forms a path in $R^2$. Define $(t_1, \ldots, t_m)$ by (62) and define the convex set $$F:=\{(x_1,\ldots,x_m) \in R^m | ((a_{i1},a_{i2},x_i))_{i \in \{i,\ldots,m\}} \text{ satisfies } (63)\} \subset R^m. \quad (64)$$

Let $z=(z_1, \ldots, z_m) \in R^m$. Then the projection $P_F z$ is given by $$\forall i \in \{1, \ldots, m\}: (P_F z)_i = f(t_i). \quad (65)$$

where $f(t):=\alpha+\beta t$ is the least squares line for the points $(t_i, z_i)_{i \in \{1, \ldots, m\}}$. More specifically, $(\alpha, \beta)$ is obtained from the linear system $$\begin{bmatrix} m & \sum_{i=1}^{m} t_i \\ \sum_{i=1}^{m} t_i & \sum_{i=1}^{m} t_i^2 \end{bmatrix} \begin{bmatrix} \alpha \\ \beta \end{bmatrix} = \begin{bmatrix} \sum_{i=1}^{m} z_i \\ \sum_{i=1}^{m} t_i z_i \end{bmatrix} \quad (66)$$

To show this, first, F is convex since all constraints in (63) are linear. Next, one considers the points $(t_i, z_i)$ in $R^2$. The problem is to find $(x_1, \ldots, x_m)$ such that the points $(t_i, x_i)$ are aligned and $$\|x-z\|^2=\Sigma_{i=1}^m (x_i-z_i)^2 \text{ is minimized.} \quad (67)$$

Figure 14:
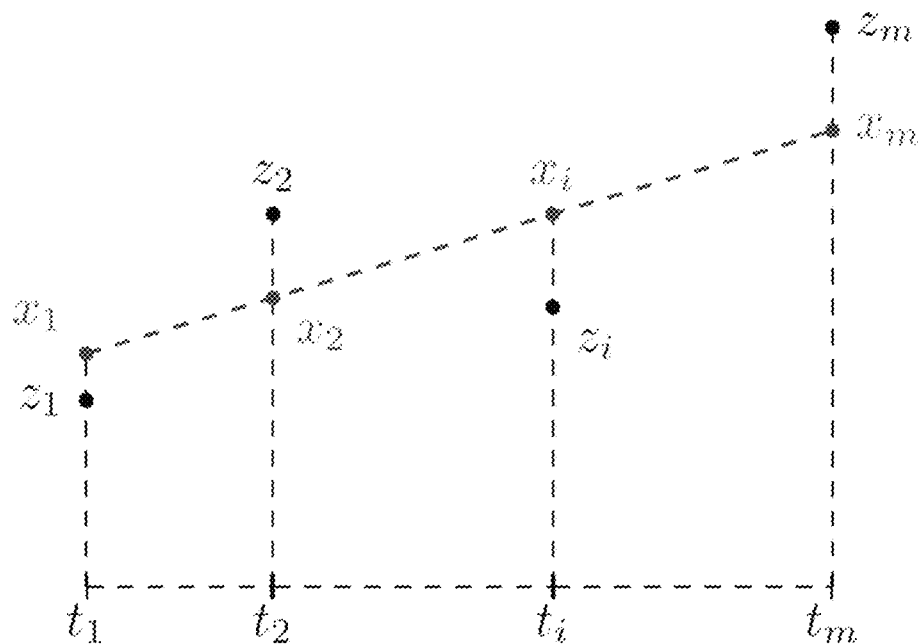
FIG. 14 illustrates a least squares problem in accordance with one or more embodiments of the invention.

This is the least squares problem for the points $(t_i, z_i)$, shown in FIG. 14. So the least squares line is $f(t)=\alpha+\beta t$ where $(\alpha, \beta)$ satisfies (66). Thus, the projection coordinates are $(P_F(z))_i=\alpha+\beta t_i$ for $i \in \{1, \ldots, m\}$.

Surface Alignment Constraint

The designer may want to patch several adjacent triangles on the mesh into a single polygon, in which case one may say that these triangles are "aligned". This is equivalent to require all vertices of the triangles to lie on the same plane. So the following may result.

Method Component 5 (Projection onto a Surface Alignment Constraint)

Let $(a_{i1}, a_{i2})$, $i \in \{1, \ldots, m\}$ be a collection of points in $R^2$ that are not on the same line. Define $$F := \{(x_1, \ldots, x_m) \in R^m \mid \{(a_{i1}, a_{i2}, x_i)\}_{i \in \{1, \ldots, m\}} \text{ lie on the same plane}\}. \quad (69)$$

Let $z = (z_1, \ldots, z_m) \in R^m$. Then the projection $P_F z$ is given by $$\forall i \in \{1, \ldots, m\} : (P_F z)_i = f(a_{i1}, a_{i2}). \quad (70)$$

where $f(t_1, t_2) := \alpha + \beta t_1 + \gamma t_2$ is the least squares plane for the points $(a_{i1}, a_{i2}, z_i)$, $i \in \{1, \ldots, m\}$. More specifically, $(\alpha, \beta, \gamma)$ is the solution of the system $$\begin{bmatrix} m & \langle e, a_1 \rangle & \langle e, a_1 \rangle \\ \langle e, a_1 \rangle & \|a_1\|^2 & \langle a_1, a_2 \rangle \\ \langle e, a_2 \rangle & \langle a_1, a_2 \rangle & \|a_2\|^2 \end{bmatrix} \begin{bmatrix} \alpha \\ \beta \\ \gamma \end{bmatrix} = \begin{bmatrix} \langle e, z \rangle \\ \langle a_1, z \rangle \\ \langle a_2, z \rangle \end{bmatrix}. \quad (71)$$

where $e = (1, 1, \ldots, 1)$, $a_1 = (a_{11}, a_{21}, \ldots, a_{m1})$, and $a_2 = (a_{12}, a_{22}, \ldots, a_{m2})$.

To show this, first, F is a convex set. Let $x = (x_1, \ldots, x_m) = P_F z$, then x minimizes $$\|x - z\|^2 = \Sigma_{i=1}^m (x_i - z_i)^2 \quad (72)$$

subject to the constraint that $\{(a_{i1}, a_{i2}, x_i)\}_{i \in \{1, \ldots, m\}}$ lie on the same plane in $R^3$. Thus, it is equivalent to find the least squares plane $f(t_1, t_2) = \alpha + \beta t_1 + \gamma t_2$ that fits $\{(a_{i1}, a_{i2}, z_i)\}_{i \in \{1, \ldots, m\}}$. One defines e, $a_1$, $a_2$ as above, then $(\alpha, \beta, \gamma)$ is the solution of (71). Since $\{(a_{i1}, a_{i2})\}_{i \in \{1, \ldots, m\}}$ are not on the same line, (71) has a unique solution $(\alpha, \beta, \gamma)$. Finally, one computes $x_i = \alpha + \beta a_{i1} + \gamma a_{i2}$ for $i \in \{1, \ldots, m\}$.

Projections onto General Surface Slope Constraints

Surface slope constraints are any requirement imposed on the slope of a triangle. In this section, a general setup is provided for projections onto such constraints.

Normal Vector and Surface Slope Constraint

Let $(e_1, e_2, e_3)$ be the standard basis of $R^3$. Given three points $P_1 = (p_{11}, p_{12}, h_1)$, $P_2 = (p_{21}, p_{22}, h_2)$, and $P_3 = (p_{31}, p_{32}, h_3)$ in $R^3$, the normal vector to the plane $P_1 P_2 P_3$ is the cross product $$\vec{n} = \begin{bmatrix} p_{11} - p_{31} \\ p_{12} - p_{32} \\ h_1 - h_3 \end{bmatrix} \times \begin{bmatrix} p_{21} - p_{31} \\ p_{22} - p_{32} \\ h_2 - h_3 \end{bmatrix} =: \begin{bmatrix} a_1 \\ b_1 \\ t_1 \end{bmatrix} \times \begin{bmatrix} a_2 \\ b_2 \\ t_2 \end{bmatrix} = \begin{bmatrix} b_1 t_2 - b_2 t_1 \\ a_2 t_1 - a_1 t_2 \\ a_1 b_2 - a_2 b_1 \end{bmatrix} \quad (73)$$

The "shadows" of $P_1$, $P_2$, $P_3$ on xy-plane are $(p_{11}, p_{12})$, $(p_{21}, p_{22})$, $(p_{31}, p_{32})$, which are not on the same line. This implies $a_1 b_2 - a_2 b_1 \neq 0$. So one can rescale and use $$\vec{n} = \left( \frac{b_1 t_2 - b_2 t_1}{a_1 b_2 - a_2 b_1}, -\frac{a_1 t_2 - a_2 t_1}{a_1 b_2 - a_2 b_1}, 1 \right). \quad (74)$$

If one defines $$u = \frac{b_2 t_1 - b_1 t_2}{a_1 b_2 - a_2 b_1} \text{ and } v = \frac{a_1 t_2 - a_2 t_1}{a_1 b_2 - a_2 b_1},$$

then $$t_1 = a_1 u + b_1 v, \, t_2 = a_2 u + b_2 v, \text{ and } \vec{n} = (-u, -v, 1). \quad (75)$$

Obviously, surface slope constraints depend solely on the normal vector $\vec{n}$. Thus, one can represent a general surface slope constraint in the form $$g(u, v) \leq 0. \quad (76)$$

An important case of such constraints is the surface orientation constraint below.

Definition 1 (surface orientation constraint) Let $\Delta$ be a triangle with normal vector $\vec{n} = (-u, -v, 1) \in R^3$ as above. Let $\vec{q} = (q_1, q_2, q_3) \in R^3 \setminus \{0\}$ be a unit vector and $\theta$ be an angle in $[0, \pi]$, the constraint $$\angle(\vec{n}, \vec{q}) \leq \theta, \text{ or equivalently,} \quad (77)$$

$$\cos \angle(\vec{n}, \vec{q}) = \frac{-u q_1 - v q_2 + q_3}{\sqrt{u^2 + v^2 + 1}} \geq \cos \theta,$$

is called the surface orientation constraint specified by the pair $(\vec{q}, \theta)$. Below is a description of the general framework for projection onto general surface slope constraints, followed by considerations of two special surface orientation constraints: the surface maximum slope constraint and the surface oriented minimum slope constraint.

Projection onto a General Surface Slope Constraint

Consider a single triangle determined by three points $Q_1 = (p_{11}, p_{12}, w_1)$, $Q_2 = (p_{21}, p_{22}, w_2)$, and $Q_3 = (p_{31}, p_{32}, w_3)$ in $R^3$. Without loss of generality, one may assume $$w_1 + w_2 + w_3 = 0. \quad (78)$$

Projecting onto an orientation constraint is to find the new heights $h_1$, $h_2$, $h_3$ that minimizes $$\phi := (h_1 - w_1)^2 + (h_2 - w_2)^2 + (h_3 - w_3)^2 \quad (79)$$

such that the new points $P_1 = (p_{11}, p_{12}, h_1)$, $P_2 = (p_{11}, p_{12}, h_2)$, and $P_3 = (p_{11}, p_{12}, h_3)$ satisfy the given orientation constraint. Define $t_1 := h_1 - h_3$ and $t_2 := h_2 - h_3$, then $$\phi = (t_1 + h_3 - w_1)^2 + (t_2 + h_3 - w_2)^2 + (h_3 - w_3)^2. \quad (80)$$

Using the change of variables (75), one has:

$$\phi = (a_1 u + b_1 v + h_3 - w_1)^2 + (a_2 u + b_2 v + h_3 - w_2)^2 + (h_3 - w_3)^2. \quad (81)$$

The new triangle $P_1 P_2 P_3$ needs to satisfy some given orientation constraint $g(u, v) \leq 0$. So the projection reduces to $$\min_{(u, v, h_3) \in R^3} \phi = \quad (82)$$

$$(a_1 u + b_1 v + h_3 - w_1)^2 + (a_2 u + b_2 v + h_3 - w_2)^2 + (h_3 - w_3)^2$$

subject to $g(u, v) \leq 0$. $\quad (83)$

Next, suppose that changing variables is necessary, for instance, $(u, v)$ is replaced by the new variables $(\hat{u}, \hat{v})$ under the linear transformation $$\begin{bmatrix} \hat{u} \\ \hat{v} \end{bmatrix} := Q \begin{bmatrix} u \\ v \end{bmatrix}, \text{ where } Q \text{ is an invertible matrix.} \quad (84)$$

One may also define $$\begin{bmatrix} \hat{a}_1 & \hat{b}_1 \\ \hat{a}_2 & \hat{b}_2 \end{bmatrix} := \begin{bmatrix} a_1 & b_1 \\ a_2 & b_2 \end{bmatrix} Q^{-1}.$$

Then $$\hat{a}_1\hat{u} + \hat{b}_1\hat{v} = \begin{bmatrix} \hat{a}_1 & \hat{b}_1 \end{bmatrix} \begin{bmatrix} \hat{u} \\ \hat{v} \end{bmatrix} = \begin{bmatrix} a_1 & b_1 \end{bmatrix} Q^{-1} Q \begin{bmatrix} u \\ v \end{bmatrix} = a_1 u + b_1 v, \text{ and} \quad (85)$$

$$\hat{a}_2\hat{u} + \hat{b}_2\hat{v} = a_2 u + b_2 v. \quad (86)$$

So (82)-(83) becomes $$\min_{(\hat{u},\hat{v},h_3)\in R^3} \phi = \quad (87)$$
$$(\hat{a}_1\hat{u} + \hat{b}_1\hat{v} + h_3 - w_1)^2 + (\hat{a}_2\hat{u} + \hat{b}_2\hat{v} + h_3 - w_2)^2 + (h_3 - w_3)^2$$

$$\text{subject to } \hat{g}(\hat{u},\hat{v}) := g(u,v) \leq 0, \quad (88)$$

Therefore, one can treat (87)-(88) as (82)-(83) with new respective coefficients $\hat{a}_i$, $\hat{b}_i$ Next, one can simplify the model (82)-(83). Since (83) does not involve $h_3$, one can convert problem (82)-(83) into two variables (u, v) as follows: first, set the derivative of φ with respect to $h_3$ to zero $$\nabla_{h_3}\phi(u,v,h_3) = 2(a_1 u + b_1 v + h_3 - w_1) + 2(a_2 u + b_2 v + h_3 - w_2) + 2(h_3 - w_3) = 0. (89)$$

Then one obtains $$h_3 = -\frac{1}{3}[(a_1 + a_2)u + (b_1 + b_2)v]. \quad (90)$$

Substituting into (82) and multiplying by 9, one obtains $$9\phi = [(2a_1 - a_2)u + (2b_1 - b_2)v - 3w_1]^2 \quad (91)$$
$$+ [(2a_2 - a_1)u + (2b_2 - b_1)v - 3w_2]^2 \quad (92)$$
$$+ [(a_1 + a_2)u + (b_1 + b_2)v - 3(w_1 + w_2)]^2 \quad (93)$$
$$= :(6a_1^2 + 6a_2^2 - 6a_1 a_2)u^2 + (6b_1^2 + 6b_2^2 - 6b_1 b_2)v^2 \quad (94)$$
$$+ 6(2a_1 b_1 + 2a_2 b_2 - a_1 b_2 - a_2 b_1)uv \quad (95)$$
$$- 18(a_1 w_1 + a_2 w_2)u - 18(b_1 w_1 + b_2 w_2)v + Z. \quad (96)$$

where Z is some constant. So, by defining $$A = 2(a_1^2 + a_2^2 - a_1 a_2) > 0, \quad (97)$$
$$B = 2(b_1^2 + b_2^2 - b_1 b_2) > 0, \quad (98)$$
$$C = 2a_1 b_1 + 2a_2 b_2 - a_1 b_2 - a_2 b_1, \quad (99)$$
$$w_a = 3(a_1 w_1 + a_2 w_2), \quad (100)$$
$$w_b = 3(b_1 w_1 + b_2 w_2), \quad (101)$$

one has $9\phi = 3Au^2 + 3Bv^2 + 6Cuv - 6w_a u - 6w_b v + Z$. Thus, (82)-(83) reduces to $$\min_{(u,v)\in R^2} \phi(u,v) = \frac{A}{2}u^2 + Cuv + \frac{B}{2}v^2 - w_a u - w_b v \quad (102)$$

$$\text{subject to } g(u,v) \leq 0. \quad (103)$$

As long as one can find the solution (u, v), one can obtain the projection $(h_1, h_2, h_3)$ from (90), (75), and (73). More specifically, $$h_3 = -\frac{1}{3}[(a_1 + a_2)u + (b_1 + b_2)v], \quad (104)$$

$$h_1 = a_1 u + b_1 v + h_3, \quad (105)$$

$$h_2 = a_2 u + b_2 v + h_3. \quad (106)$$

Due to (85)-(86), if new variables $(\hat{u}, \hat{v})$ are used, then one also has (104)-(106) in which $(a_i, b_i, u, v)$ is replaced by $(\hat{a}_i, \hat{b}_i, \hat{u}, \hat{v})$.

Projection onto Surface Maximum Slope Constraint

Figure 15:
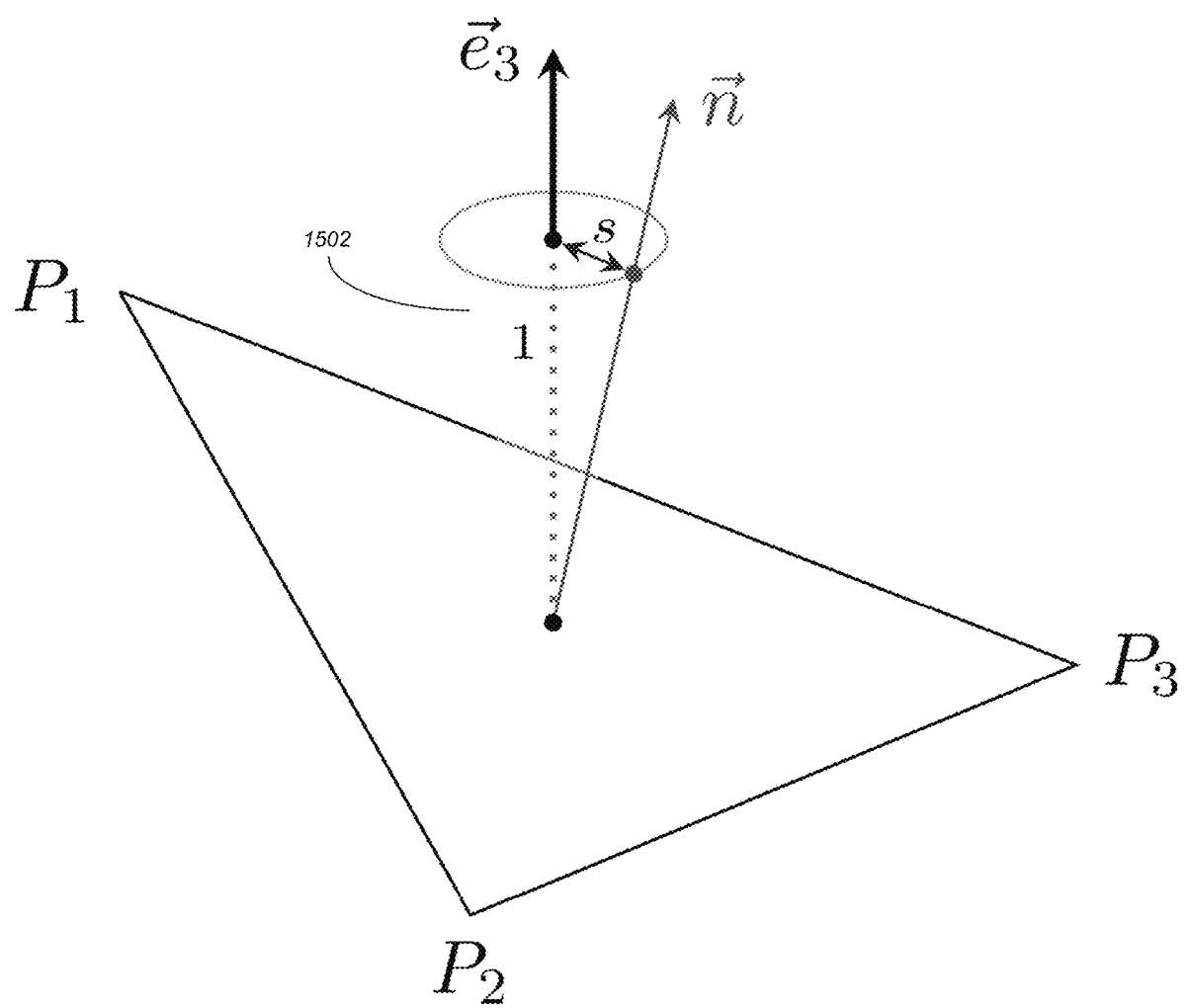
FIG. 15 illustrates a maximum angle for a normal vector of a ground plane with respect to gravity in accordance with one or more embodiments of the invention.

Let $P_1 P_2 P_3$ be a triangle in $R^3$ with normal vector $\vec{n} = (-u, -v, 1)$ obtained as in the normal vector and surface slope constraint section above. In certain cases, it is required that the angle between $\vec{n}$ and a given direction $\vec{q}$ must not exceed a given threshold. For example, suppose $P_1 P_2 P_3$ represents the desired ground, that cannot be too steep with respect to gravity, i.e., the slope of the plane $P_1 P_2 P_3$ must not exceed a threshold $s := s_{max} \in R_+$. Then the angle between $\hat{n}$ and $e_3 = (0,0,1)$ must satisfy $\angle(\hat{n}, e_3) \leq \tan^{-1}(s)$, which is shown as cone 1502 in FIG. 15. Accordingly, FIG. 15 illustrates a maximum angle for a normal vector of a ground plane with respect to gravity in accordance with one or more embodiments of the invention. Thus, whenever the normal vector $\vec{n}$ is outside the cone 1502, the constraint is violated. The inequality $\angle(\vec{n}, e_3) \leq \tan^{-1}(s)$ is equivalent to $$\cos \angle(\vec{n}, e_3) = \langle \vec{n}, e_3 \rangle / \|\vec{n}\| \geq \cos(\tan^{-1}(s)) = 1/\sqrt{1+s^2}. \quad (107)$$

Definition 2 (surface maximum slope constraint) One calls (107) the surface maximum slope constraint with maximum slope s. This is a special case of surface orientation constraint where $(\vec{q}, \theta) = (e_3, \tan^{-1}(s))$. From (107), one may conclude $$\frac{1}{\sqrt{u^2 + v^2 + 1}} \geq \frac{1}{\sqrt{1 + s^2}} \Leftrightarrow u^2 + v^2 - s^2 \leq 0. \quad (108)$$

Using the general model (102)-(103) with the constants defined by (97)-(101), projection onto the surface maximum slope constraint reduces to $$\min_{(u,v)\in R^2} \phi = \frac{A}{2}u^2 + Cuv + \frac{B}{2}v^2 - w_a u - w_b v \quad (109)$$

$$\text{subject to } u^2 + v^2 - s^2 \leq 0, \quad (110)$$

Rescaling by $$(u, v, w_a, w_b) \leftarrow \left(\frac{u}{s}, \frac{v}{s}, \frac{w_a}{s}, \frac{w_b}{s}\right),$$

one can obtain an equivalent problem $$\min_{(u,v)\in R^2} \phi(u,v) = \frac{A}{2}u^2 + Cuv + \frac{B}{2}v^2 - w_a u - w_b u \quad (111)$$

$$\text{subject to } g(u,v) := u^2 + v^2 - 1 \leq 0. \quad (112)$$

Hence, the projection to the surface maximum slope constraint will find new elevations for the triangle vertices, such that the angle between the z-axis and the normal vector of the triangle surface does not exceed $\tan^{-1}(s)$ (i.e. the normal vector lays in the cone 1502 depicted in FIG. 15), and that equation (79) is minimized.

This problem may be solved directly by several ways including numerical methods. One exemplary method is presented herein, in which the well-known Lagrange multipliers, also known as Karush-Kuhn-Tucker (KKT) conditions [19, 20], and Ferrari's method for quartic equations [16] are used. First, one observes the following:

1. $\phi(u, v)$ is a strictly convex quadratic surface.
2. For each value $\eta \geq 0$, the level set $\phi(u, v) = \eta$ is an ellipse in $R^2$ whose center is the vertex $(u_0, v_0)$ of $\phi(u, v)$, which satisfies $$Au_0 + Cv_0 = w_a \tag{113}$$

$$Cu_0 + Bv_0 = w_b. \tag{114}$$

3. This is minimizing a strictly convex function over a closed, bounded, convex set. Thus, there exists a unique solution.

One may consider two cases:

Case 1: $g(u_0, v_0) \leq 0$. Then $(u_0, v_0)$ is the solution of (111)-(112).

Figure 16:
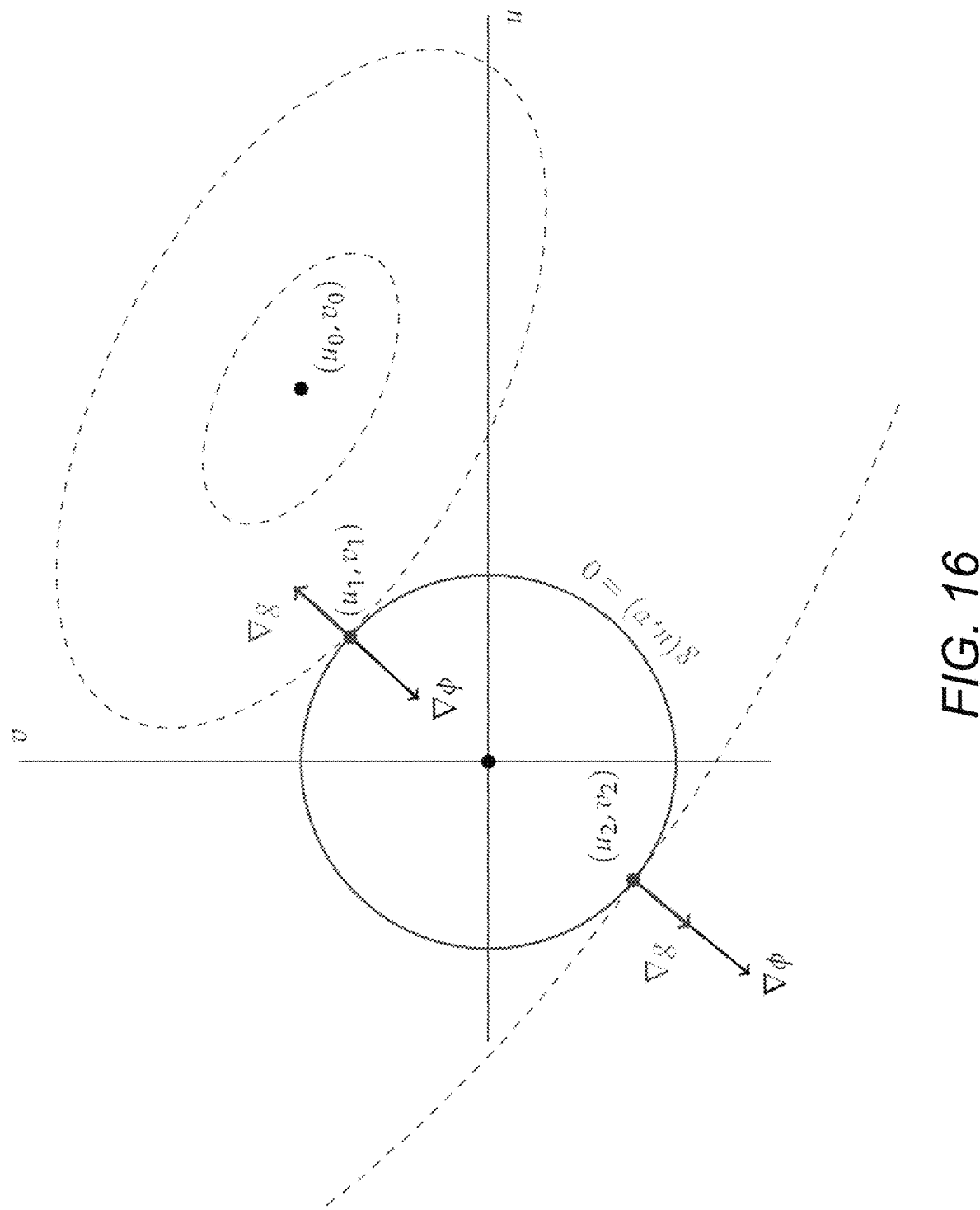
FIG. 16 illustrates an optimal solution based on tangent points between a circle and level sets in accordance with one or more embodiments of the invention.

Case 2: $g(u_0, v_0) > 0$. Then the solution of (111)-(112) is the tangent point of the circle $g(u, v) = 0$ and the smallest elliptical level set $\phi(u, v) = r$ that intersects the circle (see FIG. 16). Accordingly, FIG. 16 illustrates an optimal solution based on tangent points between a circle and level sets. To find the maximizers/minimizers, one considers the following Lagrange multipliers system $$\nabla_u \phi(u, v) + \frac{\lambda}{2} \nabla_u g(u, v) = 0, \tag{115}$$

$$\nabla_u \phi(u, v) + \frac{\lambda}{2} \nabla_v g(u, v) = 0, \tag{116}$$

$$u^2 + v^2 - 1 = 0. \tag{117}$$

Using the geometry of $R^2$ (see FIG. 16) and the theory of Lagrange multipliers, one can obtain the below properties.

Consider problem (111)-(112) and its Lagrange multipliers system (115)-(117). Suppose the solution $(u_0, v_0)$ of (113)-(114) satisfies $g(u_0, v_0) > 0$. Then 1. (115)-(117) yields a unique solution $(u_1, v_1, \lambda_1)$ such that $\lambda_1 > 0$; and in this case, $(u_1, v_1)$ is the unique solution of (111)-(112).

2. (115)-(117) yields at least one solution $(u_2, v_2, \lambda_2)$ such that $\lambda_2 < 0$.

Therefore, one seeks a solution $(u, v, \lambda)$ of (115)-(117) with $\lambda > 0$. First, (115) and (116) yield $$(A+\lambda)u + Cv = w_a \tag{118}$$

$$Cu + (B+\lambda)v = w_b. \tag{119}$$

Using the Cauchy-Schwarz inequality, one has $$AB = [a_1^2 + a_2^2 + (a_1-a_2)^2][b_1^2 + b_2^2 + (b_1-b_2)^2] \tag{120}$$

$$\geq [a_1b_1 + a_2b_2 + (a_1-a_2)(b_1-b_2)]^2 = C^2. \tag{121}$$

Since $A, B, \lambda > 0$, the determinant of (118)-(119) is $$(A+\lambda)(B+\lambda) - C^2 > AB - C^2 > 0. \tag{122}$$

This implies the system (118)-(119) has a unique solution $$u = \frac{w_a(B+\lambda) - w_b C}{(A+\lambda)(B+\lambda) - C^2} = \frac{\lambda w_a + w_a B - w_b C}{\lambda^2 + (A+B)\lambda + AB - C^2}, \tag{123}$$

$$v = \frac{w_b(A+\lambda) - w_a C}{(A+\lambda)(B+\lambda) - C^2} = \frac{\lambda w_b + w_b A - w_a C}{\lambda^2 + (A+B)\lambda + AB - C^2}, \tag{124}$$

Next, substituting u and v into (117) yields $$[\lambda^2 + (A+B)\lambda + AB - C^2]^2 \tag{125}$$

$$= [w_a\lambda + (w_aB - w_bC)]^2 + [w_b\lambda + (w_bA - w_aC)]^2 \tag{126}$$

$$= (w_a^2 + w_b^2)\lambda^2 + 2(w_a^2B + w_b^2A - 2w_aw_bC)\lambda \tag{127}$$

$$+ (w_aB - w_bC)^2 + (w_bA - w_aC)^2. \tag{128}$$

Defining the constants accordingly, one may rewrite as $$(\lambda^2 + R_1\lambda + R_2)^2 = R_3\lambda^2 + 2R_4\lambda + R_5. \tag{129}$$

One can simply solve this equation by the classic Ferrari's method for quartic equations [9]. However, since there is a unique positive $\lambda$, one will find its explicit formula following Ferrari's technique. A real variable y is introduced $$(\lambda^2 + R_1\lambda + R_2 + y)^2 = R_3\lambda^2 + 2R_4\lambda + R_5 + 2(\lambda^2 + R_1\lambda + R_2)y + y^2 \tag{130}$$

$$= (R_3 + 2y)\lambda^2 + 2(R_4 + R_1y)\lambda + R_5 + 2R_2y + y^2. \tag{131}$$

One can choose y such that the right hand side is a perfect square in $\lambda$. Thus, the right hand side must have zero discriminant, i.e., $$[R_4 + R_1y]^2 - (R_3 + 2y)(R_5 + 2R_2y + y^2) = 0 \iff \tag{132}$$

$$-2y^3 + [R_1^2 - R_3 - 4R_2]y^2 + [2R_1R_4 - 2R_2R_3 - 2R_5]y + R_4^2 - R_3R_5 = 0. \tag{133}$$

This is a cubic equation in y, so Cardano's method [9] can be used to find one real solution $y_0$. Then (130)-(131) becomes $$(\lambda^2 + R_1\lambda + R_2 + y_0)^2 = (R_3 + 2y_0)\left(\lambda + \frac{R_4 + R_1y_0}{R_3 + 2y_0}\right)^2. \tag{134}$$

From the discussion above, this equation must have at least one positive and one negative solutions. Next, one solves for the (unique) positive $\lambda$:

Case 2a: $R_3 + 2y_0 < 0$. Then $$\lambda = -\frac{R_4 + R_1y_0}{R_3 + 2y_0}$$

is the unique value of $\lambda$, which is a contradiction. Thus, this case cannot happen.

Case 2b. $R_3 + 2y_0 = 0$. Then $$y_0 = -\frac{R_3}{2}$$

and $$\lambda^2 + R_1\lambda + R_2 + y_0 = 0. \tag{135}$$

So one has $$\lambda = \frac{1}{2}\left(-R_1 \pm \sqrt{R_1^2 - 4\left(R_2 - \frac{R_3}{2}\right)}\right) = \frac{1}{2}\left(-R_1 \pm \sqrt{R_1^2 - 4R_2 + 2R_3}\right). \quad (136)$$

Since there is only one positive $\lambda$, one takes $$\lambda = \frac{1}{2}\left(-R_1 + \sqrt{R_1^2 - 4R_2 + 2R_3}\right). \quad (137)$$

Case 2c: $R_3 + 2y_0 > 0$. Define $r := \sqrt{R_3 + 2y_0}$. From (134), $$(\lambda^2 + R_1\lambda + R_2 + y_0)^2 = \left(\lambda\sqrt{R_3 + 2y_0} + \frac{R_4 + R_1 y_0}{\sqrt{R_3 + 2y_0}}\right)^2 \quad (138)$$

$$= \left(\lambda r + \frac{R_4 + R_1 y_0}{r}\right)^2. \quad (139)$$

This leads to two quadratic equations in $\lambda$ $$\lambda^2 + (R_1 \pm r)\lambda + \left(R_2 + y_0 \pm \frac{R_4 + R_1 y_0}{r}\right) = 0. \quad (140)$$

Since there is only one positive $\lambda$, one must have $R_4 + R_1 y_0 \neq 0$. Otherwise, (140) consists of two quadratic equations that have constant term $R_2 + y_0$; thus, will yield an even number (possibly none) of positive solutions, which is a contradiction. Moreover, one must take the equation with negative constant term. So one sets $r \leftarrow r \cdot \text{sgn}(R_4 + R_1 y_0)$ and takes only the equation $$\lambda^2 + (R_1 - r)\lambda + \left(R_2 + y_0 - \frac{R_4 + R_1 y_0}{r}\right) = 0. \quad (141)$$

It follows that the positive $\Delta$ is $$\lambda = \frac{1}{2}\left[r - R_1 + \sqrt{(r - R_1)^2 - 4\left(R_2 + y_0 - \frac{R_4 + R_1 y_0}{r}\right)}\right]. \quad (142)$$

Next, one obtains $u$ and $v$ from (123)-(124) and then rescales variables $(u, v) \leftarrow (su, sv)$. Finally, one can use (104)-(106) to obtain $(h_1, h_2, h_3)$.

Projection onto Surface Oriented Minimum Slope Constraint

Nonconvex Surface Minimum Constraint

Let $P_1 P_2 P_3$ be a triangle with the normal vector $\vec{n} = (-u, -v, 1)$ as described above. In some cases, it is required that the angle $\angle(\vec{n}, \vec{q}) \geq \alpha$ for some given vector $\vec{q}$ and number $\alpha$.

This happens, for example, if $P_1 P_2 P_3$ must have a slope at least $s := s_{min} \in R_+$. In this case, the angle between $\vec{n}$ and $e_3 = (0,0,1)$ satisfies $$\angle(\vec{n}, e_3) \geq \tan^{-1}(s). \quad (143)$$

If one considers FIG. 15 again, in this case, the normal vector needs to be outside of the cone 1502. The inequality $\angle(\vec{n}, e_3) \geq \tan^{-1}(s)$ is equivalent to $$\cos\angle(\vec{n}, e_3) = \frac{\langle \vec{n}, e_3 \rangle}{\|\vec{n}\|} \leq \cos(\tan^{-1}(s)) = \frac{1}{\sqrt{1 + s^2}}. \quad (144)$$

One can refer to (143) or (144) as the surface minimum slope constraint with minimum slope s. From (144), one has $$\frac{1}{\sqrt{u^2 + v^2 + 1}} \leq \frac{1}{\sqrt{1 + s^2}} \Leftrightarrow u^2 + v^2 - s^2 \geq 0. \quad (145)$$

This is clearly a nonconvex constraint in $(u, v)$. Despite the projection onto this constraint that is still available, nonconvexity may prevent iterative methods from convergence. Therefore, one will find a convex replacement for this constraint which can still guarantee (143)-(144).

The Surface Oriented Minimum Slope Constraint (143) implies the angle between $\vec{n}$ and the xy-plane satisfies $$\angle(\vec{n}, xy\text{-plane}) \leq (\pi/2) - \tan^{-1}(s). \quad (146)$$

Figure 17:
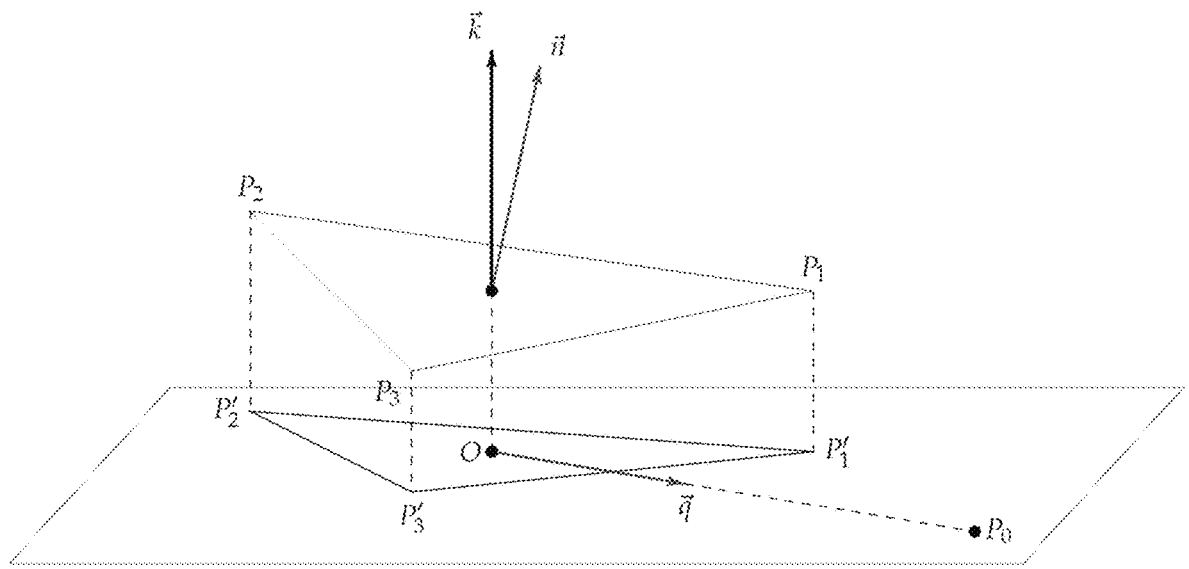
FIG. 17 illustrates a desired orientation ($\vec{q}$) of a normal vector ($\vec{n}$) for a triangle plane in accordance with one or more embodiments of the invention.

In some cases, it is not unreasonable to align the plane $P_1 P_2 P_3$ toward a given location/direction. For instance, in civil engineering drainage, the designer may want to direct the water to certain drains or inlets. Suppose one wants $P_1 P_2 P_3$ to incline toward a unit direction $\vec{q} = (q_1, q_2, 0) \in R^3$ (see FIG. 17). In this regard, FIG. 17 illustrates a desired orientation ($\vec{q}$) of a normal vector ($\underline{n}$) for a triangle plane. Then one can fulfill (146) by requiring $$\angle(\vec{n}, \vec{q}) \leq \frac{\pi}{2} - \tan^{-1}(s),$$

i.e., $$\cos\angle(\vec{n}, \vec{q}) = \frac{\langle \vec{n}, \vec{q} \rangle}{\|\vec{n}\|} \geq \cos\left(\frac{\pi}{2} - \tan^{-1}(s)\right) = \frac{s}{\sqrt{1 + s^2}} \quad (147)$$

and arrive at the following definition.

Definition 3 [surface oriented minimum slope constraint]. One calls (147) the surface oriented minimum slope constraint specified by $(\vec{q}, s)$, the unit vector $\vec{q}$ and the minimum slope s. This is a special case of the surface orientation constraint where $$(\vec{q}, \theta) = \left(\vec{q}, \frac{\pi}{2} - \tan^{-1}(s)\right).$$

Substituting $\vec{n} = (-u, -v, 1)$ and $\vec{q} = (q_1, q_2, 0)$ into (147), one has $$\frac{-q_1 u - q_2 v}{\sqrt{u^2 + v^2 + 1}} \geq \frac{s}{\sqrt{1 + s^2}}, \quad (148)$$

which is equivalent to $$q_1 u + q_2 v < 0, \quad (149)$$

$$u^2 + v^2 + 1 - \frac{1 + s^2}{s^2}(q_1 u + q_2 v)^2 \leq 0. \quad (150)$$

Figure 18:
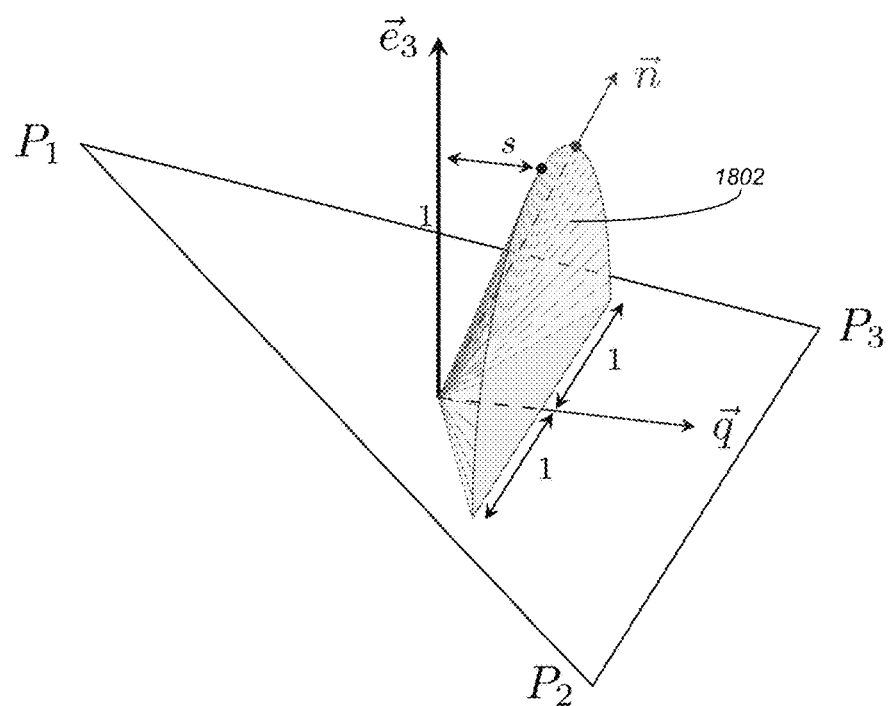
FIG. 18 illustrates a visualization of a surface minimum slope constraint in accordance with one or more embodiments of the invention.

This constraint not only guarantees surface minimum slope, but also generates a convex set in (u, v). A visualization of this finding is given in FIG. 18. In other words, FIG. 18 illustrates a visualization of a surface minimum slope constraint in accordance with one or more embodiments of the invention. The constraint requires that the normal vector lays on or inside the half cone 1802, whereas the direction vector q is the axis of the full cone.

Projection onto Surface Oriented Minimum Slope Constraint

By the model (82)-(83), the projection onto the surface oriented minimum slope constraint is $$\min_{(u,v)\in R^2} \phi(u, v, h_3) = \tag{151}$$
$$(a_1 u + b_1 v + h_3 - w_1)^2 + (a_2 u + b_2 v + h_3 - w_2)^2 + (h_3 - w_3)^2$$

subject to (149)–(150). (152)

Again, one solves (151)-(152) directly using Lagrange multipliers and Ferrari's method for quartic equations. First, define $$Q := \begin{bmatrix} q_1 & q_2 \\ q_2 & -q_1 \end{bmatrix},$$

then $Q^2$=Id since $\|\vec{q}\|=q_1^2+q_2^2=1$. So $Q=Q^T=Q^{-1}$. Next, the variables are changed $$\begin{bmatrix} \hat{u} \\ \hat{v} \end{bmatrix} := Q \begin{bmatrix} u \\ v \end{bmatrix} = \begin{bmatrix} q_1 u & q_2 v \\ q_2 u & -q_1 v \end{bmatrix} \Leftrightarrow \begin{bmatrix} u \\ v \end{bmatrix} = Q \begin{bmatrix} \hat{u} \\ \hat{v} \end{bmatrix} = \begin{bmatrix} q_1 \hat{u} & q_2 \hat{v} \\ q_2 \hat{u} & -q_1 \hat{v} \end{bmatrix}. \tag{153}$$

Then (150) becomes $$(q_1 \hat{u} + q_2 \hat{v})^2 + (q_2 \hat{u} - q_1 \hat{v})^2 + 1 - \left(1 + \frac{1}{s^2}\right)\hat{u}^2 = \tag{154}$$
$$\left(-\frac{1}{s^2}\right)\hat{u}^2 + \hat{v}^2 + 1 \leq 0.$$

Thus, the constraint (149)-(150) becomes $$\hat{u} < 0, \tag{155}$$

$$\hat{v}^2 - \frac{\hat{u}^2}{s^2} + 1 \leq 0, \tag{156}$$

Following the projections onto a general surface slope constraint described above, the coefficients are changed (without relabeling)

$$\begin{bmatrix} a_1 & a_2 \\ b_1 & b_2 \end{bmatrix} \leftarrow Q \begin{bmatrix} a_1 & a_2 \\ b_1 & b_2 \end{bmatrix} \tag{157}$$

and the following problem is obtained $$\min_{(\hat{u},\hat{v})\in R^2} \phi(\hat{u}, \hat{v}) = \frac{A}{2}\hat{u}^2 + C\hat{u}\hat{v} + \frac{B}{2}\hat{v}^2 - w_a \hat{u} - w_b \hat{v} \tag{158}$$

$$\text{subject to } \begin{cases} \hat{u} < 0, \\ \hat{v}^2 - \frac{\hat{u}^2}{s^2} + 1 \leq 0 \end{cases}. \tag{159}$$

where A, B, C, $w_a$, $w_b$ are defined below using the new $a_1$, $a_2$, $b_1$, $b_2$ from (157)

$$A=2(a_1^2 a_2^2 - a_1 a_2)>0, \tag{160}$$

$$B=2(b_1^2+b_2^2-b_1 b_2)>0, \tag{161}$$

$$C=2a_1 b_1 + 2a_2 b_2 - a_1 b_2 - a_2 b_1, \tag{162}$$

$$w_a=3(a_1 w_1 + a_2 w_2), \tag{163}$$

$$w_b=3(b_1 w_1 + b_2 w_2). \tag{164}$$

Changing variables by $$(u, v, A, B, w_b) \leftarrow \left(\frac{\hat{u}}{s}, \hat{v}, sA, \frac{B}{s}, \frac{w_b}{s}\right),$$

then (158)-(159) becomes $$\min_{(\hat{u},\hat{v})\in R^2} \phi(u, v) = \frac{A}{2}u^2 + Cuv + \frac{B}{2}v^2 - w_a u - w_b v \tag{165}$$

$$\text{subject to } \begin{cases} g_1(u, v) := u < 0, \\ g_2(u, v) := v^2 - u^2 + 1 \leq 0 \end{cases}. \tag{166}$$

Hence, the projection to the surface oriented minimum slope constraint will find new elevations for the triangle vertices, such that the angle between the normal vector of the triangle and the z-axis is at least $\tan^{-1}(s)$ and the angle between the normal vector and the directional vector q is at most $$\frac{\pi}{2} - \tan^{-1}(s),$$

and that equation (151) is minimized.

Before solving the above problem, one can observe that

1. The constraint (166) is one side of a hyperbola, thus, convex.
2. The objective $\phi(u, v)$ in (165) is a nonnegative strictly convex quadratic surface.
3. For each value $\eta \geq 0$, the level set $\phi(u, v)=\eta$ is an ellipse in $R^2$ whose center is the vertex $(u_0, v_0)$ of $\phi(u, v)$, which satisfies $$Au_0 + Cv_0 = w_a \tag{167}$$

$$Cu_0 + Bv_0 = w_b. \tag{168}$$

Figure 19:
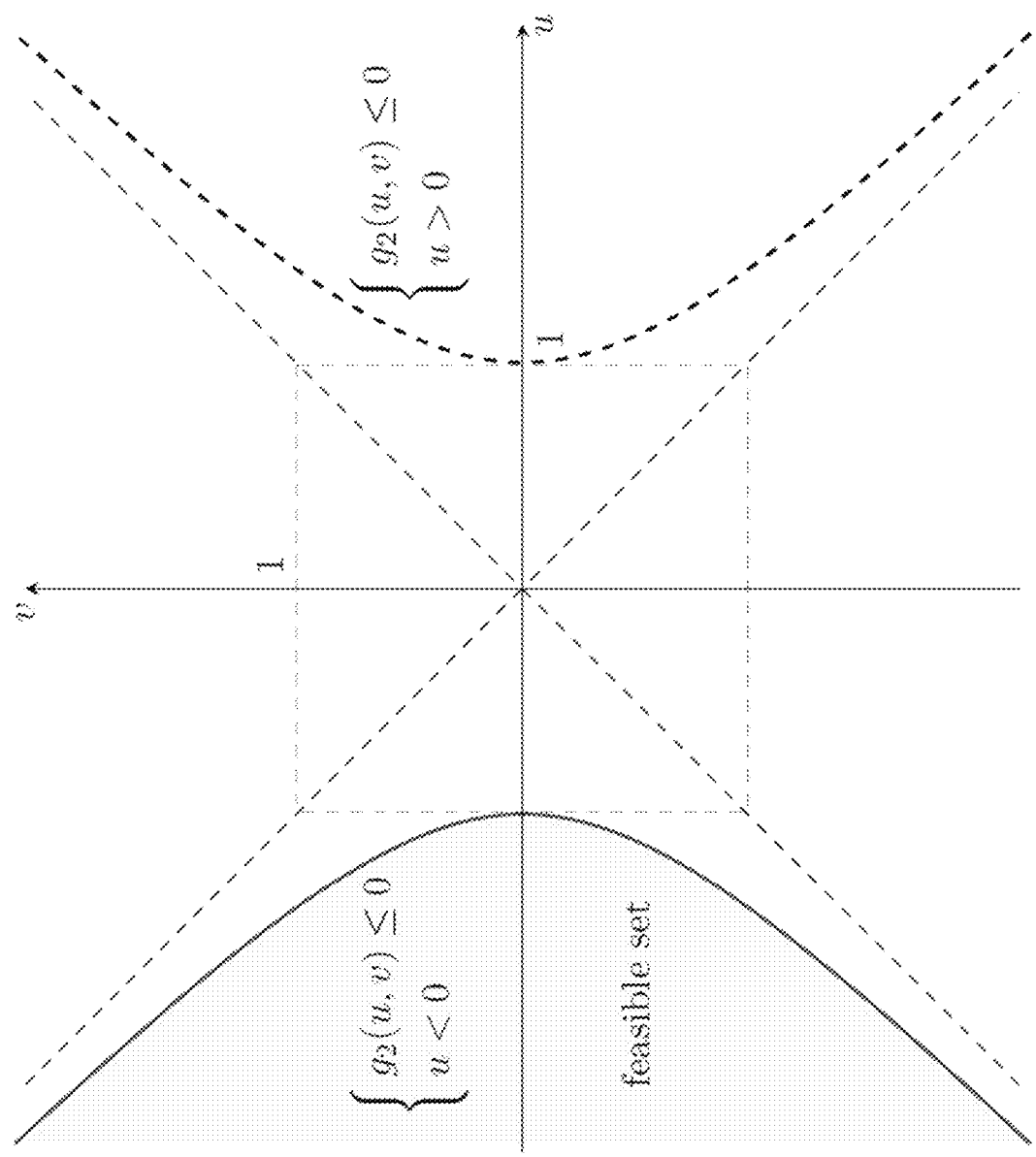
FIG. 19 illustrates a feasible set region for a normal vector with respect to a Surface Oriented Minimum Slope Constraint in accordance with one or more embodiments of the invention.

Therefore, (165)-(166) has a unique solution. To solve it, two cases are considered:

Case 1: $(u_0, v_0)$ is feasible, i.e., it lies inside or on the left branch $\{(u, v) \in R^2 | g_2(u, v)=0, u<\}$. Then it is the unique solution of (165)-(166) because the optimal objective value is zero. FIG. 19 illustrates a feasible set region for a normal vector with respect to a Surface Oriented Minimum Slope Constraint in accordance with one or more embodiments of the invention.

Case 2: $(u_0, v_0)$ is not feasible. Let (u, v) be a solution to (165)-(166). By Lagrange multipliers, there exists $\lambda>0$ such that $$\nabla_u \phi(u,v) + \frac{\lambda}{2}\nabla_u g_2(u,v) = 0, \quad (169)$$

$$\nabla_v \phi(u,v) + \frac{\lambda}{2}\nabla_v g_2(u,v) = 0, \quad (170)$$

$$g_2(u,v) = v^2 - u^2 + 1 = 0, \quad (171)$$

$$g_1(u,v) = u < 0. \quad (172)$$

Consider the system of three equations (169)-(171). Using the geometry of $R^2$ (see FIGS. 20 and 21), one may conclude that it has at least two solutions. To describe its solutions, let $(u_0, v_0)$ be defined by (167)-(168), then 1. If $g_2(u_0, v_0) > 0$, then (169)-(171) has a unique solution $(u_1, v_1, \lambda_1)$ with $\lambda_1 > 0$ and $u_1 < 0$, and a unique solution $(u_2, v_2, \lambda_2)$ with $\lambda_2 > 0$ and $u_2 > 0$.

2. If $g_2(u_0, v_0) \leq 0$ and $g_1(u_0, v_0) = u > 0$, then (169)-(171) has a unique solution $(u_1, v_1, \lambda_1)$ with $\lambda_1 > 0$. Thus, $u_1 < 0$. In addition, (169)-(171) also has at least one solution $(u_2, v_2, \lambda_2)$ with $\lambda_2 < 0$.

3. In both cases 1 and 2, $(u_1, v_1, \lambda_1)$ is the unique solution of the whole Lagrange system (169)-(172), thus, $(u_1, v_1)$ is the unique solution of (165)-(166).

To prove the above conclusion, suppose $(u, v, \lambda)$ is a solution of (169)-(171), then $(u, v)$ is the tangent point of the hyperbola $v^2 - u^2 + 1 = 0$ and an elliptical level set of $\phi(u, v)$.

Figure 20:
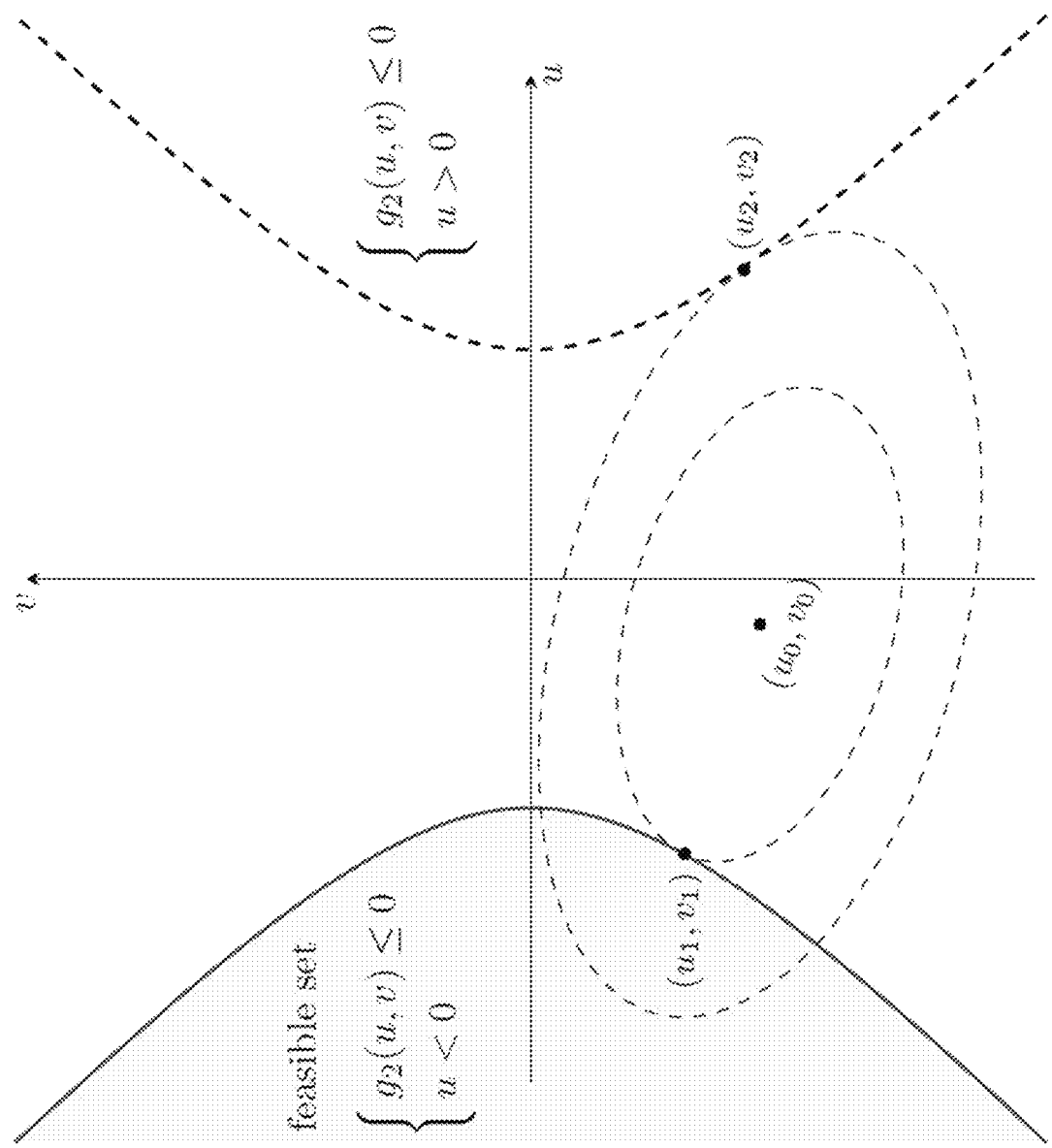
FIG. 20 shows that there are exactly two tangent points (u, v) with positive Lagrange multipliers $\lambda$, one of which has u<0 and the other has u>0 in accordance with one or more embodiments of the invention.

FIG. 20 shows that there are exactly two tangent points $(u, v)$ with positive Lagrange multipliers $\lambda$, one of which has $u < 0$ and the other has $u > 0$ in accordance with one or more embodiments of the invention. This justifies conclusion 1.

Figure 21:
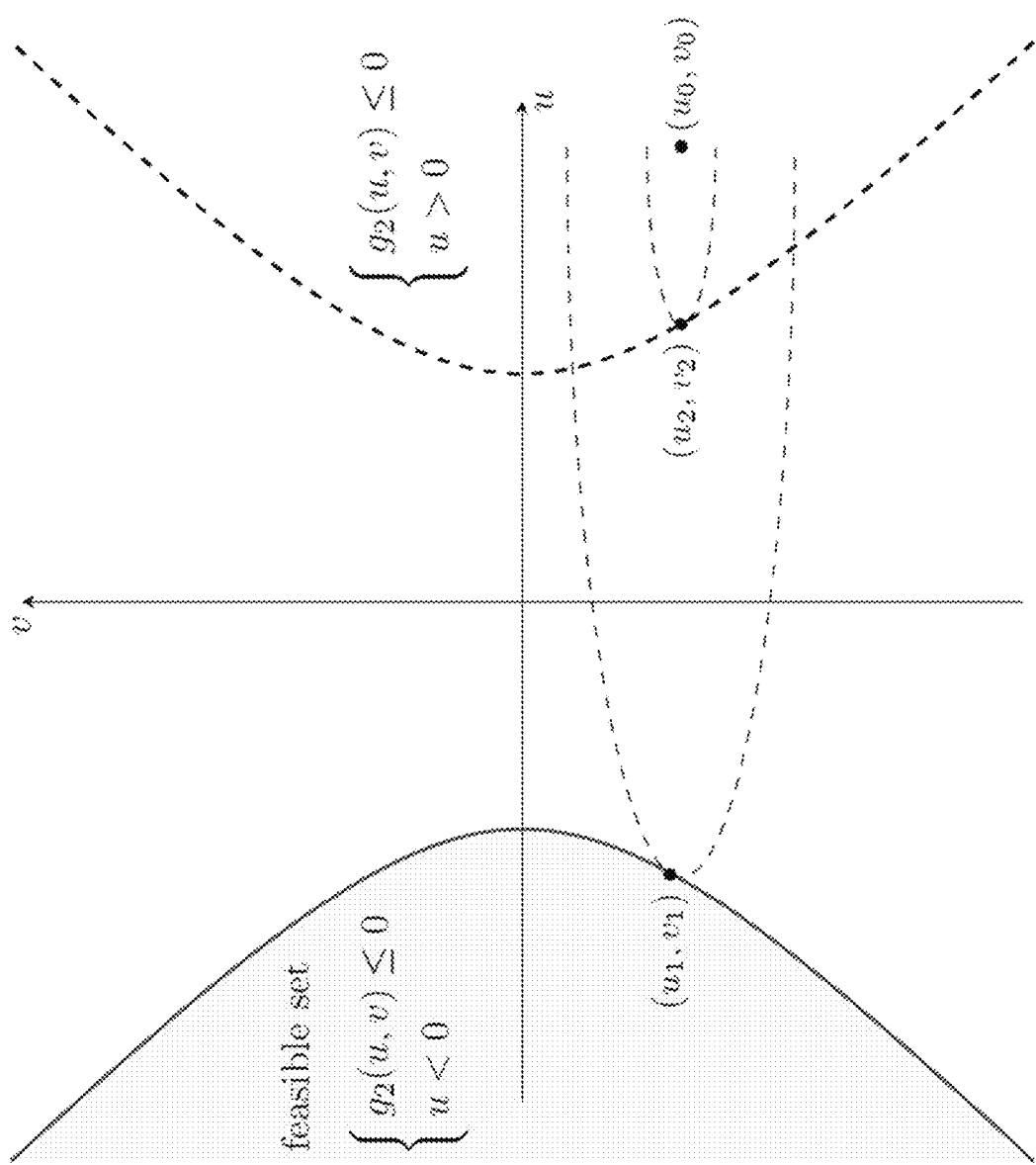
FIG. 21 shows that there is exactly one tangent point (u, v) with a positive Lagrange multiplier $\lambda$ and u>0, and at least one tangent point with a nonpositive Lagrange multiplier in accordance with one or more embodiments of the invention.

FIG. 21 shows that there is exactly one tangent point $(u, v)$ with a positive Lagrange multiplier $\lambda$ and $u > 0$, and at least one tangent point with a nonpositive Lagrange multiplier in accordance with one or more embodiments of the invention. This justifies conclusion $\lambda$.

Now if $(u, v)$ is a solution to (165)-(166), then there exists $\lambda > 0$ such that $(u, v, \lambda)$ is a solution to (169)-(171). So, conclusion 3 follows from conclusions 1 and 2.

Next, one can show how to find the solution in Case 2. First, write (169)-(170) as $$(A-\lambda)u + Cv = w_a, \quad (173)$$

$$Cu + (B+\lambda)v = w_b. \quad (174)$$

Suppose for now that the determinant $(A-\lambda)(B+\lambda) - C^2 \neq 0$. Then $$u = \frac{w_a(B+\lambda) - w_b C}{(A-\lambda)(B+\lambda) - C^2} = \frac{(\lambda w_a + w_a B - w_b C)}{-\lambda^2 + (A-B)\lambda + (AB - C^2)}, \quad (175)$$

$$v = \frac{w_b(A-\lambda) - w_a C}{(A-\lambda)(B+\lambda) - C^2} = \frac{-\lambda w_b + (w_b A - w_a C)}{-\lambda^2 + (A-B)\lambda + (AB - C^2)}, \quad (176)$$

Substituting into (171), one can derive $$1 = \left(\frac{\lambda w_a + w_a B - w_b C}{\lambda^2 + (B-A)\lambda + (C^2 - AB)}\right)^2 - \left(\frac{\lambda w_b + (w_a C - w_b A)}{\lambda^2 + (B-A)\lambda + (C^2 - AB)}\right)^2. \quad (177)$$

This implies $$[\lambda^2 + (B-A)\lambda + (C^2 - AB)]^2 \quad (178)$$

$$= (\lambda w_a + w_a B - w_b C)^2 - [\lambda w_b + (w_a C - w_b A)]^2 \quad (179)$$

$$= (w_a^2 - w_b^2)\lambda^2 + 2(w_a^2 B + w_b^2 A - 2w_a w_b C)\lambda \quad (180)$$

$$+ (w_a B - w_b C)^2 - (w_a C - w_b A)^2. \quad (181)$$

By defining the constants accordingly, one rewrites as $$(\lambda^2 + R_1 \lambda + R_2)^2 = R_3 \lambda^2 + 2R_4 \lambda + R_5. \quad (182)$$

Again, one can analyze this equation analogously to the projection onto the surface maximum slope constraint described above. However, complications arise since there are possibly more than one positive $\lambda$'s. Instead, one can expand (182)

$$\lambda^4 + 2R_1 \lambda^3 + (R_1^2 + 2R_2 - R_3)\lambda^2 + 2(R_1 R_2 - R_4)\lambda + R_2^2 - R_5 = 0, \quad (183)$$

and use the classical Ferrari's method for quartic equation. Then for each $\lambda > 0$, define $$D = (A-\lambda)(B+\lambda) - C^2, \quad (184)$$

$$D_u = w_a(B+\lambda) - w_b C, \quad (185)$$

$$D_v = w_b(A-\lambda) - w_a C. \quad (186)$$

Case 2a: $D = D_u = D_v = 0$. Then one has the system $$Cu + (B+\lambda)v = w_b, \quad (187)$$

$$v^2 - u^2 + 1 = 0. \quad (188)$$

Since $B > 0$ and $\lambda > 0$, the first equation implies $v = (w_b - Cu)/(B+\lambda)$. Then the second one becomes:

$$(w_b - Cu)^2 - (B+\lambda)^2 u^2 + (B+\lambda)^2 = 0, \text{ i.e.,} \quad (189)$$

$$[C^2 - (B+\lambda)^2]u^2 - 2w_b Cu + [w_b^2 + (B+\lambda)^2] \geq 0. \quad (190)$$

If the determinant $$(w_b C)^2 - (C^2 - (B+\lambda)^2)(w_b^2 + (B+\lambda)^2) \geq 0, \quad (191)$$

then two solutions $u$ are obtained. Since there is a unique pair $(u, v)$ with $u < 0$, the quadratic equation (190) must yield one positive and one negative solutions $$u = \frac{w_b C \pm \sqrt{(w_b C)^2 - (C^2 - (B+\lambda)^2)(w_b^2 + (B+\lambda)^2)}}{C^2 - (B+\lambda)^2}, \quad (192)$$

and one must also have $(C^2 - (B+\lambda)^2)(w_b^2 + (B+\lambda)^2) < 0$. So, the negative solution $u$ is $$u = \frac{w_b C + \sqrt{(w_b C)^2 - (C^2 - (B+\lambda)^2)(w_b^2 + (B+\lambda)^2)}}{C^2 - (B+\lambda)^2}. \quad (193)$$

Case 2b: $D \neq 0$. Then by (175)-(176), $u = D_u/D$ and $v = D_v/D$. Next, among all $(u, v)$'s, choose the pair with $u < 0$. Then rescale variables $(u, v) \leftarrow (su, v)$. Finally, one can use (104)-(106) to obtain $(h_1, h_2, h_3)$.

Multiple Surface Orientation Constraints

It is possible to impose multiple surface orientation constraints on one triangle. However, it might cause infeasibility. For instance, it is easy to see that one cannot "tilt" the normal vector toward opposite directions. Therefore, care must be taken when enforcing multiple orientation constraints. Below is a description of the feasibility in such cases.

Feasibility Criterion for One Maximum and One Oriented Minimum Slope Constraints Given a triangle with unit normal vector $\vec{n}$. Suppose constraints are enforced on $\vec{n}$ as follows:

$$\cos \angle(\vec{n}, e_3) \geq 1/\sqrt{1+t^2} \text{ (maximum slope)} \quad (194)$$

$$\cos \angle(\vec{n}, \vec{q}) \geq s/\sqrt{1+s^2} \text{ (oriented minimum slope)} \quad (195)$$

where $e_3 = (0, 0, 1)$; $\vec{q} = (q_1, q_2, 0) \equiv (q_1, q_2)$ is a given unit vector; and $t, s \in R_+$ are also given. Then the problem is feasible if and only if $t \geq s$.

To verify this, assume $\vec{n} = (u, v, w)$ is a unit vector ($w > 0$), and its shadow on xy-plane is $\vec{n}_0 = (u, v)$. Then (194) implies $$w \geq \frac{1}{\sqrt{1+t^2}} \Leftrightarrow u^2 + v^2 = 1 - w^2 \leq 1 - \frac{1}{1+t^2} = \frac{t^2}{1+t^2}, \quad (196)$$

which is a disk on $R^2$ centered at the origin with radius $t/\sqrt{1+t^2}$, and (195) implies $$uq_1 + vq_2 \geq \frac{s}{\sqrt{1+s^2}}, \quad (197)$$

which is a circular segment 2202 with height $$\frac{t}{\sqrt{1+t^2}} - \frac{s}{\sqrt{1+s^2}}$$

Figure 22:
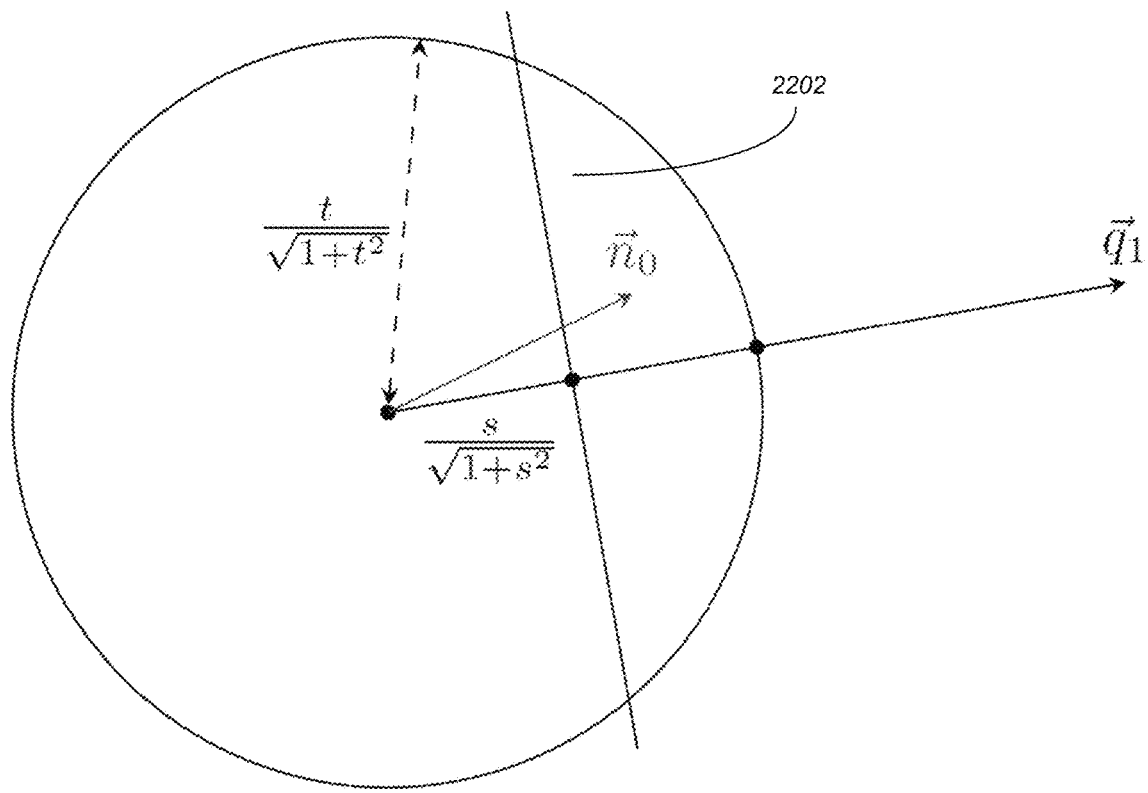
FIG. 22 illustrates a circular segment defining a feasible set for a maximum slope and an oriented minimum slope in accordance with one or more embodiments of the invention.

(see FIG. 22). Thus, FIG. 22 illustrates a circular segment defining a feasible set for a maximum slope and an oriented minimum slope in accordance with one or more embodiments of the invention.

So $\vec{n}_0 = (u, v)$ must lie in the area 2202, which is nonempty if and only if $$\frac{t}{\sqrt{1+t^2}} \geq \frac{s}{\sqrt{1+s^2}} \Leftrightarrow \frac{t^2}{1+t^2} \geq \frac{s^2}{1+s^2} \Leftrightarrow t \geq s.$$

Feasibility Criterion for One Maximum and Two Oriented Minimum Slope Constraints Given a triangle with unit normal vector $\vec{n}$. Suppose $\vec{n}$ satisfies:

$$\cos \angle(\vec{n}, e_3) \geq \frac{1}{\sqrt{1+t^2}}, \cos \angle(\vec{n}, \vec{q}_1) \geq \frac{s_1}{\sqrt{1+s_1^2}}, \text{ and} \quad (198)$$

$$\cos \angle(\vec{n}, \vec{q}_2) \geq \frac{s_2}{\sqrt{1+s_2^2}}.$$

where $e_3 = (0,0,1)$, $\vec{q}_i = (q_{i1}, q_{i2}, 0) \equiv (q_{i1}, q_{i2})$ are unit vectors, and $t, s_1, s_2 \in R_+$. Then the problem is feasible if and only if $$\angle(\vec{q}_1, \vec{q}_2) \leq \cos^{-1}\left(\frac{s_1\sqrt{1+t^2}}{t\sqrt{1+s_1^2}}\right) + \cos^{-1}\left(\frac{s_2\sqrt{1+t^2}}{t\sqrt{1+s_2^2}}\right). \quad (199)$$

Figure 23:
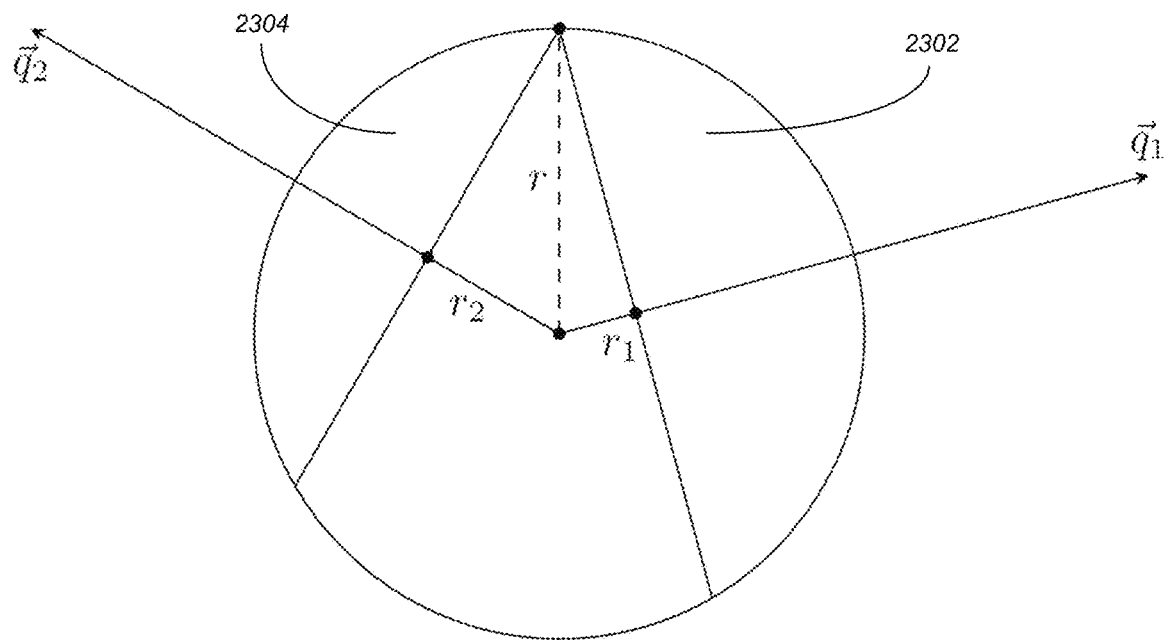
FIG. 23 illustrates a circle representing a feasible region for a maximum slope constraint and for two oriented minimum slope constraints in accordance with one or more embodiments of the invention.

To see this, the (feasible) disk and circular segments (i.e., regions 2302 and 2304) are illustrated in FIG. 23, where $$r := \frac{t}{\sqrt{1+t^2}}, r_1 := \frac{s_1}{\sqrt{1+s_1^2}}, \text{ and } r_2 := \frac{s_2}{\sqrt{1+s_2^2}}.$$

Thus, the intersection is nonempty if and only if $$\angle(\vec{q}_1, \vec{q}_2) \leq \cos^{-1}\left(\frac{r_1}{r}\right) + \cos^{-1}\left(\frac{r_2}{r}\right).$$

Accordingly, FIG. 23 illustrates a circle representing a feasible region for a maximum slope constraint and regions 2302 and 2304 show the feasible region for two oriented minimum slope constraints.

Feasibility Criterion for Multiple Surface Oriented Minimum Slope Constraints:

Given a triangle with unit normal vector $\vec{n}$, $s, t \in R$, and a collection of unit vectors $Q := \{\vec{q}_i\}_{i \in I} \subset R^2$. Let $t \geq s > 0$. Suppose the constraints are enforced on n as follows:

$$\cos \angle(\vec{n}, e_3) \geq 1/\sqrt{1+t^2}, \quad (200)$$

$$\forall i \in I: \cos \angle(\vec{n}, \vec{q}_i) \geq s/\sqrt{1+s^2}. \quad (201)$$

Then it suffices to enforce 2 constraints in (201) since the rest will be automatically fulfilled.

To verify this, one can assume $\{\vec{q}_1, \vec{q}_2\} \subseteq Q$ is the pair that make the largest angle (see FIG. 24) and the area S is the intersection of two corresponding circular segments. Accordingly, FIG. 24 illustrates multiple surface oriented minimum slope constraints via the intersection of two corresponding circular segments in accordance with one or more embodiments of the invention.

Figure 24:
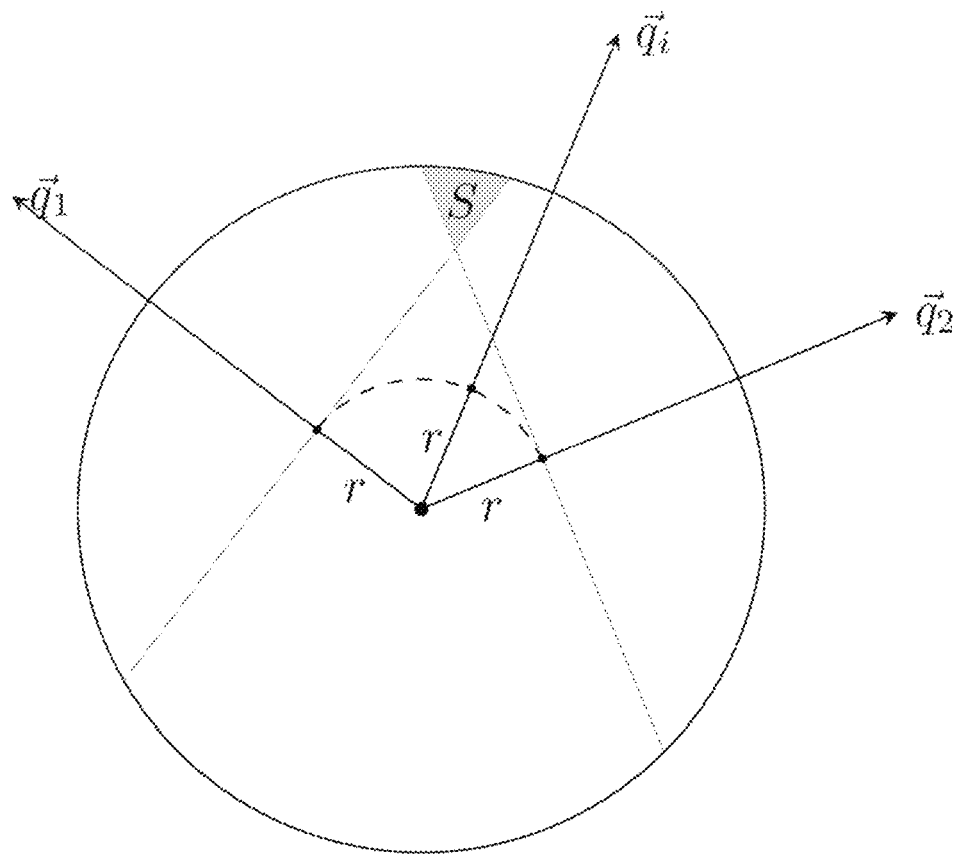
FIG. 24 illustrates multiple surface oriented minimum slope constraints via the intersection of two corresponding circular segments in accordance with one or more embodiments of the invention.

Similar to previous cases, one can illustrate the disk of radius $$\frac{t}{\sqrt{1+t^2}}$$

and several circular segments of the same height in FIG. 24

$$\left(\text{where } r = \frac{s}{\sqrt{1+s^2}}\right).$$

One can argue that all other $\vec{q}_i$'s lie in between $\vec{q}_1$ and $\vec{q}_2$ (otherwise, the intersection with S is empty). Notice that the distances from the origin to all circular segments are equal. Thus, one can deduce that S satisfies all other oriented minimum slope constraint $\vec{q}_i$. Thus, it suffices to enforce at most two oriented minimum slope constraints.

Further, one can associate each $\vec{q}_i$ with different minimum slope $s_i$ and then obtain analogous feasibility criterion.

Curvature Minimization

In some design problems, the designer may wish to construct a surface that is as "smooth" as possible. This problem is referred to as minimizing the curvature between adjacent triangles in the mesh.

Figure 25:
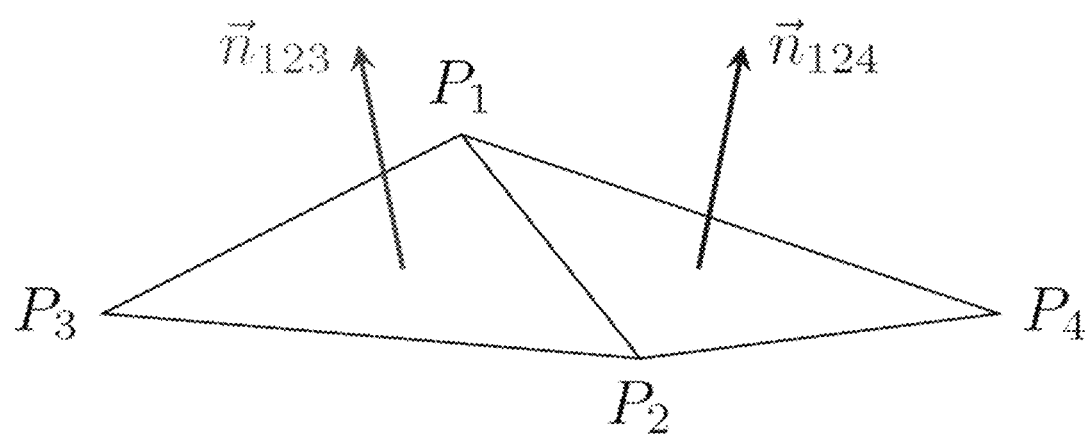
FIG. 25 illustrates two adjacent triangles with surface normal vectors that are used to minimize the curvature in accordance with one or more embodiments of the invention.

Given the points $P_i = (p_{i1}, p_{i2}, h_i)$, $i = 1, 2, 3, 4$, so that they form two adjacent triangles $\Delta_1 = P_1 P_2 P_4$ and $\Delta_2 = P_2 P_3 P_4$ (see FIG. 25). In this regard, FIG. 25 illustrates two adjacent triangles with surface normal vectors that are used to minimize the curvature in accordance with one or more embodiments of the invention.

Define $a_i := p_{i1} - p_{41}$ and $b_i := p_{i2} - p_{42}$, for $i = 1, 2, 3$. Then the respective normal vectors are computed by the cross products $$\vec{n}_1 = \begin{bmatrix} a_1 \\ b_1 \\ h_1 - h_4 \end{bmatrix} \times \begin{bmatrix} a_2 \\ b_2 \\ h_2 - h_4 \end{bmatrix} = \begin{bmatrix} -b_2 h_1 + b_1 h_2 + (b_2 - b_1) h_4 \\ a_2 h_1 - a_1 h_2 + (a_1 - a_1) h_4 \\ a_1 b_2 - a_2 b_1 \end{bmatrix} \quad (202)$$

$$\vec{n}_2 = \begin{bmatrix} a_2 \\ b_2 \\ h_2 - h_4 \end{bmatrix} \times \begin{bmatrix} a_3 \\ b_3 \\ h_3 - h_4 \end{bmatrix} = \begin{bmatrix} -b_3 h_2 + b_2 h_3 + (b_3 - b_2) h_4 \\ a_3 h_2 - a_2 h_3 + (a_2 - a_3) h_4 \\ a_2 b_3 - a_3 b_2 \end{bmatrix} \quad (203)$$

One can rescale and obtain $$\vec{n}_1 = \left(\frac{-b_2 h_1 + b_1 h_2 + (b_2 - b_1) h_4}{a_1 b_2 - a_2 b_1}, \frac{a_2 h_1 - a_1 h_2 + (a_1 - a_2) h_4}{a_1 b_2 - a_2 b_1}, 1\right), \quad (204)$$

$$\vec{n}_2 = \left(\frac{-b_3 h_2 + b_1 h_3 + (b_3 - b_2) h_4}{a_2 b_3 - a_3 b_2}, \frac{a_3 h_2 - a_2 h_3 + (a_2 - a_3) h_4}{a_2 b_3 - a_3 b_2}, 1\right). \quad (205)$$

The curvature can be represented by the difference between $\vec{n}_1$ and $\vec{n}_2$, i.e., $$\vec{\delta}_{12} := \vec{\delta}_{\Delta_1 \Delta_2} = \vec{n}_1 - \vec{n}_2 =: \begin{bmatrix} \langle u, h \rangle \\ \langle v, h \rangle \end{bmatrix} \quad (206)$$

where $$u := (u_1, u_2, u_3, u_4), v := (v_1, v_2, v_3, v_4), h := (h_1, h_2, h_3, h_4), \quad (207)$$

$$u_1 = \frac{-b_2}{a_1 b_2 - a_2 b_1}, u_2 = \frac{b_1}{a_1 b_2 - a_2 b_1} + \frac{b_3}{a_2 b_3 - a_3 b_2}, \quad (208)$$

$$u_3 = \frac{-b_2}{a_2 b_3 - a_3 b_2}, u_4 = -(u_1 + u_2 + u_3), \quad (209)$$

$$v_1 = \frac{a_2}{a_1 b_2 - a_2 b_1}, v_2 = \frac{-a_1}{a_1 b_2 - a_2 b_1} + \frac{-a_3}{a_2 b_3 - a_3 b_2}, \quad (210)$$

$$v_3 = \frac{a_2}{a_2 b_3 - a_3 b_2}, v_4 = -(v_1 + v_2 + v_3). \quad (211)$$

Now let $\mathcal{Z}$ be the set of all pairs of adjacent triangles ($\Delta_i$, $\Delta_j$) for which it is desirable to minimize the curvature. Then for each pair $(\Delta_i, \Delta_j) \in \mathcal{Z}$, one finds the corresponding vectors $h_{ij}=(h_1^{ij}, h_2^{ij}, h_3^{ij}, h_4^{ij}) \in R^4$, $u_{ij}, v_{ij} \in R^4$, and computes the corresponding curvature $\delta_{ij}=(\langle u_{ij}, h_{ij} \rangle, \langle v_{ij}, h_{ij} \rangle)$. One can then aim to minimize all the computed curvatures. Thus, one can arrive at the objective $$G_{1,*}(x) := \sum_{(\Delta_i, \Delta_j) \in Z} \|\vec{\delta}_{ij}\|_* \quad (212)$$

where $\|\cdot\|_*$ can be either 1-norm or max-norm in $R^2$. For 1-norm, the objective is $$G_{1,1}(x) := \sum_{(\Delta_i, \Delta_j) \in Z} |\langle u_{ij}, h_{ij} \rangle| + |\langle v_{ij}, h_{ij} \rangle|, \quad (213)$$

and for max-norm, the objective is $$G_{1,\infty}(x) := \sum_{(\Delta_i, \Delta_j) \in Z} \max\{|\langle u_{ij}, h_{ij} \rangle| + |\langle v_{ij}, h_{ij} \rangle|\}. \quad (214)$$

Simplified Computations for Symmetric Cases.

Suppose the two dimensional mesh satisfies the following symmetry: for every pair of adjacent triangles $(P_1 P_2 P_4, P_2 P_3 P_4) \in \mathcal{Z}$, there exists $t \in R$ such that $$\overrightarrow{P_4 P_1} + \overrightarrow{P_4 P_3} = t \overrightarrow{P_4 P_2}. \quad (215)$$

Then it follows that $(a_1, b_1)+(a_3, b_3)=t(a_2, b_2)$. So one can deduce $a_1 b_2 - a_2 b_1 = a_2 b_3 - a_3 b_2$. Using (207)-(211), one obtains $$u = \quad (216)$$

$$\frac{-b_2}{a_1 b_2 - a_2 b_1}(1, -t, 1, t-2) \text{ and } v = \frac{a_2}{a_1 b_2 - a_2 b_1}(1, -t, 1, t-2).$$

That means u and v are parallel. This simplifies the computations for (213) and (214).

Proximity Operators

Since optimization methods can require proximity operators, one will derive the necessary formulas. It is sometimes convenient to compute the proximity operator $P_f$ via the proximity operator of its Fenchel conjugate $f^*$, which is defined by $f^*: X \to R: x^* \mapsto \sup_{x \in X}(\langle x^*, x \rangle - f(x))$. Indeed, if $\gamma > 0$, then (see, e.g., [2, ⟨Theorem 14.3(ii)])

$$\forall x \in X : x = P_{\gamma f}(x) + \gamma P_{\gamma^{-1} f^*(\gamma^{-1} x)}. \quad (217)$$

One may also recall a useful formula from [2, Lemma 2.3]: if $f: X \to R$ is convex and positively homogeneous, $\alpha > 0$, $w \in X$, and $h: X \to R: x \mapsto \alpha f(x-w)$, then $$P_h(x) = w + \alpha P_f\left(\frac{x-w}{\alpha}\right) = x - \alpha P_{f^*}\left(\frac{x-w}{\alpha}\right). \quad (218)$$

Formula for Proximity Operators:

Let $\{u_i\}_{i \in I}$ be a system of finitely many vectors in $R^n$, and $$f: R^n \to R: x \to \max_{i \in I}\{|\langle u_i, x \rangle|\}. \quad (219)$$

Then $f^* = \iota_D$ where $D := \text{conv}\bigcup_{i \in I}\{u_i, -u_i\}$. Consequently, the proximity operator of $f$ can be computed by $P_f = \text{Id} - P_D$, where $P_D$ is the projection onto the set D.

To see this, first, suppose $x^* \in D$, then one can express $$x^* = \sum_{i \in I} \lambda_i u_i \text{ where } \sum_{i \in I} |\lambda_i| \leq 1. \quad (220)$$

It follows that for all $x \in X$, $$\langle x^*, x \rangle - f(x) = \quad (221)$$

$$\sum_{i \in I} \lambda_i \langle u_i, x \rangle - \max_{i \in I} |\langle u_i, x \rangle| \leq \left(\sum_{i \in I} \lambda_i - 1\right) \max_{i \in I} |\langle u_i, x \rangle| \leq 0.$$

So, $f^*(x^*) = \sup_{x \in X} [\langle x^*, x \rangle - f(x)] \leq 0$. Notice that equality happens if one sets $x=0$. Thus, $f^*(x^*)=0$.

Now suppose $x^* \notin D$. Since D is nonempty, closed, and convex, the classic separation theorem implies that there exists $x \in X$ such that $$\langle x^*, x \rangle > \langle u, x \rangle \text{ for all } u \in D \quad (222)$$

This leads to $\langle x^*, x \rangle - f(x) > 0$. Since $f$ is homogeneous, one can have $$f^*(x^*) \geq \langle x^*, \lambda x \rangle - f(\lambda x) \to +\infty \text{ as } \lambda \to +\infty. \quad (223)$$

So $f^*(x^*)=+\infty$. Therefore, one concludes that $f^* = \iota_D$. Now employing formula (218) and noting that $P_{f^*} = P_D$, the projection onto D (see the beginning of the iterative projection methods optimization problems description above), one obtains the proximity operator for $f$.

Next, one presents two special cases of the above proximity formula, which will be used in curvature minimization.

Example 1

Given $\alpha > 0$, a vector $u \in R^n \setminus \{0\}$ and the function $$f: R^n \to R: x \mapsto \alpha |\langle u, x \rangle|. \quad (224)$$

Then the proximity operator of $f$ is $$P_f = \text{Id} - P_D \text{ where } D := [-\alpha u, \alpha u]. \quad (225)$$

The explicit projection onto D is given below (see also, [4, Theorem 2.7]).

$$P_D x = \min\left\{1, \max\left\{-1, \frac{\langle \alpha u, x\rangle}{\|\alpha u\|^2}\right\}\right\}\alpha u = \min\left\{\alpha, \max\left\{-\alpha, \frac{\langle u, x\rangle}{\|u\|^2}\right\}\right\}u. \quad (226)$$

Example 2

Given two vectors $u, v \in R^n$ and $$f:R^n \to R : x \mapsto \max\{|\langle u, x\rangle|, |\langle v, x\rangle|\}. \quad (227)$$

Then the proximity operator of $f$ is $$P_f = Id - P_D \text{ where } D := \text{conv}\{u, v, -u, -v\}. \quad (228)$$

In general, $P_D$ is the projection onto a parallelogram in $R^n$.

Approximation of Surface Slope Constraint Projections

In this section, the problem of surface slope constraint projections are considered. Such projections may be written in the form $$\min_{u \in R^2} \varphi(u) := \frac{A}{2}u_1^2 + Cu_1 u_2 + \frac{B}{2}u_2^2 - w_a u_1 - w_b u_2 \quad (229)$$

subject to $u \in \Omega := \{u \in R^2 | g(u) \leq 0\}. \quad (230)$

If one defines $$M := \begin{bmatrix} A & C \\ C & B \end{bmatrix} \text{ and } w := \begin{bmatrix} W_a \\ W_b \end{bmatrix},$$

then $$\varphi(u) = \frac{1}{2}u^T M u - w^T u. \quad (231)$$

In practice, solving (229)-(230) directly as described above (e.g., as described above in the "Projection onto the surface maximum slope constraint" section and the "Projection onto Surface Oriented Minimum Slope Constraint" section) might not be straightforward as one may encounter numerical instability. Therefore, one can use an alternative approach where the constraint $\Omega$ is approximated by a regular polygon.

Approximation for Maximum Slope Constraint

Figure 26:
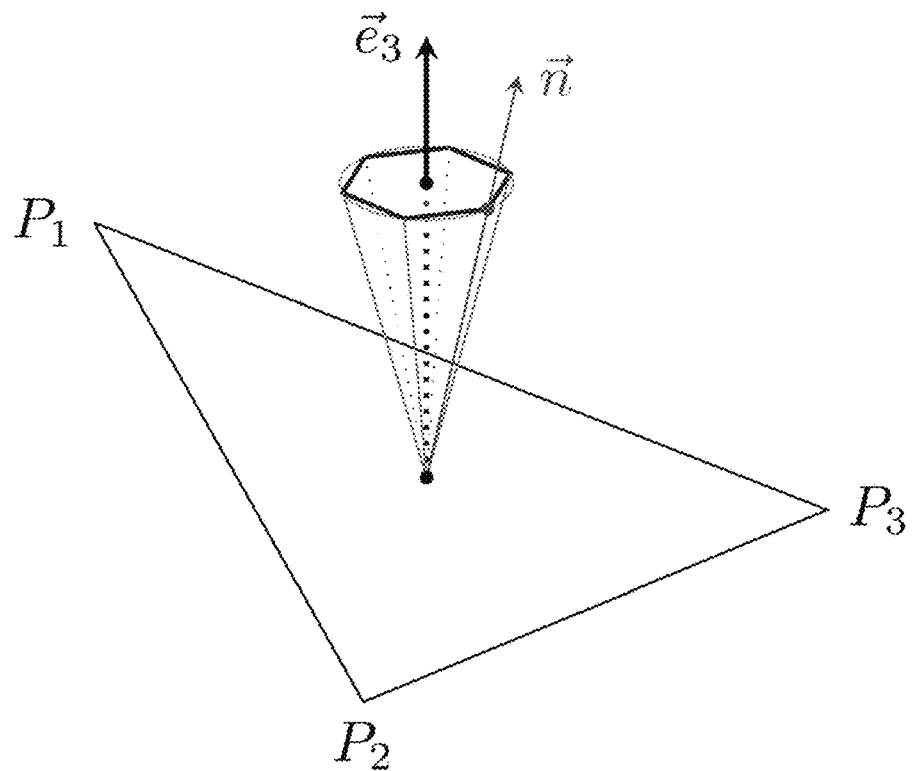
FIG. 26 illustrates a hexagon that is used to replace a unit disk for a maximum slope constraint in accordance with one or more embodiments of the invention.

Consider the projection onto maximum slope constraint written in the form $$\min_{u \in R^2} \varphi(u) := \frac{1}{2}u^T M u - w^T u \quad (232)$$

subject to $u \in \Omega := \{(u_1, u_2) \in R^2 | u_1^2 + u_2^2 \leq 1\}. \quad (233)$ The unit disk $\Omega$ may be replaced by a convex (or simple) regular polygon that is contained in $\Omega$. For example, the unit disk may be replaced by a hexagon (see FIG. 26). In this regard, FIG. 26 illustrates a hexagon that is used to replace a unit disk for a maximum slope constraint in accordance with one or more embodiments of the invention. More specifically, let $m \geq 3$ be an integer and $0 \leq \theta_1 \leq \theta_2 \leq \ldots \leq$ $\theta_m < 2\pi$. Define the points on the unit circle $p_k := (\cos \theta_k, \sin \theta_k)$ for $k = 1, 2, \ldots, m$, and set also $p_0 := p_m$. Now define the convex m-polygon $U := \text{conv}\{p_k | k = 0, 1, \ldots, m\}$. One then arrives at the approximate problem $$\min_{u \in R^2} \varphi(u) := \frac{1}{2}u^T M u - w^T u \text{ subject to } u \in U. \quad (234)$$

This problem may be solved as follows. Let $u_0 := M^{-1}w$ be the vertex of the paraboloid $\varphi(u)$.

Case 1: $u_0 \in \Omega$. Then $u_0$ is even the solution of (232)-(233), thus, the problem is solved.

Case 2: $u_0 \notin C$. So one also has $u_0 \notin U$. The solution of (234) may be found by the following steps.

Step 2a: Find the index set $$K := \{k | 0 \text{ and } u_0 \text{ are on opposite sides of the line } p_k p_{k+1}\}. \quad (235)$$

Step 2b: Minimize $\varphi(u)$ on each edge $p_k p_{k+1}$ for $k \in K$. Consider $\varphi(u)$ on an edge $p_k p_{k+1}$. Define $\Delta p_k = p_{k+1} - p_k$. Take a point $u \in p_k p_{k+1}$, then $$u = p_k + t\Delta p_k \text{ for some } t \in [0, 1]. \quad (236)$$

So $$\psi(t) := \varphi(u) = \frac{1}{2}(p_k + t\Delta p_k)^T M(p_k + t\Delta p_k) - w^T(p_k + t\Delta p_k) \quad (237)$$

$$= \frac{t^2}{2}\Delta p_k^T M \Delta p_k - t(w^T \Delta p_k - p_k^T M \Delta p_k) + \frac{1}{2}p_k^T M p_k - w^T p_k. \quad (238)$$

The vertex of $\psi(t)$ is $$\bar{t} := \frac{w^T \Delta p_k - p_k^T M \Delta p_k}{\Delta p_k^T M \Delta p_k},$$

so the minimizer of $\psi(t)$ on $[0, 1]$ is $$t_k := \min\{1, \max\{0, \bar{t}\}\}. \quad (239)$$

Step 2c: If there exists $k \in K$ such that $0 < t_k < 1$, then $u = p_k + t_k \Delta p_k$ is the solution of (234). Otherwise, the solution of (234) is $$u = p_{k_0} + t_{k_0}\Delta p_{k_0} \text{ where } k_0 := \operatorname*{argmin}_{k \in K}\varphi(p_k + t_k \Delta p_k). \quad (240)$$

Hence, the projection to the surface maximum slope constraint is approximated by using a regular polygon instead of a unit disk.

Approximation for Oriented Minimum Slope Constraint

Consider the projection onto oriented minimum slope constraint written in the form $$\min_{u \in R^2} \varphi(u) := \frac{1}{2}u^T M u - w^T u \quad (241)$$

subject to $u \in \Omega := \left\{(u_1, u_2) \in R^2 \mid u_1 < 0, u_2^2 - \frac{u_1^2}{s^2} + 1 \leq 0\right\}. \quad (242)$ The constraint Ω may be replaced by $$U := \{(u_1, u_2) \in R^2 | u_1 \le -s(|u_2|+1)\}. \quad (243)$$

Figure 27:
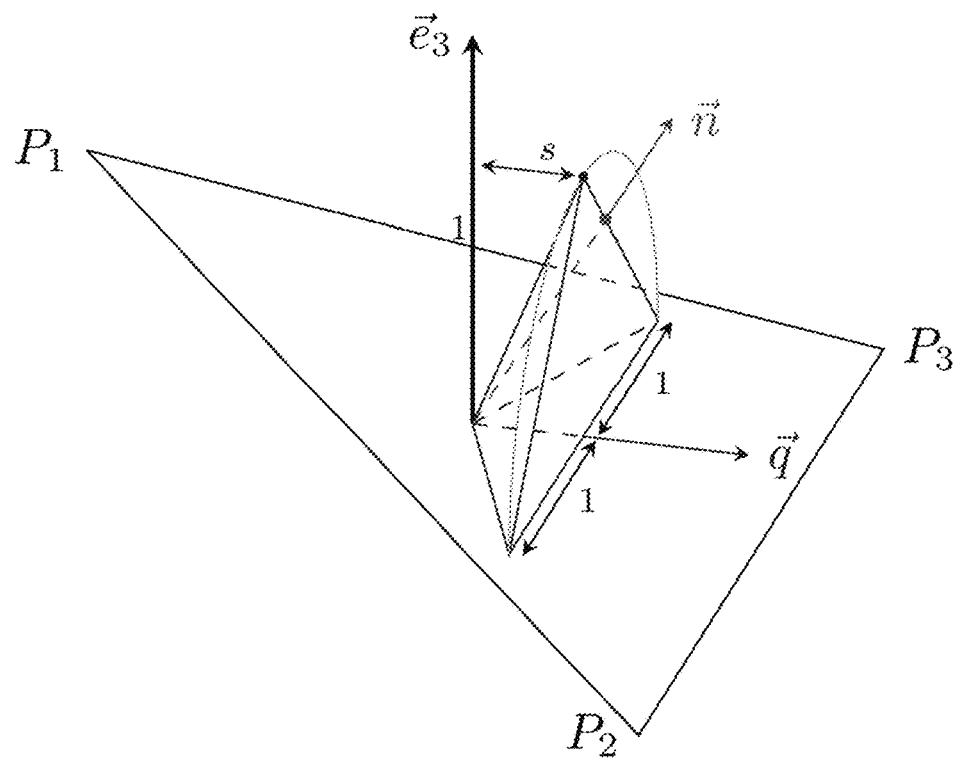
FIG. 27 shows how the original half cone is now replaced with the absolute value function in accordance with one or more embodiments of the invention.

FIG. 27 shows how the original half cone is now replaced with the absolute value function in accordance with one or more embodiments of the invention. One can easily check that $U \subset \Omega$. So one arrives at an approximate problem $$\min_{u \in R^2} \varphi(u) := \frac{1}{2} u^T M u - w^T u \text{ subject to } u \in U. \quad (244)$$

Let $u_0 := M^{-1}w$ be the vertex of the paraboloid $\varphi(u)$.

Case 1: $u_0 \in C$. Then $u_0$ is even the solution of (241)-(242), thus, the problem is solved.

Case 2: $u_0 \notin C$. So $u_0 \in U$. One solves (244) by first finding the minimizer of $\varphi(u)$ on the boundary of U, which consists of two half-lines $$\{p + t\Delta p_1 | t \in R_+\} \text{ and } \{p + t\Delta p_2 | t \in R_+\}, \quad (245)$$

where $p := (-s, 0)$, $\Delta p_1 := (-s, 1)$, and $\Delta p_2 := (-s, -1)$.

Let $u := p + t\Delta p$ for $t \in [0, +\infty)$. Similar to the computation above, one has $$\psi(t) := \varphi(u) = \frac{t^2}{2} \Delta p^T M \Delta p - t(w^T \Delta p - p^T M \Delta p) + \frac{1}{2} p^T M p - w^T p. \quad (246)$$

So the minimizer of $\varphi(u)$ on $[0, +\infty)$ is $$t := \max\left\{0, \frac{w^T \Delta p - p^T M \Delta p}{\Delta p^T M \Delta p}\right\}. \quad (247)$$

Second, one sets $\Delta p = \Delta p_1$ and $\Delta p = \Delta p_2$ in the above formula to obtain $t_1$ and $t_2$, respectively. Finally, comparing the values $\varphi(p+t_1\Delta p_1)$ and $\varphi(p+t_2\Delta p_2)$, one obtains the minimizer of (244).

Visualization Examples

The closed-form proximity and projection operators can be used in the DR method to solve various design problems described above.

Figure 1:
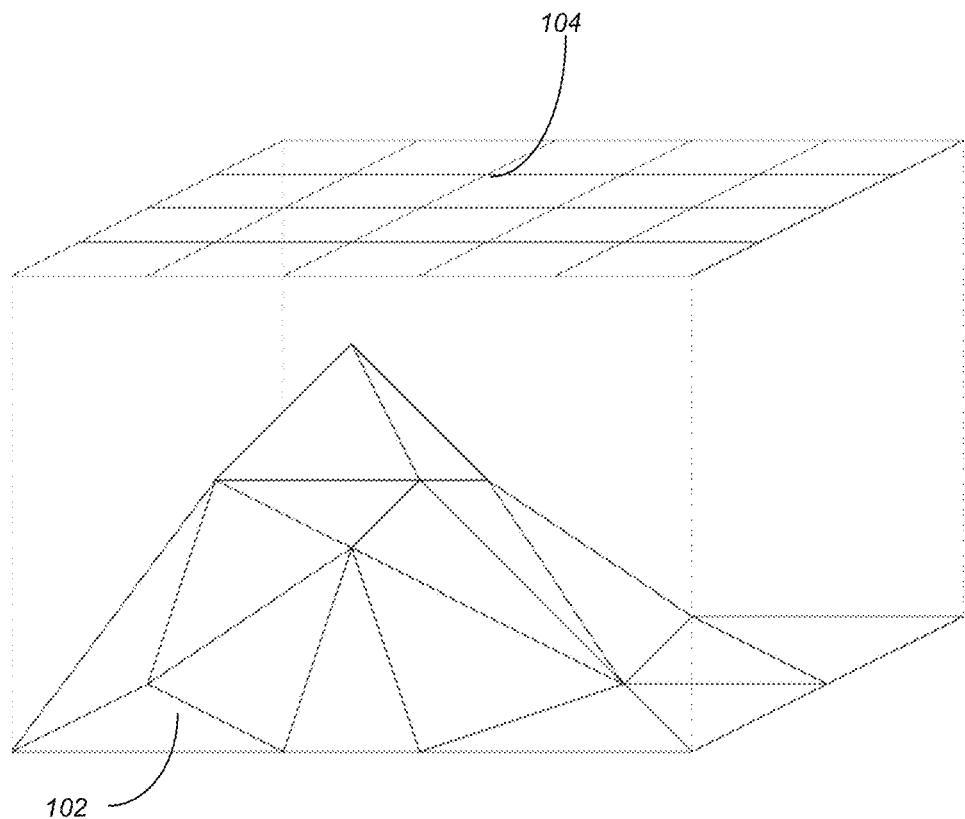
FIG. 1 shows an example of an existing triangular, irregular mesh at the bottom, and a quadrilateral grid on the top.
Figure 2:
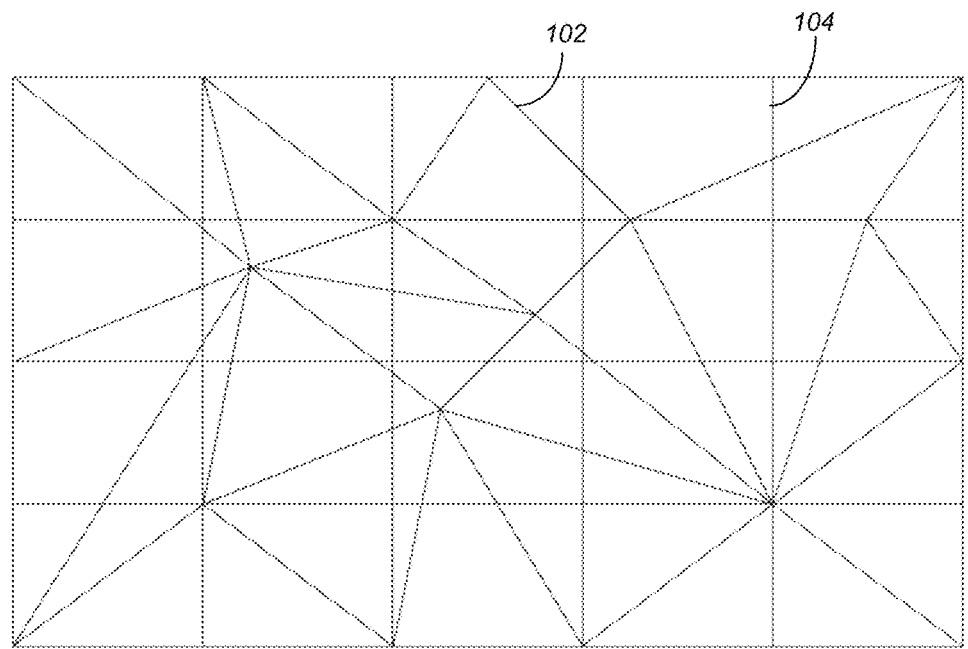
FIG. 2 shows how an existing triangular mesh is mapped in a quadrilateral grid.
Figure 3:
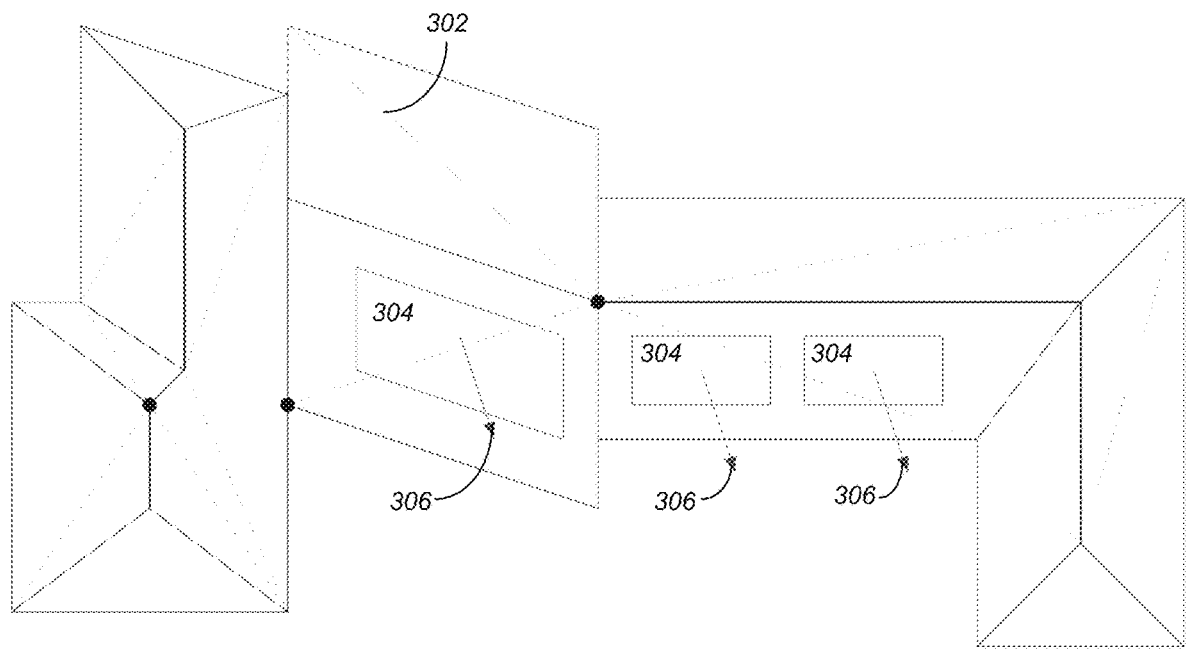
FIG. 3 illustrates an exemplary roof structure view from above.
Figure 4:
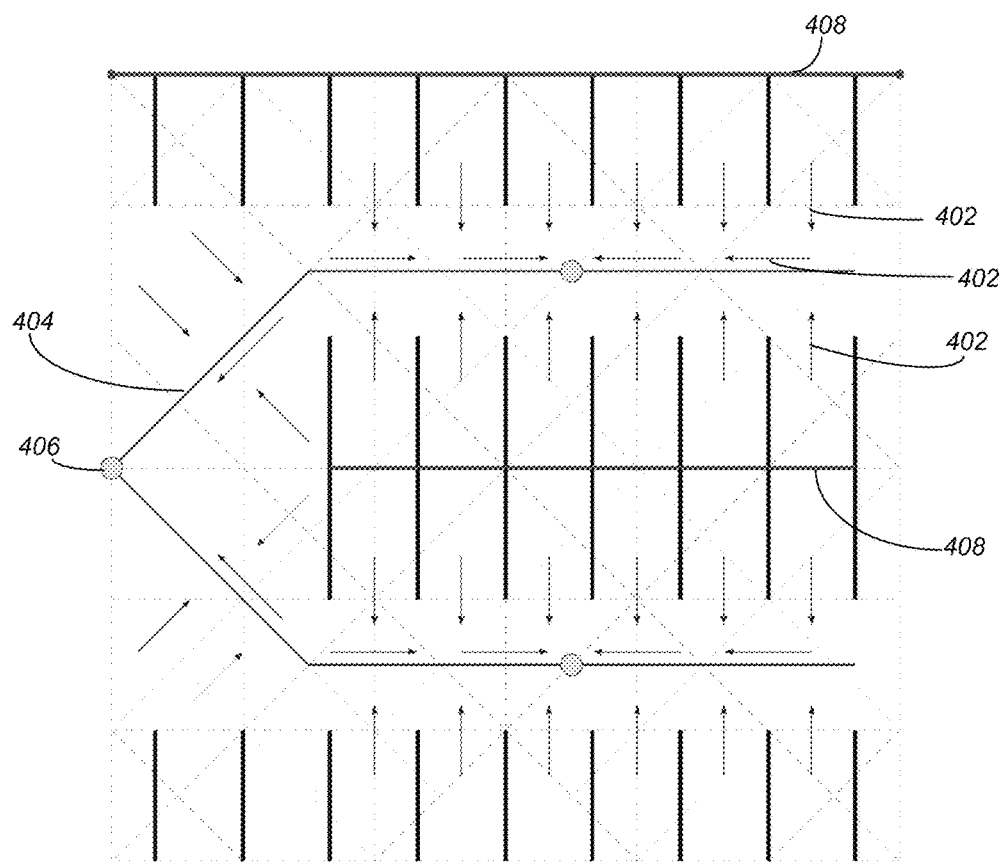
FIG. 4 depicts an example of a parking lot that has four horizontal parking rows.
Figure 5:
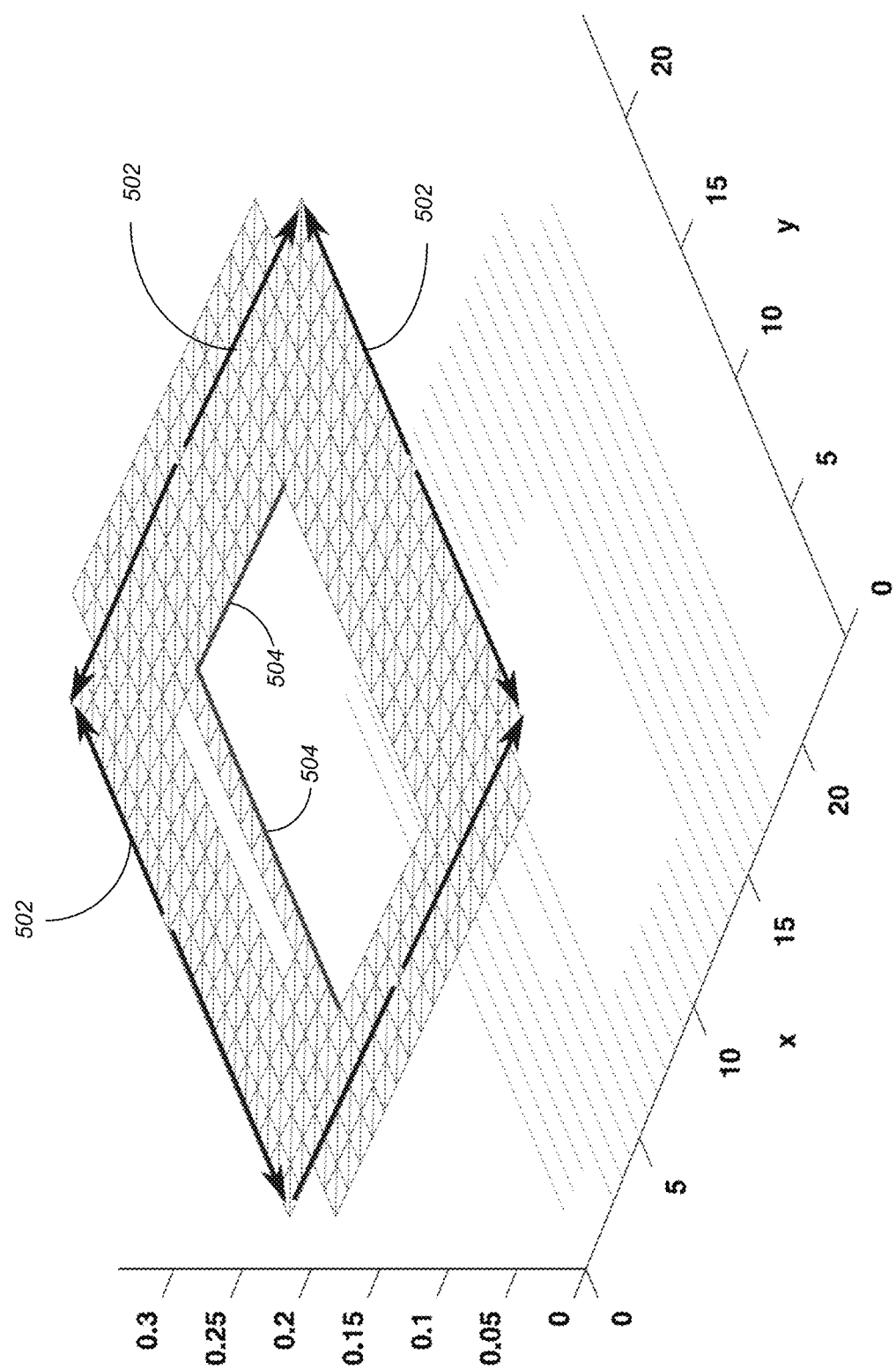
FIG. 5 illustrates a triangle mesh representative of an existing ground of a planned parking lot.
Figure 6:
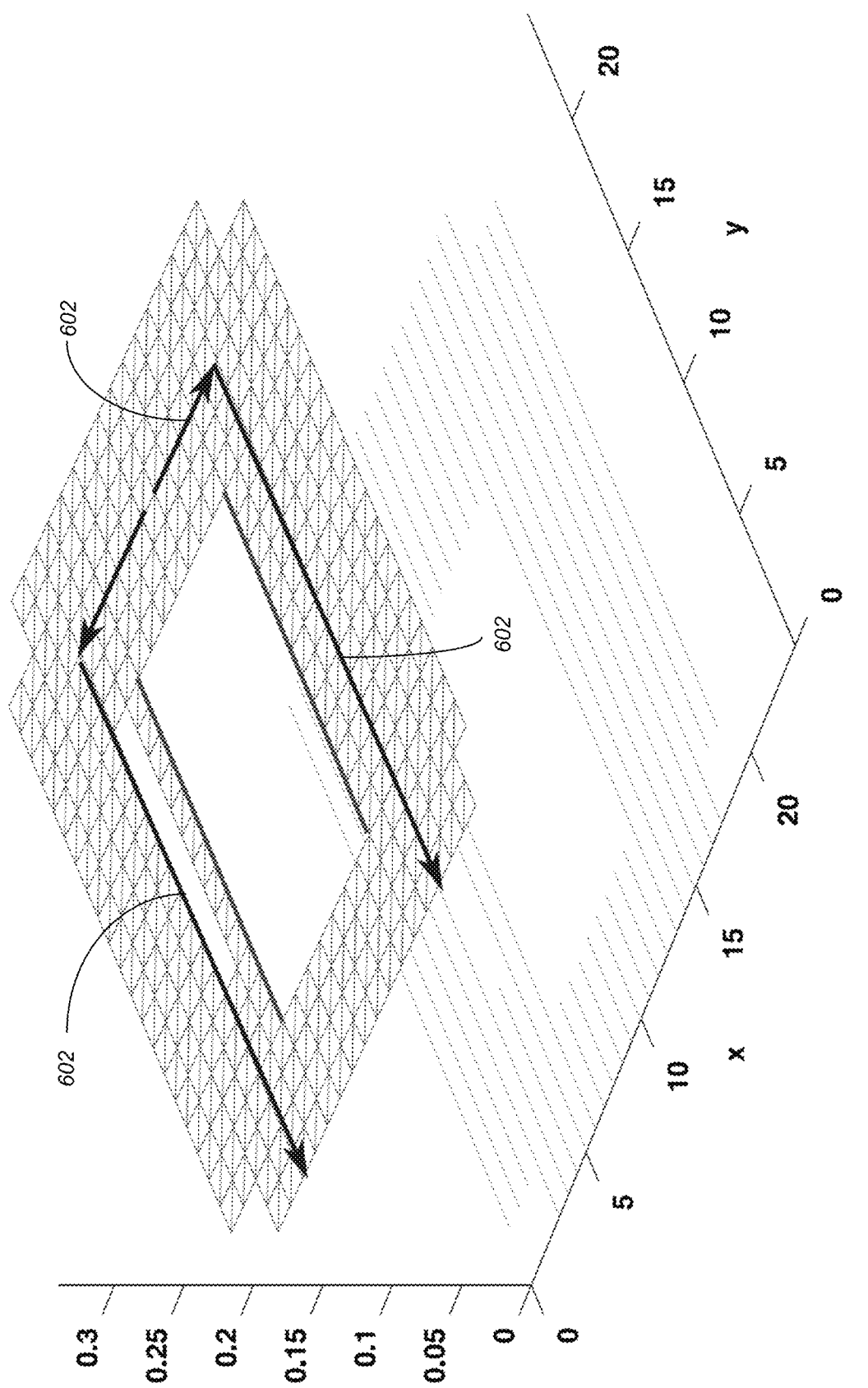
FIG. 6 illustrates a triangular mesh for a planned parking lot where drainage happens in parallel, on either side of the building.
Figure 7:
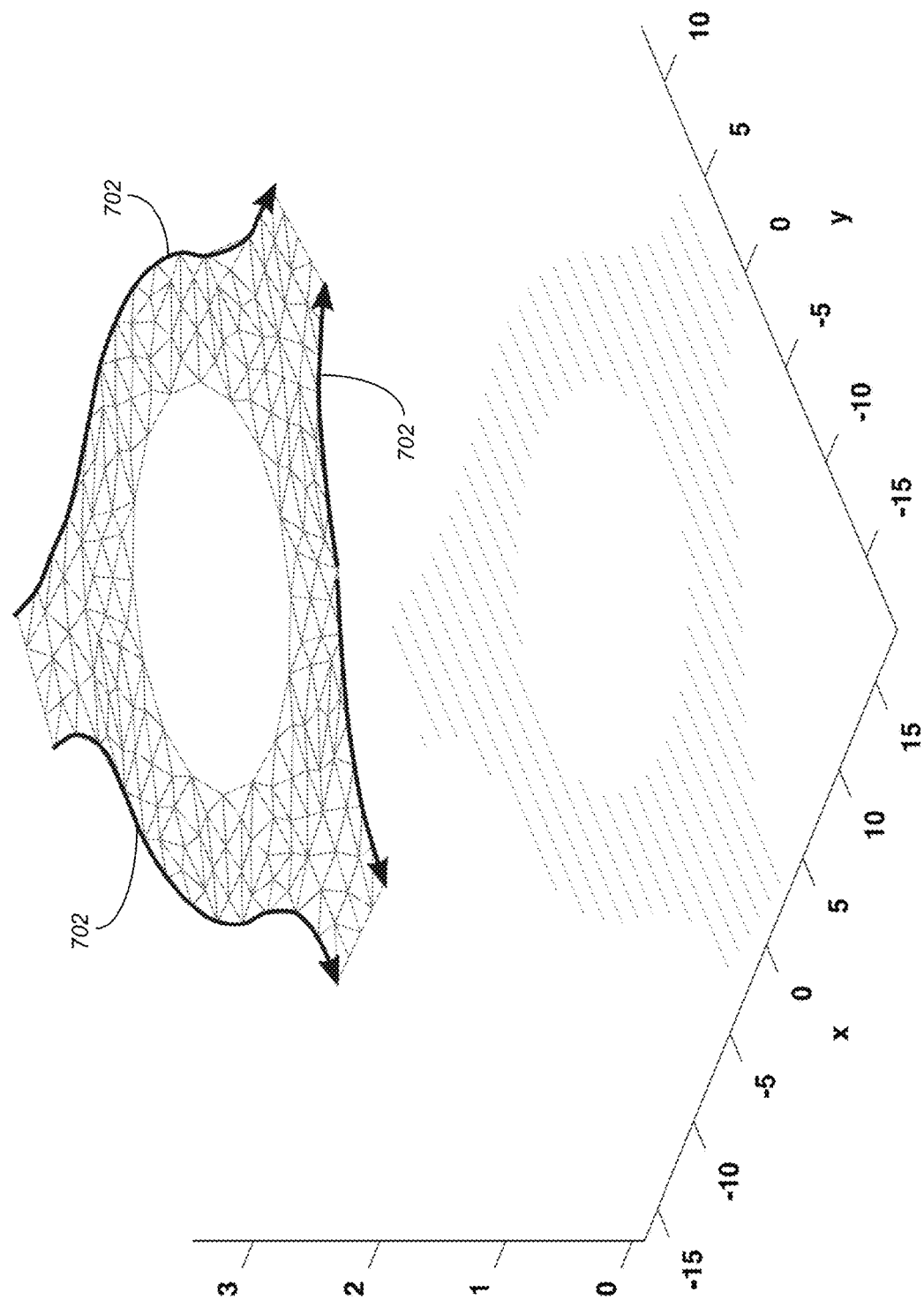
FIG. 7 represents the mesh of an existing ground for a roundabout, where water needs to drain from the road at the top along the outer circle to the roads on either side at the bottom.
Figure 28:
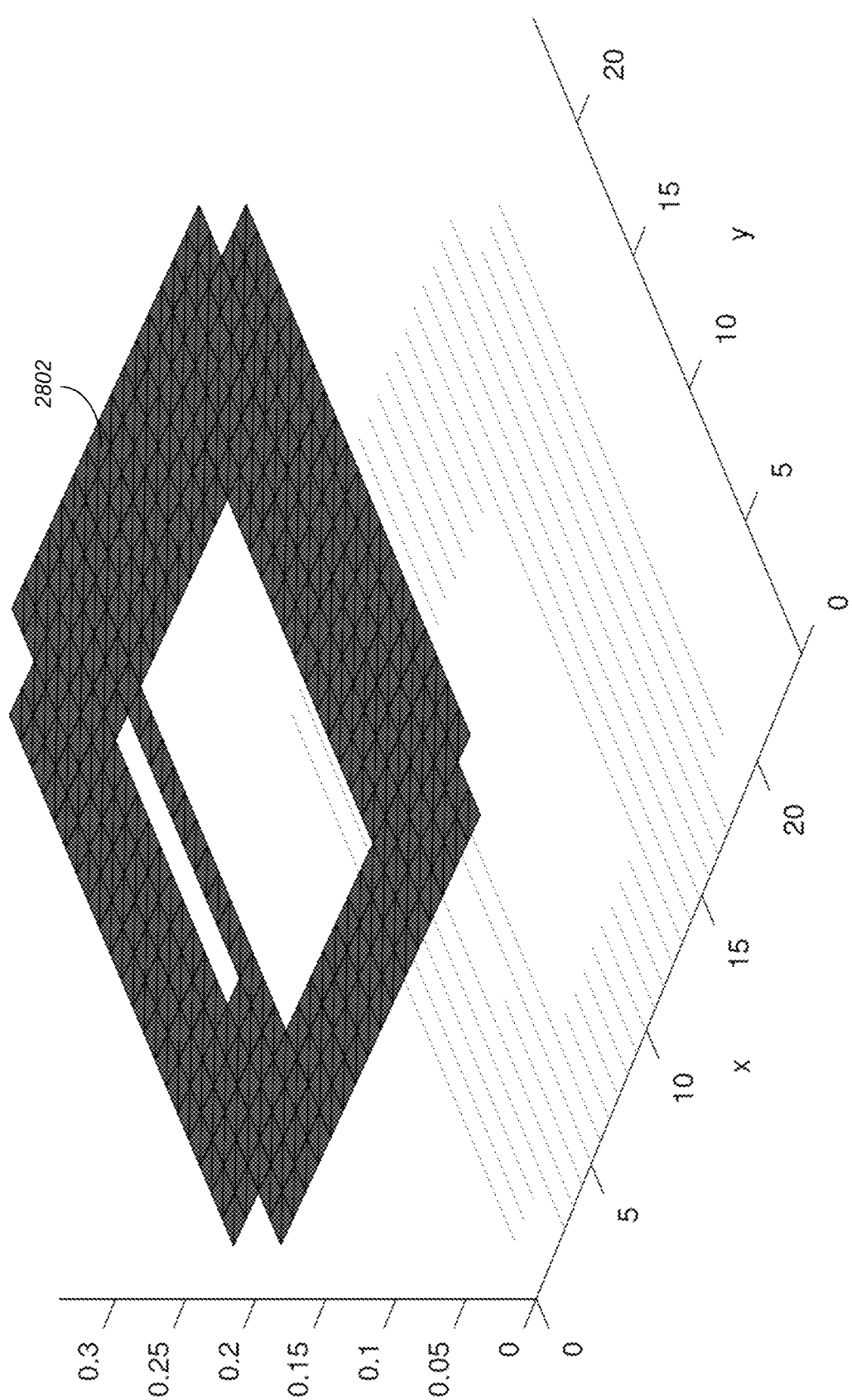
FIG. 28 shows the starting situation for the problem shown in FIG. 7 in accordance with one or more embodiments of the invention.
Figure 29:
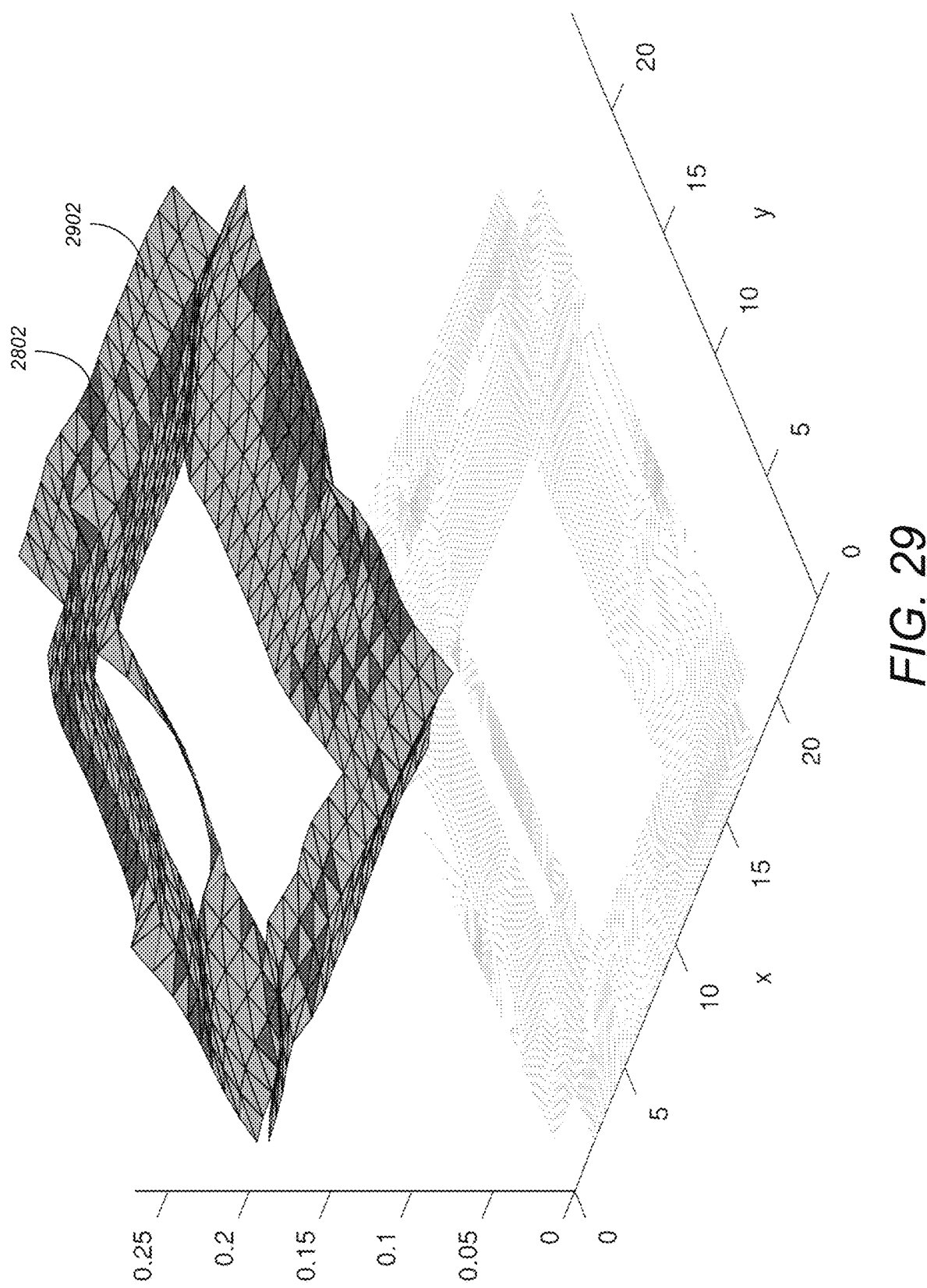
FIG. 29 shows the mesh of FIG. 28 after 10 iterations in accordance with one or more embodiments of the invention.
Figure 30:
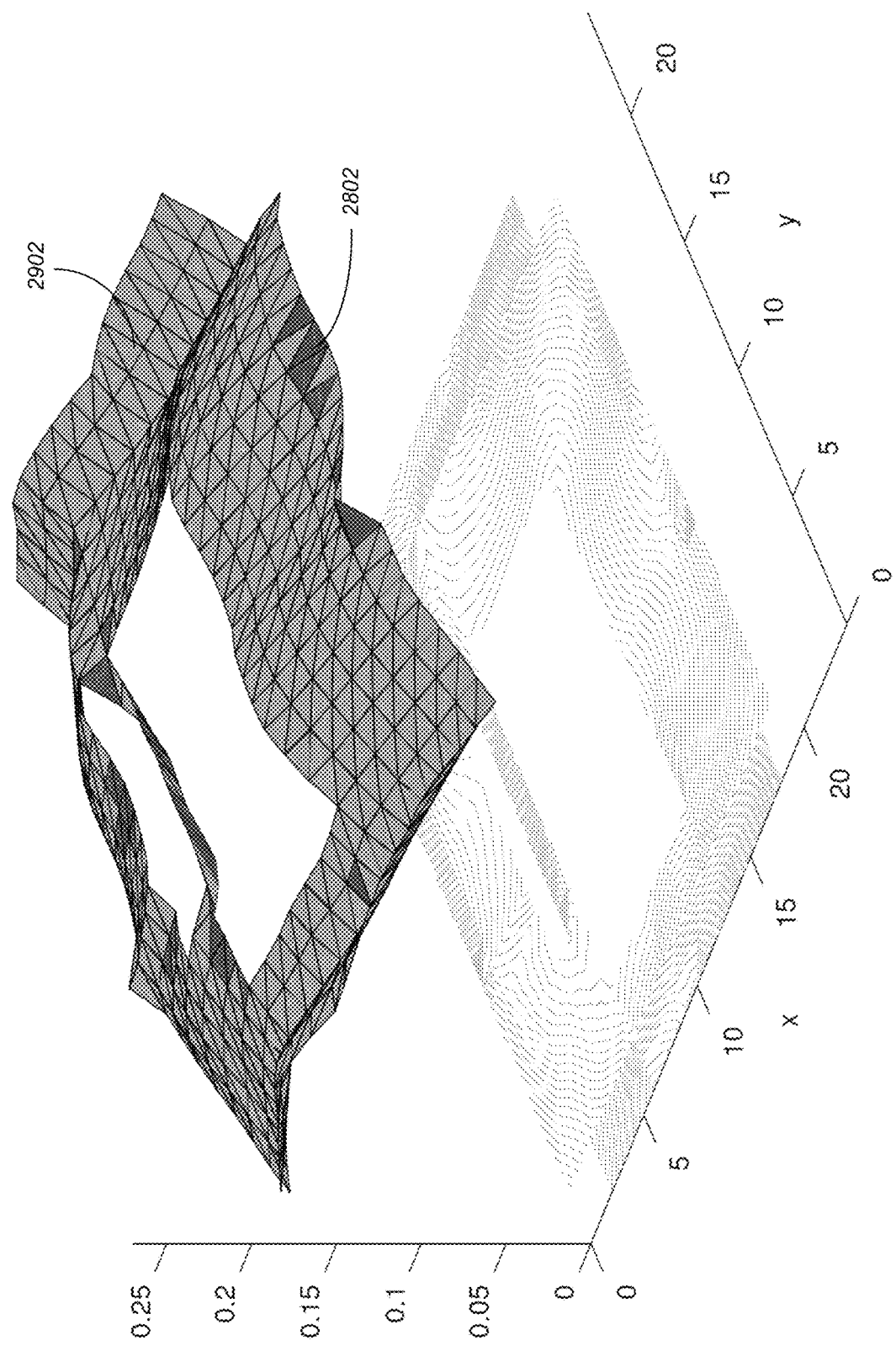
FIG. 30 shows the mesh of FIG. 28 after 29 iterations in accordance with one or more embodiments of the invention.
Figure 31:
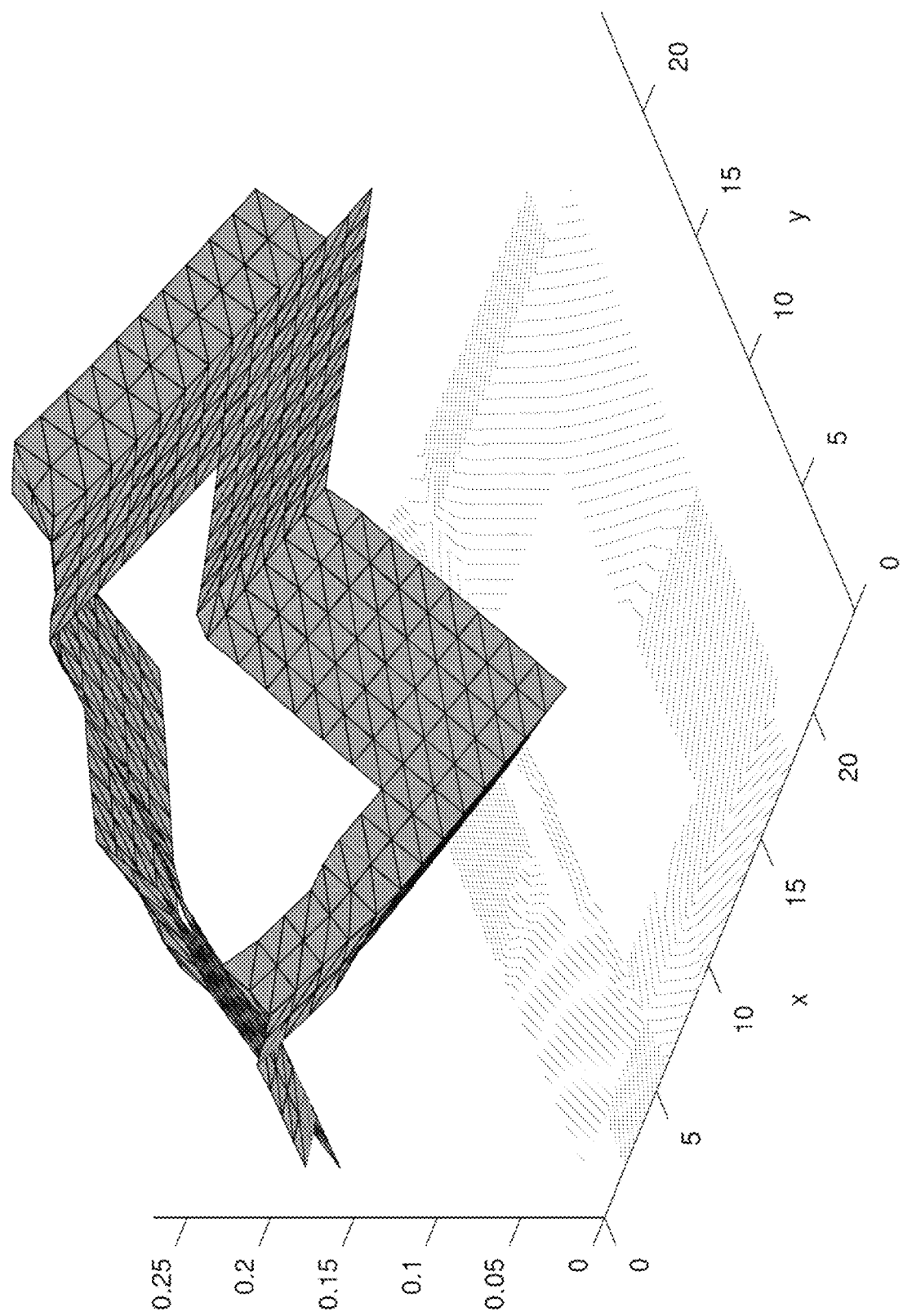
FIG. 31 shows the final mesh of FIG. 28 after convergence in accordance with one or more embodiments of the invention.

FIG. 28 shows the starting situation for the problem shown in FIG. 7 in accordance with one or more embodiments of the invention. Triangles 2802 represent triangles that violate the design constraints, and triangles 2902 (from FIG. 29) represent triangles that satisfy the design constraints. FIG. 29 shows the mesh after 10 iterations in accordance with one or more embodiments of the invention. FIG. 30 shows the mesh after 29 iterations, and FIG. 31 shows the final mesh after convergence in accordance with one or more embodiments of the invention.

Figure 32:
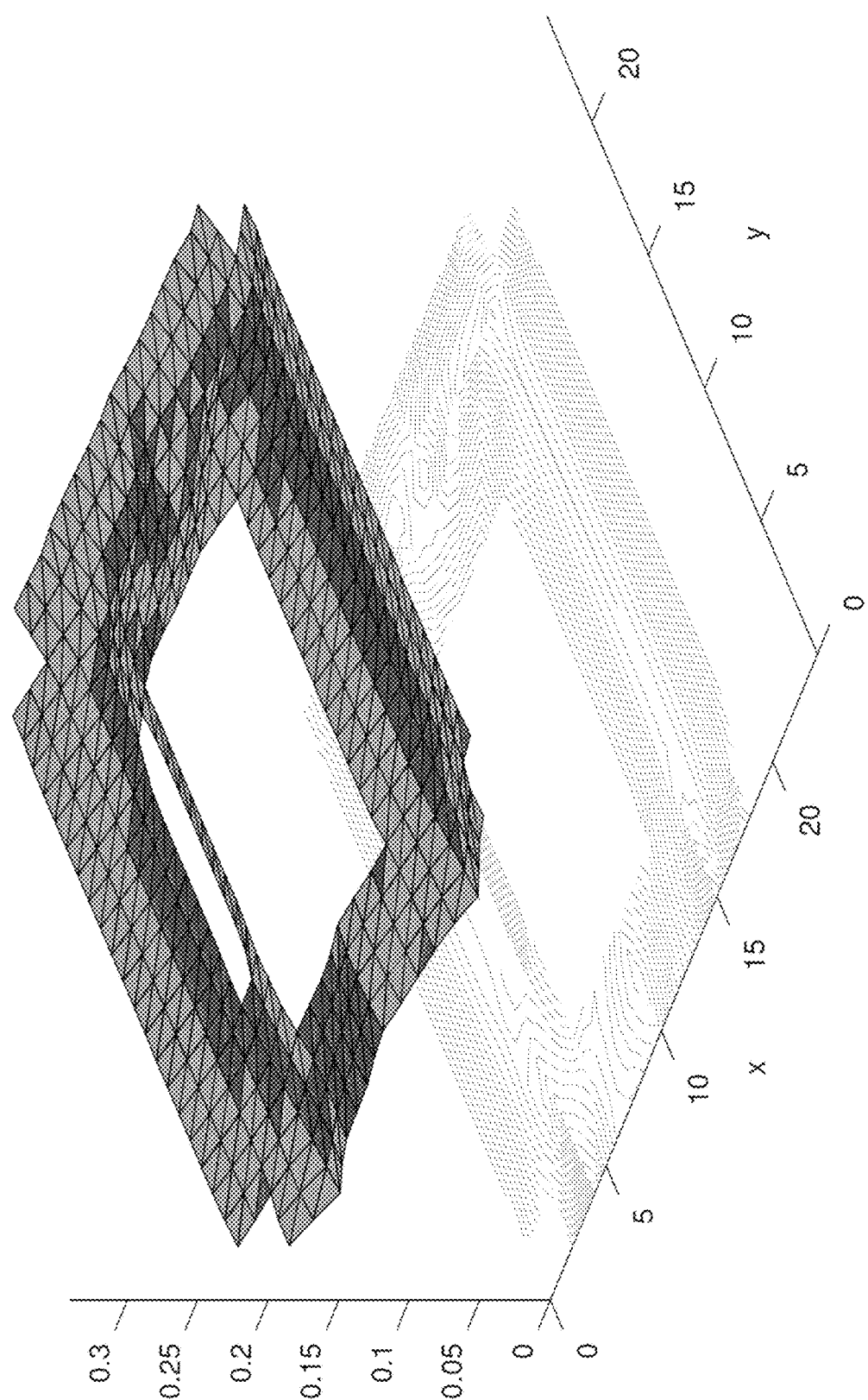
FIG. 32 illustrates the mesh of FIG. 28 based on the problem shown in FIG. 8 after 15 iterations in accordance with one or more embodiments of the invention.
Figure 33:
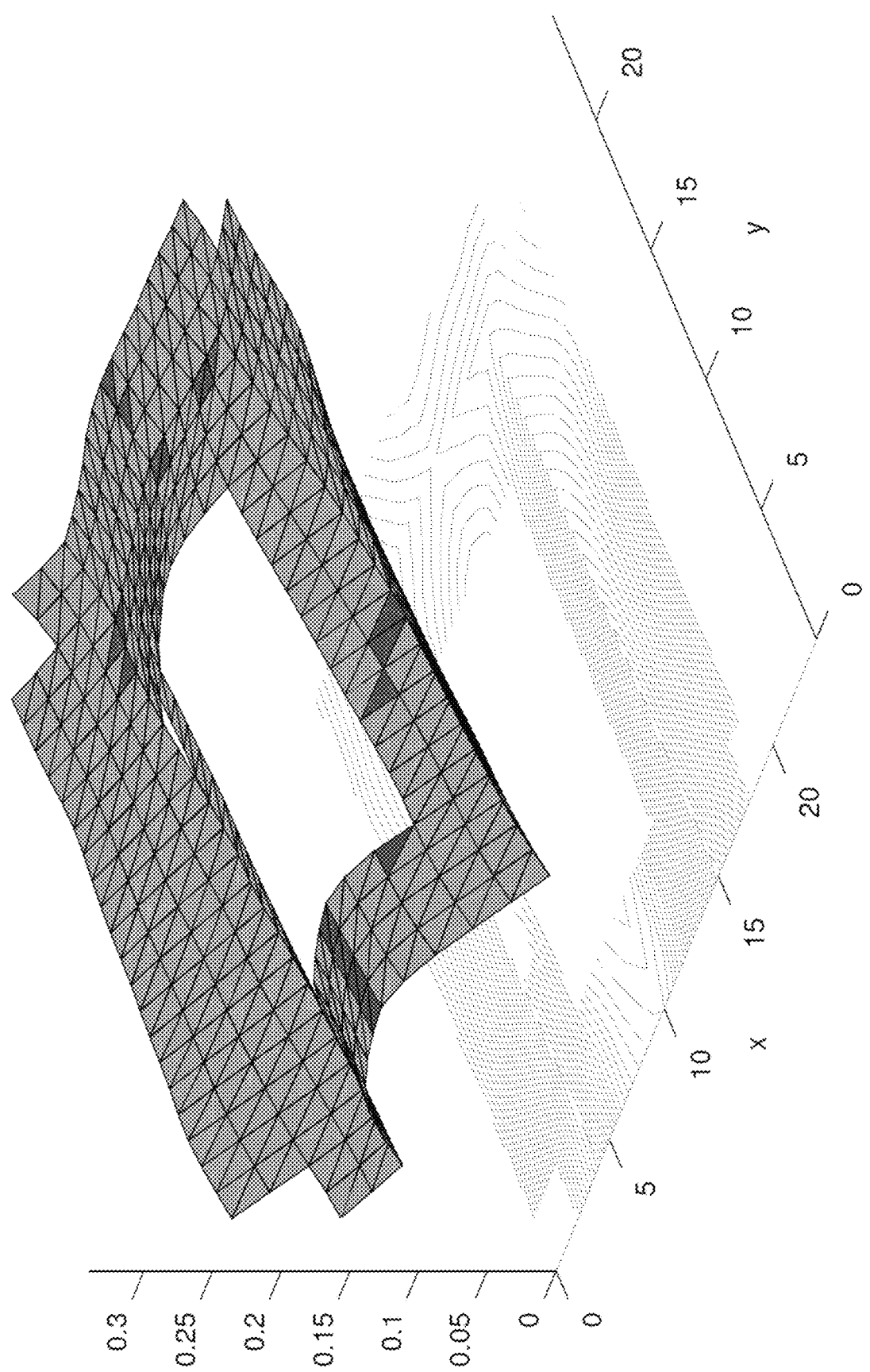
FIG. 33 illustrates the mesh of FIG. 28 based on the problem shown in FIG. 8 after 100 iterations.
Figure 34:
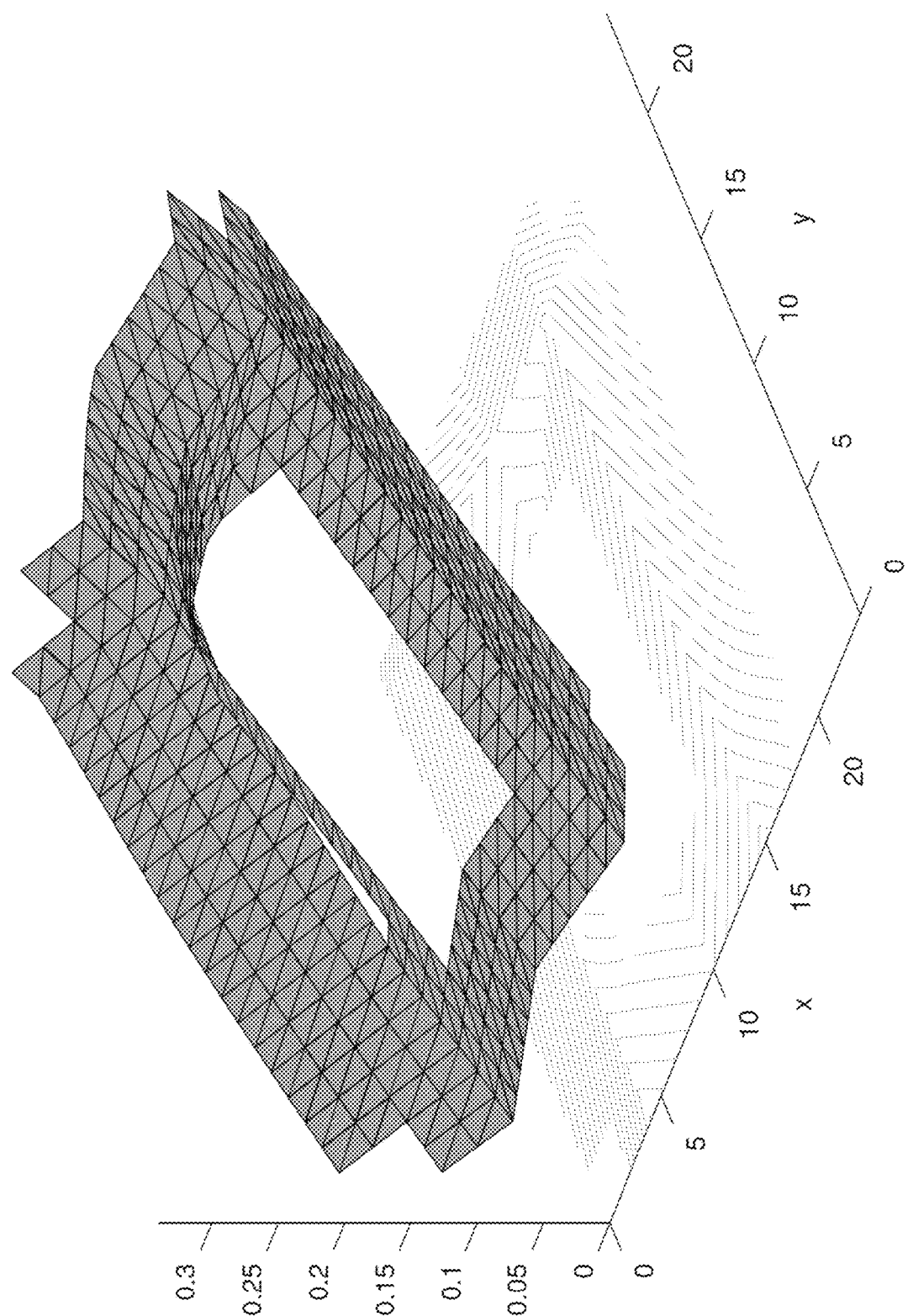
FIG. 34 illustrates the final mesh of FIG. 28 based on the problem shown in FIG. 8 in accordance with one or more embodiments of the invention.

Consider FIG. 28 again, this time as a starting situation for the problem shown in FIG. 8. FIG. 32 is after 15 iterations, FIG. 33 is after 100 iterations, and FIG. 34 is the final solution.

Figure 35:
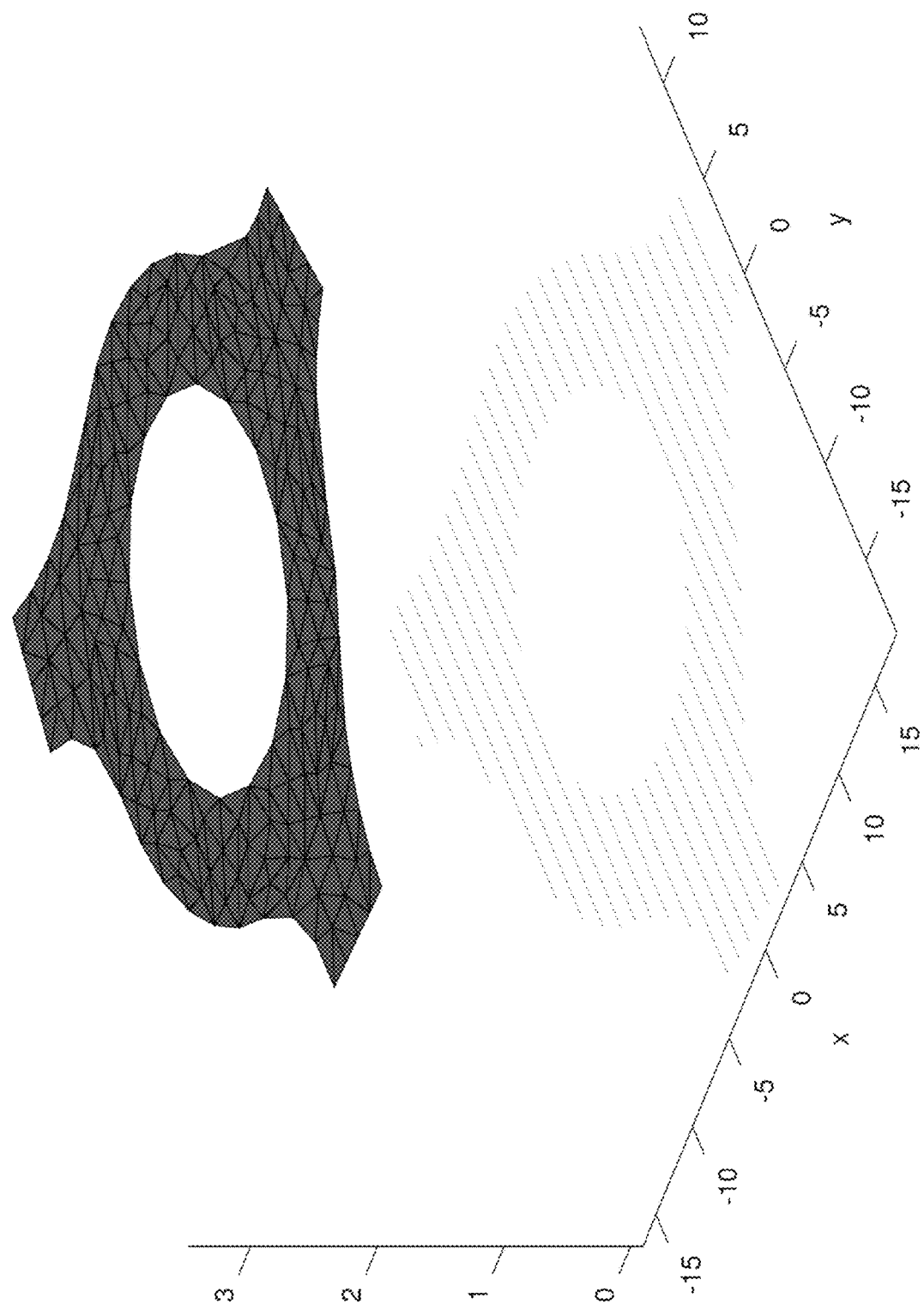
FIG. 35 is the starting situation mesh for the problem shown in FIG. 9 in accordance with one or more embodiments of the invention.
Figure 36:
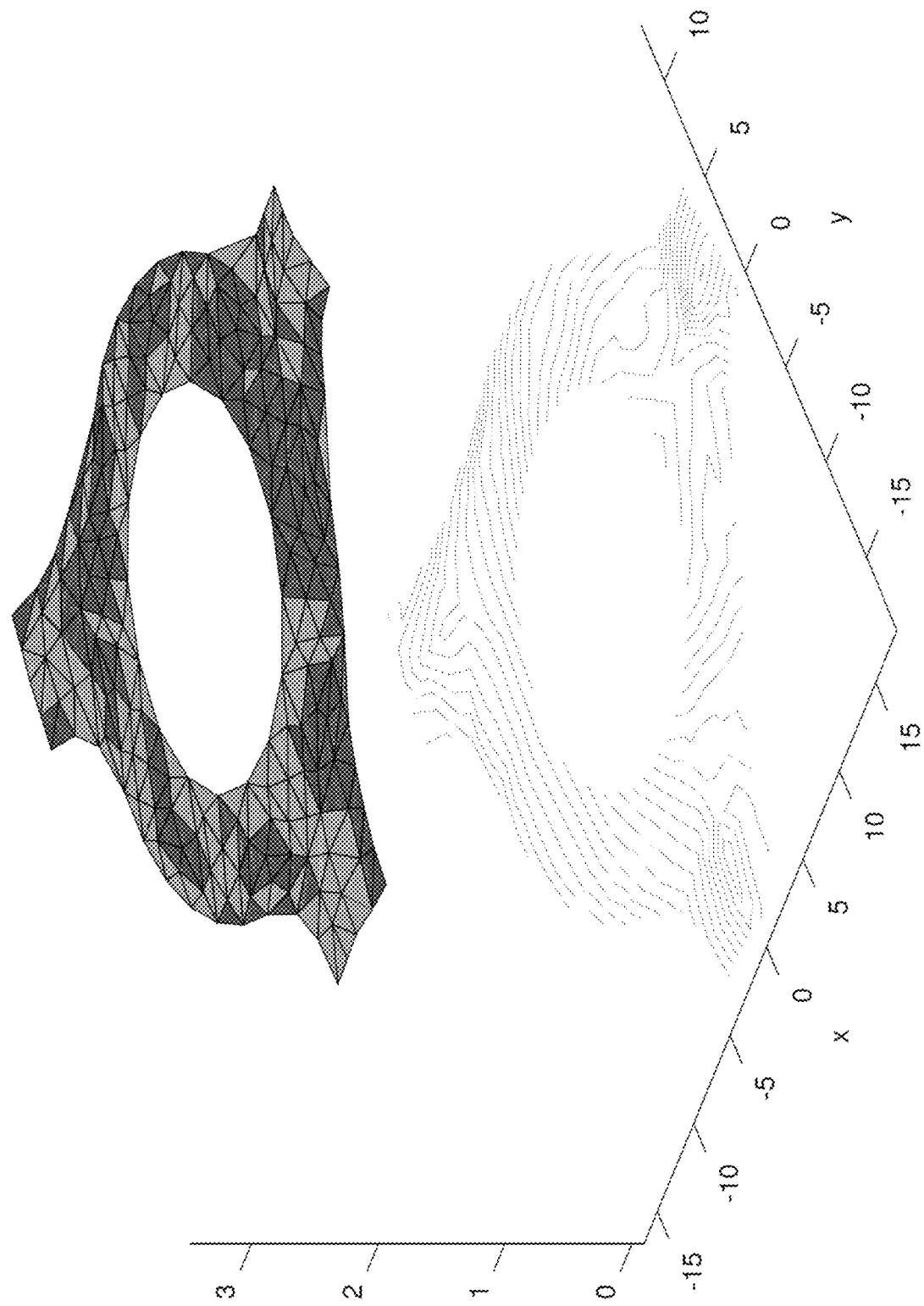
FIG. 36 illustrates the mesh for the problem shown in FIG. 9 after 10 iterations in accordance with one or more embodiments of the invention.
Figure 37:
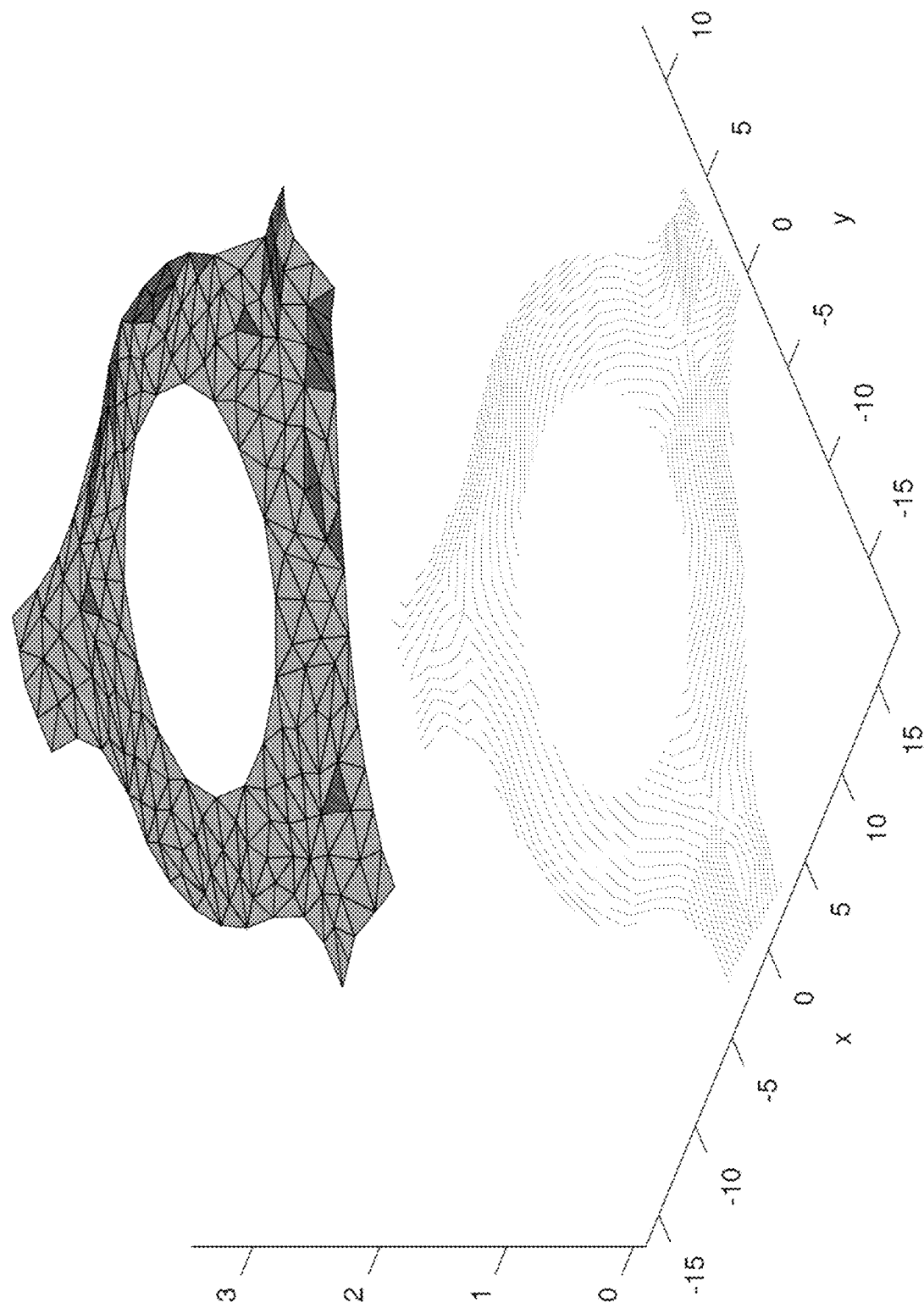
FIG. 37 illustrates the mesh for the problem shown in FIG. 9 after 20 iterations in accordance with one or more embodiments of the invention.
Figure 38:
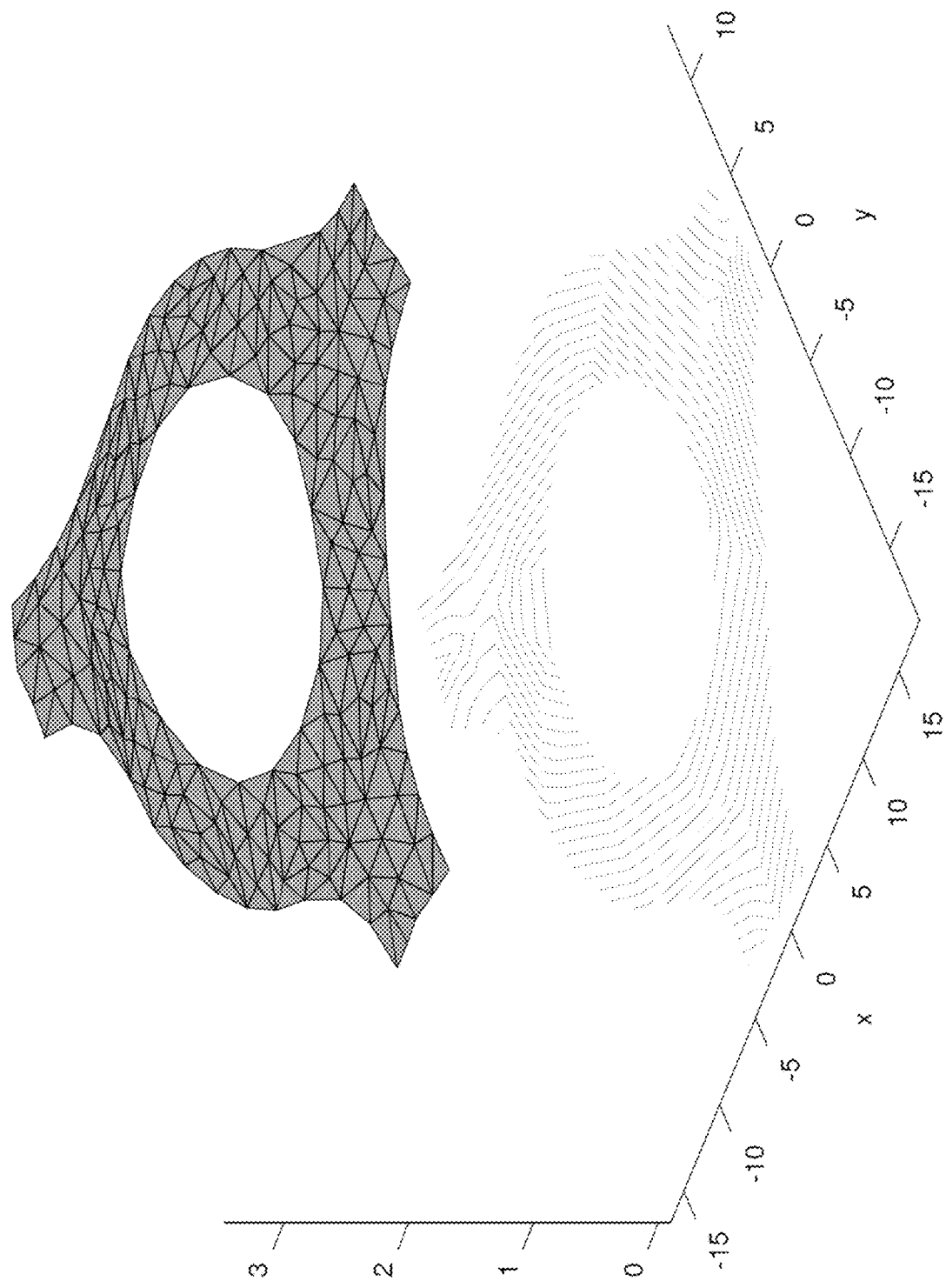
FIG. 38 is the final solution mesh for the problem shown in FIG. 9 after 20 iterations in accordance with one or more embodiments of the invention.

FIG. 35 is the starting situation for the problem shown in FIG. 9. FIG. 36 is after 10 iterations, FIG. 37 is after 20 iterations, and FIG. 38 is the final solution.

Logical Flow

Figure 39:
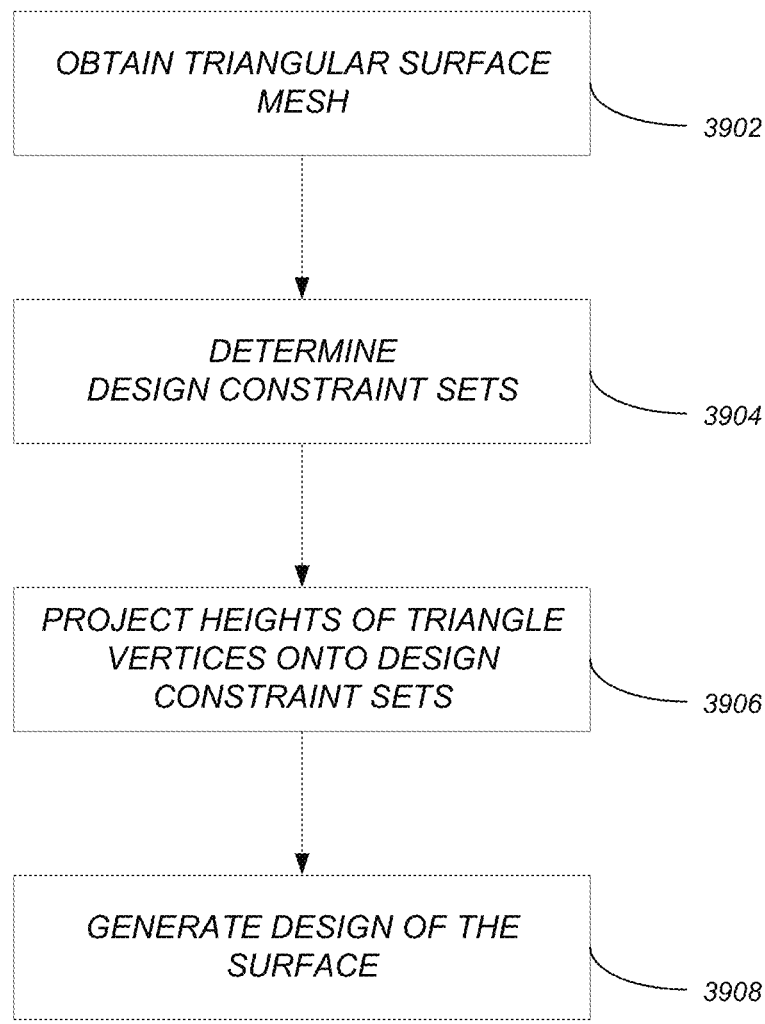
FIG. 39 illustrates the logical flow for designing a surface in accordance with one or more embodiments of the invention.

FIG. 39 illustrates the logical flow for designing a surface in accordance with one or more embodiments of the invention.

At step 3902, a triangular surface mesh representative of an existing surface is obtained. The triangular surface mesh includes two or more triangles that are connected by vertices and edges. In embodiments of the invention, the surface may be a land surface (e.g., that is actually constructed based on the design [e.g., a computer-aided design—CAD]).

At step 3904, one or more design constraint sets are determined based on one or more design constraints. The design constraints can include various constraints including a maximum slope constraint for a first triangle of the two or more triangles in the triangular surface mesh. The maximum slope constraint is a maximum angle between a normal vector of the first triangle and a reference vector (e.g., a Z-vector representative of gravity).

An additional design constraint may be a surface oriented minimum slope constraint for the first triangle. The surface oriented minimum slope constraint is a minimum angle between the normal vector of the first triangle and a directional vector.

At step 3906, one or more heights of the vertices of the first triangle are projected onto the one or more design constraint sets such that the normal vector satisfies all of the one or more design constraints. The projecting includes modifying the one or more heights by a minimum Euclidian distance. Further, the projecting may be performed iteratively until all of the one or more design constraints are satisfied. In addition, the projecting onto the design constraint set for the maximum slope constraint may include moving the normal vector onto a cone defined by an origin of the reference vector on the triangular surface mesh and a unit circle around the reference vector that is defined by the maximum angle. Alternatively, or in addition, the projecting onto to the design constraint set for the maximum slope constraint may include moving the normal vector onto a polygonal shaped pyramid defined by the reference vector on the triangular surface mesh and a regular polygon around the reference vector, wherein edges of the polygonal shaped pyramid are at the maximum angle with the reference vector.

At step 3908, a design of the surface represented by the triangular surface mesh is generated (based on the projecting).

Hardware Environment

Figure 40:
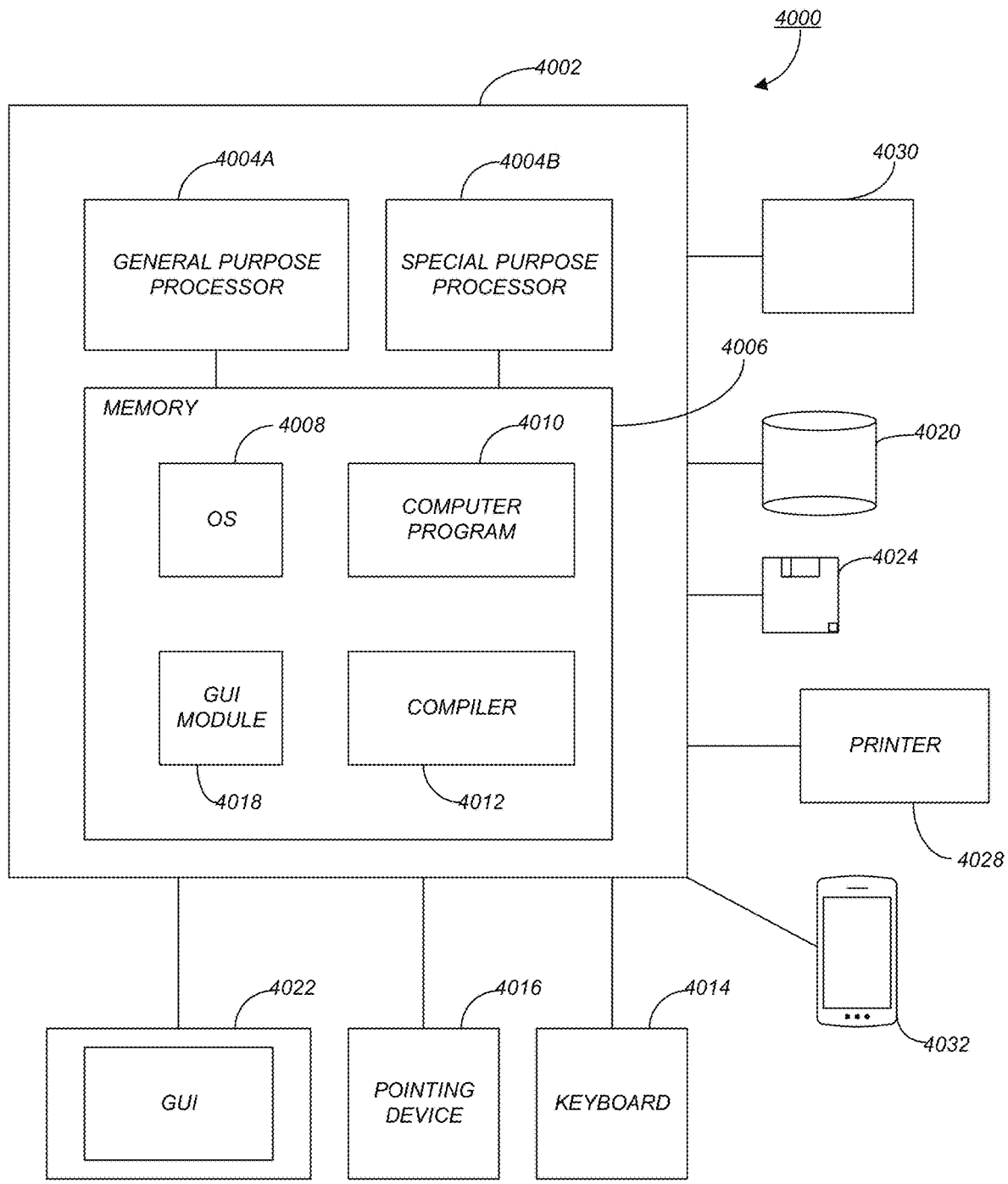
FIG. 40 is an exemplary hardware and software environment used to implement one or more embodiments of the invention.

FIG. 40 is an exemplary hardware and software environment 4000 used to implement one or more embodiments of the invention. The hardware and software environment includes a computer 4002 and may include peripherals. Computer 4002 may be a user/client computer, server computer, or may be a database computer. The computer 4002 comprises a general purpose hardware processor 4004A and/or a special purpose hardware processor 4004B (hereinafter alternatively collectively referred to as processor 4004) and a memory 4006, such as random access memory (RAM). The computer 4002 may be coupled to, and/or integrated with, other devices, including input/output (I/O) devices such as a keyboard 4014, a cursor control device 4016 (e.g., a mouse, a pointing device, pen and tablet, touch screen, multi-touch device, etc.) and a printer 4028. In one or more embodiments, computer 4002 may be coupled to, or may comprise, a portable or media viewing/listening device 4032 (e.g., an MP3 player, IPOD, NOOK, portable digital video player, cellular device, personal digital assistant, etc.). In yet another embodiment, the computer 4002 may comprise a multi-touch device, mobile phone, gaming system, internet enabled television, television set top box, or other internet enabled device executing on various platforms and operating systems.

In one embodiment, the computer 4002 operates by the general purpose processor 4004A performing instructions defined by the computer program 4010 under control of an operating system 4008. The computer program 4010 and/or the operating system 4008 may be stored in the memory 4006 and may interface with the user and/or other devices to accept input and commands and, based on such input and commands and the instructions defined by the computer program 4010 and operating system 4008, to provide output and results.

Output/results may be presented on the display 4022 or provided to another device for presentation or further processing or action. In one embodiment, the display 4022 comprises a liquid crystal display (LCD) having a plurality of separately addressable liquid crystals. Alternatively, the display 4022 may comprise a light emitting diode (LED) display having clusters of red, green and blue diodes driven together to form full-color pixels. Each liquid crystal or pixel of the display 4022 changes to an opaque or translucent state to form a part of the image on the display in response to the data or information generated by the processor 4004 from the application of the instructions of the computer program 4010 and/or operating system 4008 to the input and commands. The image may be provided through a graphical user interface (GUI) module 4018. Although the GUI module 4018 is depicted as a separate module, the instructions performing the GUI functions can be resident or distributed in the operating system 4008, the computer program 4010, or implemented with special purpose memory and processors.

In one or more embodiments, the display 4022 is integrated with/into the computer 4002 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD), portable/handheld game/music/video player/console devices (e.g., IPOD TOUCH, MP3 players, NINTENDO 3DS, PLAYSTATION PORTABLE, etc.), touch tables, and walls (e.g., where an image is projected through acrylic and/or glass, and the image is then backlit with LEDs).

Some or all of the operations performed by the computer 4002 according to the computer program 4010 instructions may be implemented in a special purpose processor 4004B. In this embodiment, some or all of the computer program 4010 instructions may be implemented via firmware instructions stored in a read only memory (ROM), a programmable read only memory (PROM) or flash memory within the special purpose processor 4004B or in memory 4006. The special purpose processor 4004B may also be hardwired through circuit design to perform some or all of the operations to implement the present invention. Further, the special purpose processor 4004B may be a hybrid processor, which includes dedicated circuitry for performing a subset of functions, and other circuits for performing more general functions such as responding to computer program 4010 instructions. In one embodiment, the special purpose processor 4004B is an application specific integrated circuit (ASIC).

The computer 4002 may also implement a compiler 4012 that allows an application or computer program 4010 written in a programming language such as C, C++, Assembly, SQL, PYTHON, PROLOG, MATLAB, RUBY, RAILS, HASKELL, or other language to be translated into processor 4004 readable code. Alternatively, the compiler 4012 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 4010 accesses and manipulates data accepted from I/O devices and stored in the memory 4006 of the computer 4002 using the relationships and logic that were generated using the compiler 4012.

The computer 4002 also optionally comprises an external communication device such as a modem, satellite link, Ethernet card, or other device for accepting input from, and providing output to, other computers 4002.

In one embodiment, instructions implementing the operating system 4008, the computer program 4010, and the compiler 4012 are tangibly embodied in a non-transitory computer-readable medium, e.g., data storage device 4020, which could include one or more fixed or removable data storage devices, such as a zip drive, floppy disc drive 4024, hard drive, CD-ROM drive, tape drive, etc. Further, the operating system 4008 and the computer program 4010 are comprised of computer program 4010 instructions which, when accessed, read and executed by the computer 4002, cause the computer 4002 to perform the steps necessary to implement and/or use the present invention or to load the program of instructions into a memory 4006, thus creating a special purpose data structure causing the computer 4002 to operate as a specially programmed computer executing the method steps described herein. Computer program 4010 and/or operating instructions may also be tangibly embodied in memory 4006 and/or data communications devices 4030, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 4002.

Figure 41:
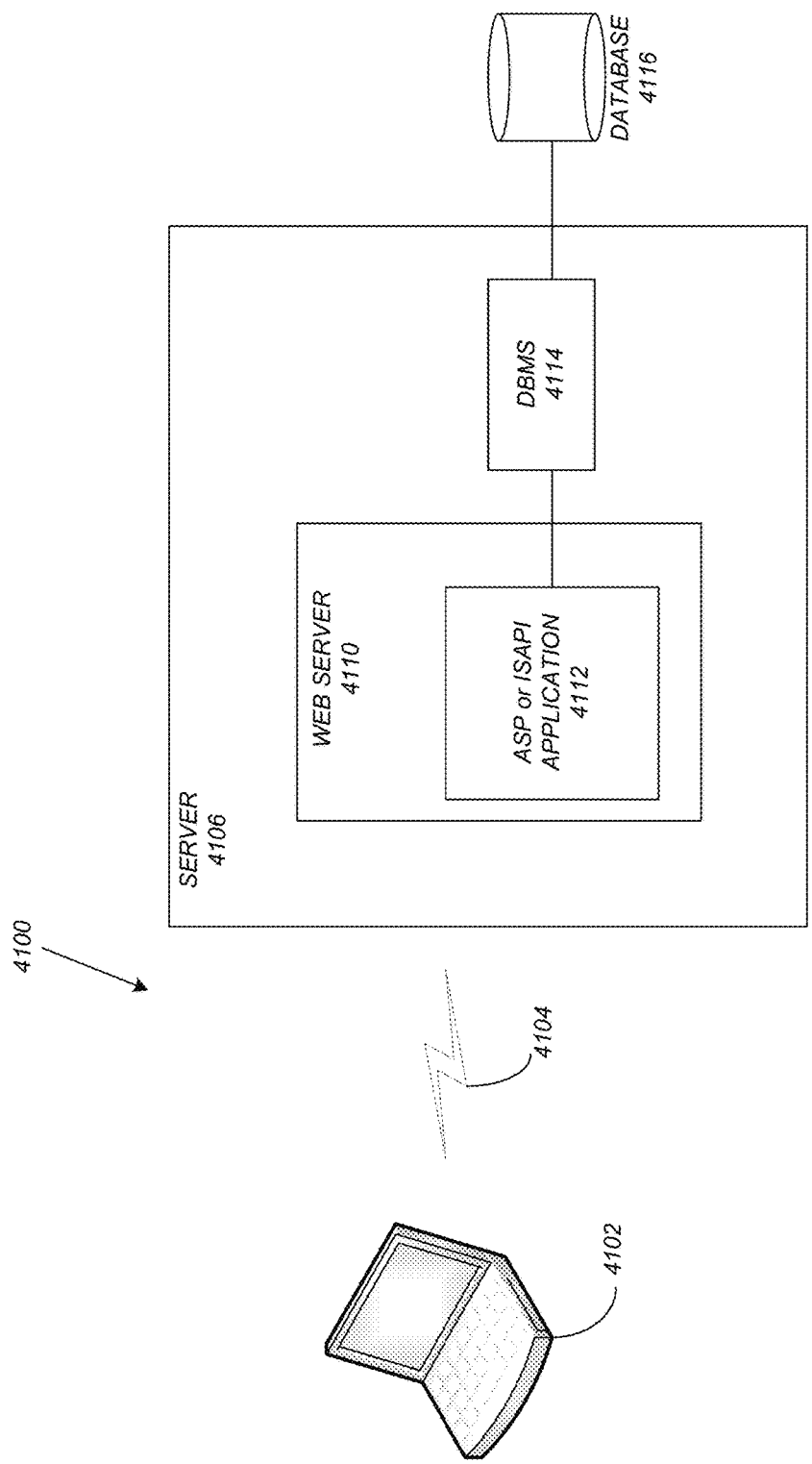
FIG. 41 schematically illustrates a typical distributed/cloud-based computer system using a network to connect client computers to server computers in accordance with one or more embodiments of the invention.

FIG. 41 schematically illustrates a typical distributed/cloud-based computer system 4100 using a network 4104 to connect client computers 4102 to server computers 4106. A typical combination of resources may include a network 4104 comprising the Internet, LANs (local area networks), WANs (wide area networks), SNA (systems network architecture) networks, or the like, clients 4102 that are personal computers or workstations (as set forth in FIG. 40), and servers 4106 that are personal computers, workstations, minicomputers, or mainframes (as set forth in FIG. 40). However, it may be noted that different networks such as a cellular network (e.g., GSM [global system for mobile communications] or otherwise), a satellite based network, or any other type of network may be used to connect clients 4102 and servers 4106 in accordance with embodiments of the invention.

A network 4104 such as the Internet connects clients 4102 to server computers 4106. Network 4104 may utilize ethernet, coaxial cable, wireless communications, radio frequency (RF), etc. to connect and provide the communication between clients 4102 and servers 4106. Further, in a cloud-based computing system, resources (e.g., storage, processors, applications, memory, infrastructure, etc.) in clients 4102 and server computers 4106 may be shared by clients 4102, server computers 4106, and users across one or more networks. Resources may be shared by multiple users and can be dynamically reallocated per demand. In this regard, cloud computing may be referred to as a model for enabling access to a shared pool of configurable computing resources.

Clients 4102 may execute a client application or web browser and communicate with server computers 4106 executing web servers 4110. Such a web browser is typically a program such as MICROSOFT INTERNET EXPLORER, MOZILLA FIREFOX, OPERA, APPLE SAFARI, GOOGLE CHROME, etc. Further, the software executing on clients 4102 may be downloaded from server computer 4106 to client computers 4102 and installed as a plug-in or ACTIVEX control of a web browser. Accordingly, clients 4102 may utilize ACTIVEX components/component object model (COM) or distributed COM (DCOM) components to provide a user interface on a display of client 4102. The web server 4110 is typically a program such as MICROSOFT'S INTERNET INFORMATION SERVER.

Web server 4110 may host an Active Server Page (ASP) or Internet Server Application Programming Interface (ISAPI) application 4112, which may be executing scripts. The scripts invoke objects that execute business logic (referred to as business objects). The business objects then manipulate data in database 4116 through a database management system (DBMS) 4114. Alternatively, database 4116 may be part of, or connected directly to, client 4102 instead of communicating/obtaining the information from database 4116 across network 4104. When a developer encapsulates the business functionality into objects, the system may be referred to as a component object model (COM) system. Accordingly, the scripts executing on web server 4110 (and/or application 4112) invoke COM objects that implement the business logic. Further, server 4106 may utilize MICROSOFT'S TRANSACTION SERVER (MTS) to access required data stored in database 4116 via an interface such as ADO (Active Data Objects), OLE DB (Object Linking and Embedding DataBase), or ODBC (Open DataBase Connectivity).

Generally, these components 4100-4116 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 4102 and 4106 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 4102 and 4106. Further, embodiments of the invention are implemented as a software application on a client 4102 or server computer 4106. In addition, as described above, the client 4102 or server computer 4106 may comprise a thin client device or a portable device that has a multi-touch-based display.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

[1] BAUSCHKE, H. H., AND BORWEIN, J. M. On projection algorithms for solving convex feasibility problems. *SIAM Rev.* 38, 3 (1996), 367-426.

[2] BAUSCHKE, H. H., AND COMBETTES, P. L. *Convex analysis and monotone operator theory in Hilbert spaces*. CMS Books in Mathematics/Ouvrages de Mathématiques de la SMC. Springer, New York, 2011. With a foreword by Hédy Attouch.

[3] BAUSCHKE, H. H., AND KOCH, V. R. Projection methods: Swiss army knives for solving feasibility and best approximation problems with halfspaces. In *Infinite products of operators and their applications*, vol. 636 of *Contemp. Math.* Amer. Math. Soc., Providence, R.I., 2015, pp. 1-40.

[4] BAUSCHKE, H. H., KOCH, V. R., AND PHAN, H. M. Stadium norm and Douglas-Rachford splitting: a new approach to road design optimization. *Oper. Res.* 64, 1 (2016), 201-218.

[5] BINIAZ, A., AND DASTGHAIBYFARD, G. Drainage reality in terrains with higher-order Delaunay triangulations. Springer Berlin Heidelberg, Berlin, Heidelberg, 2008, pp. 199-211.

[6] BINIAZ, A., AND DASTGHAIBYFARD, G. Slope fidelity in terrains with higher-order delaunay triangulations. In *16th International Conference in Central Europe on Computer Graphics, Visualization, and Computer Vision* (Plzen, Czech Republic, 2008), Václav Skala-UNION Agency, pp. 17-23.

[7] BOT, R. I., CSETNEK, E. R., AND HEINRICH, A. A primal-dual splitting algorithm for finding zeros of sums of maximal monotone operators. *SIAM J. Optim.* 23, 4 (2013), 2011-2036.

[8] BRICEÑO ARIAS, L. M., AND COMBETTES, P. L. A monotone+skew splitting model for composite monotone inclusions in duality. *SIAM J. Optim.* 21, 4 (2011), 1230-1250.

[9] CARDANO, G. *The great art or The rules of algebra*. The M.I.T. Press, Cambridge, Mass.-London, 1968. Translated from the Latin and edited by T. Richard Witmer, With a foreword by Oystein Ore.

[10] CEGIELSKI, A. *Iterative methods for fixed point problems in Hilbert spaces*, vol. 2057 of *Lecture Notes in Mathematics*. Springer, Heidelberg, 2012.

[11] CENSOR, Y., CHEN, W., COMBETTES, P. L., DAVIDI, R., AND HERMAN, G. T. On the effectiveness of projection methods for convex feasibility problems with linear inequality constraints. *Comput. Optim. Appl.* 51, 3 (2012), 1065-1088.

[12] CENSOR, Y., AND ZENIOS, S. A. *Parallel optimization*. Numerical Mathematics and Scientific Computation.

Oxford University Press, New York, 1997. Theory, algorithms, and applications, With a foreword by George B. Dantzig.

[13] CORNISH, G., AND MUIR GRAVES, R. *Classic Golf Hole Design*. John Wiley & Sons, Inc., Hoboken DC, 2002.

[14] DOUGLAS, JR., J., AND RACHFORD, JR., H. H. On the numerical solution of heat conduction problems in two and three space variables. *Trans. Amer. Math. Soc.* 82 (1956), 421-439.

[15] HAWTREE, F. W. *The Golf Course, Planning design, construction and maintenance*. E & FN Spon, and imprint of Chapman & Hall, London, U K, 2005.

[16] IRVING, R. *Beyond the Quadratic Formula*. The Mathematical Association of America, Washington D.C., 2010.

[17] ITOH, T., AND SHIMADA, K. Automatic conversion of triangular meshes into quadrilateral meshes with directionality. *International Journal of CADCAM* 1, 1 (2002), 11-21.

[18] JOHNSTON, B. P., SULLIVAN, J. M., AND KWASNIK, A. Automatic conversion of triangular finite element meshes to quadrilateral elements. *International Journal for Numerical Methods in Engineering* 31, 1 (1991), 67-84.

[19] KARUSH, W. *MINIMA OF FUNCTIONS OF SEVERAL VARIABLES WITH INEQUALITIES AS SIDE CONDITIONS*. ProQuest LLC, Ann Arbor, Mich., 1939. Thesis (SM)—The University of Chicago.

[20] KUHN, H. W., AND TUCKER, A. W. Nonlinear programming. In *Proceedings of the Second Berkeley Symposium on Mathematical Statistics and Probability*, 1950 (1951), University of California Press, Berkeley and Los Angeles, pp. 481-492.

[21] LIONS, P.-L., AND MERCIER, B. Splitting algorithms for the sum of two nonlinear operators. *SIAM J. Numer. Anal.* 16, 6 (1979), 964-979.

[22] MOORE, I.D., GRAYSON, R., AND LADSON, A. Digital terrain modelling: a review of hydrological, geomorphological, and biological applications. *Hydrological processes* 5, 1 (1991), 3-30.

[23] MOREAU, J.-J. Proximité et dualité dans un espace hilbertien. *Bull. Soc. Math. France* 93 (1965), 273-299.

[24] RANK, E., SCHWEINGRUBER, M., AND SOMMER, M. Adaptive mesh generation and transformation of triangular to quadrilateral meshes. *Communications in Numerical Methods in Engineering* 9, 2 (1993), 121-129.

[25] ROCKAFELLAR, R. T. *Convex analysis*. Princeton Mathematical Series, No. 28. Princeton University Press, Princeton, N.J., 1970.

[26] RUSZCZYŃSKI, A. *Nonlinear optimization*. Princeton University Press, Princeton, N.J., 2006.

What is claimed is:

1. A computer-implemented method for designing a surface, comprising:
    (a) obtaining, in a computer, a triangular surface mesh representative of an existing physical surface, wherein the triangular surface mesh comprises two or more triangles that are connected by vertices and edges;
    (b) determining, in the computer, one or more design constraint sets based on one or more design constraints, wherein at least one of the one or more design constraints comprise:
        a maximum slope constraint for a first triangle of the two or more triangles in the triangular surface mesh, wherein the maximum slope constraint comprises a maximum angle between a normal vector of the first triangle and a reference vector;
    (c) projecting, in the computer, one or more heights of the vertices of the first triangle onto the one or more design constraint sets such that the normal vector satisfies all of the one or more design constraints, wherein the projecting comprises modifying the one or more heights by a minimum Euclidian distance, and wherein the modifying changes the triangular surface mesh into a converged triangular surface mesh;
    (d) generating, in the computer, a design of the surface represented by the converged triangular surface mesh, wherein the generating is based on the projecting; and
    (e) rendering the design of the surface in a computer-aided design (CAD) application, wherein the surface is constructed based on the design.

2. The computer-implemented method of claim 1, wherein the one or more design constraints further comprise:
    a surface oriented minimum slope constraint for the first triangle, wherein the surface oriented minimum slope constraint comprises a minimum angle between the normal vector of the first triangle and a directional vector.

3. The computer-implemented method of claim 1, wherein:
    the surface comprises a land surface; and
    the method further comprises constructing the land surface based on the design.

4. The computer-implemented method of claim 3, wherein:
    the design comprises a computer-aided design (CAD) for the land surface.

5. The computer-implemented method of claim 1, wherein the reference vector comprises a Z-vector representative of gravity.

6. The computer-implemented method of claim 1, wherein:
    the projecting is performed iteratively until all of the one or more design constraints are satisfied.

7. The computer-implemented method of claim 1, wherein:
    the projecting onto the design constraint set for the maximum slope constraint comprises moving the normal vector onto a cone defined by an origin of the reference vector on the triangular surface mesh and a unit circle around the reference vector that is defined by the maximum angle.

8. The computer-implemented method of claim 1, wherein:
    the projecting onto to the design constraint set for the maximum slope constraint comprises moving the normal vector onto a polygonal shaped pyramid defined by the reference vector on the triangular surface mesh and a regular polygon around the reference vector, wherein edges of the polygonal shaped pyramid are at the maximum angle with the reference vector.

9. A system for designing a surface, comprising:
    (a) a computer having a memory and a processor;
    (b) a computer aided design (CAD) application executed by the processor;
    (c) a triangular surface mesh, obtained in the CAD application, wherein the triangular surface mesh is representative of an existing physical surface and comprises two or more triangles that are connected by vertices and edges;
    (d) one or more design constraint sets, determined by the CAD application, based on one or more design constraints, wherein at least one of the one or more design constraints comprise:

a maximum slope constraint for a first triangle of the two or more triangles in the triangular surface mesh, wherein the maximum slope constraint comprises a maximum angle between a normal vector of the first triangle and a reference vector;

(e) the CAD application projecting, in the computer, one or more heights of the vertices of the first triangle onto the one or more design constraint sets such that the normal vector satisfies all of the one or more design constraints, wherein the projecting comprises modifying the one or more heights by a minimum Euclidian distance, and wherein the modifying changes the triangular surface mesh into a converged triangular surface mesh; and (d) a design of the surface represented by the converged triangular surface mesh, wherein the design is generated and rendered in the CAD application based on the projecting, wherein the surface is constructed based on the design.

10. The system of claim 9, wherein the one or more design constraints further comprise:

a surface oriented minimum slope constraint for the first triangle, wherein the surface oriented minimum slope constraint comprises a minimum angle between the normal vector of the first triangle and a directional vector.

11. The system of claim 9, wherein:
the surface comprises a land surface; and
the land surface is constructed based on the design.

12. The system of claim 11, wherein:
the design comprises a computer-aided design (CAD) for the land surface.

13. The system of claim 9, wherein the reference vector comprises a Z-vector representative of gravity.

14. The system of claim 9, wherein:
the application performs the projecting iteratively until all of the one or more design constraints are satisfied.

15. The system of claim 9, wherein:
the application projects onto the design constraint set for the maximum slope constraint by moving the normal vector onto a cone defined by an origin of the reference vector on the triangular surface mesh and a unit circle around the reference vector that is defined by the maximum angle.

16. The system of claim 9, wherein:
the application projects onto to the design constraint set for the maximum slope constraint by moving the normal vector onto a polygonal shaped pyramid defined by the reference vector on the triangular surface mesh and a regular polygon around the reference vector, wherein edges of the polygonal shaped pyramid are at the maximum angle with the reference vector.

* * * * *